US012621370B2

(12) United States Patent
Yoshimoto et al.

(10) Patent No.: US 12,621,370 B2
(45) Date of Patent: May 5, 2026

(54) CONTEXT MATCHING RELATED INFORMATION PROCESSING SYSTEM, INFORMATION PROCESSING METHOD AND INFORMATION PROCESSING DEVICE

(71) Applicants: KABUSHIKI KAISHA TOSHIBA, Tokyo (JP); TOSHIBA DIGITAL SOLUTIONS CORPORATION, Kawasaki (JP)

(72) Inventors: Takehiro Yoshimoto, Tokyo (JP); Akira Ishitsuka, Tokyo (JP)

(73) Assignees: KABUSHIKI KAISHA TOSHIBA, Kawasaki (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 18/666,105

(22) Filed: May 16, 2024

(65) Prior Publication Data

US 2024/0305700 A1 Sep. 12, 2024

Related U.S. Application Data

(63) Continuation of application No. PCT/JP2022/042205, filed on Nov. 14, 2022.

(30) Foreign Application Priority Data

Nov. 16, 2021 (JP) ................................ 2021-186348

(51) Int. Cl.

*G06F 15/173* (2006.01)
*H04L 67/52* (2022.01)
*H04L 67/63* (2022.01)

(52) U.S. Cl.

CPC .............. *H04L 67/63* (2022.05); *H04L 67/52* (2022.05)

(58) Field of Classification Search

CPC ................................ H04L 67/63; H04L 67/52

(Continued)

(56) References Cited

U.S. PATENT DOCUMENTS 10,531,372 B1 * 1/2020 Parshin ..................... G01S 1/68
11,397,719 B1 * 7/2022 Khoyilar ............... H04L 51/216
(Continued)

FOREIGN PATENT DOCUMENTS

JP 2005174106 A 6/2005
JP 2006172223 A 6/2006
(Continued)

OTHER PUBLICATIONS

Office Action issued on Jul. 9, 2024, in corresponding Japanese Application No. 2021-186348, 10 pages.
(Continued)

*Primary Examiner* — Alan S Chou
(74) *Attorney, Agent, or Firm* — Maier & Maier, PLLC

(57) ABSTRACT

According to one embodiment, when a predetermined context is established in the communication area, the user of the reception or transmission side can receive or provide service information, in unconsciously. The system broadcasts a packet as a beacon signal, the packet consists of a header area containing communication standard data and a user area in which the device ID being used and context data can be written. When the beacon signal is received and detection data indicating that the data is a corresponding relationship with the context data set by its own device, service information is output.

9 Claims, 44 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 2012/0316940 | A1 | 12/2012 | Moshfeghi | |
| 2016/0094598 | A1* | 3/2016 | Gedikian .............. | H04L 65/611<br>455/456.3 |
| 2016/0105772 | A1* | 4/2016 | Cohen ................... | H04W 4/027<br>455/456.3 |
| 2017/0289749 | A1* | 10/2017 | Brennan ............. | H04W 40/244 |
| 2018/0204436 | A1 | 7/2018 | Miyajima | |
| 2020/0356971 | A1 | 11/2020 | Murata | |

FOREIGN PATENT DOCUMENTS

| | | | |
|---|---|---|---|
| JP | 6528256 | B1 | 6/2019 |
| JP | 6715501 | B1 | 7/2020 |
| JP | 2020184213 | A | 11/2020 |
| JP | 2021064394 | A | 4/2021 |
| JP | 2021111164 | A | 8/2021 |
| JP | 2021119488 | A | 8/2021 |
| WO | 2008030879 | A2 | 3/2008 |
| WO | 2017018015 | A1 | 2/2017 |

OTHER PUBLICATIONS

International Search Report and Written Opinion on Patentability issued Jan. 17, 2023, in corresponding International Application No. PCT/JP2022/042205, 11 pages; partial English translation provided.

Office Action issued on Jul. 15, 2025, in corresponding Japanese Application No. 2024-187477, 8 pages.

* cited by examiner

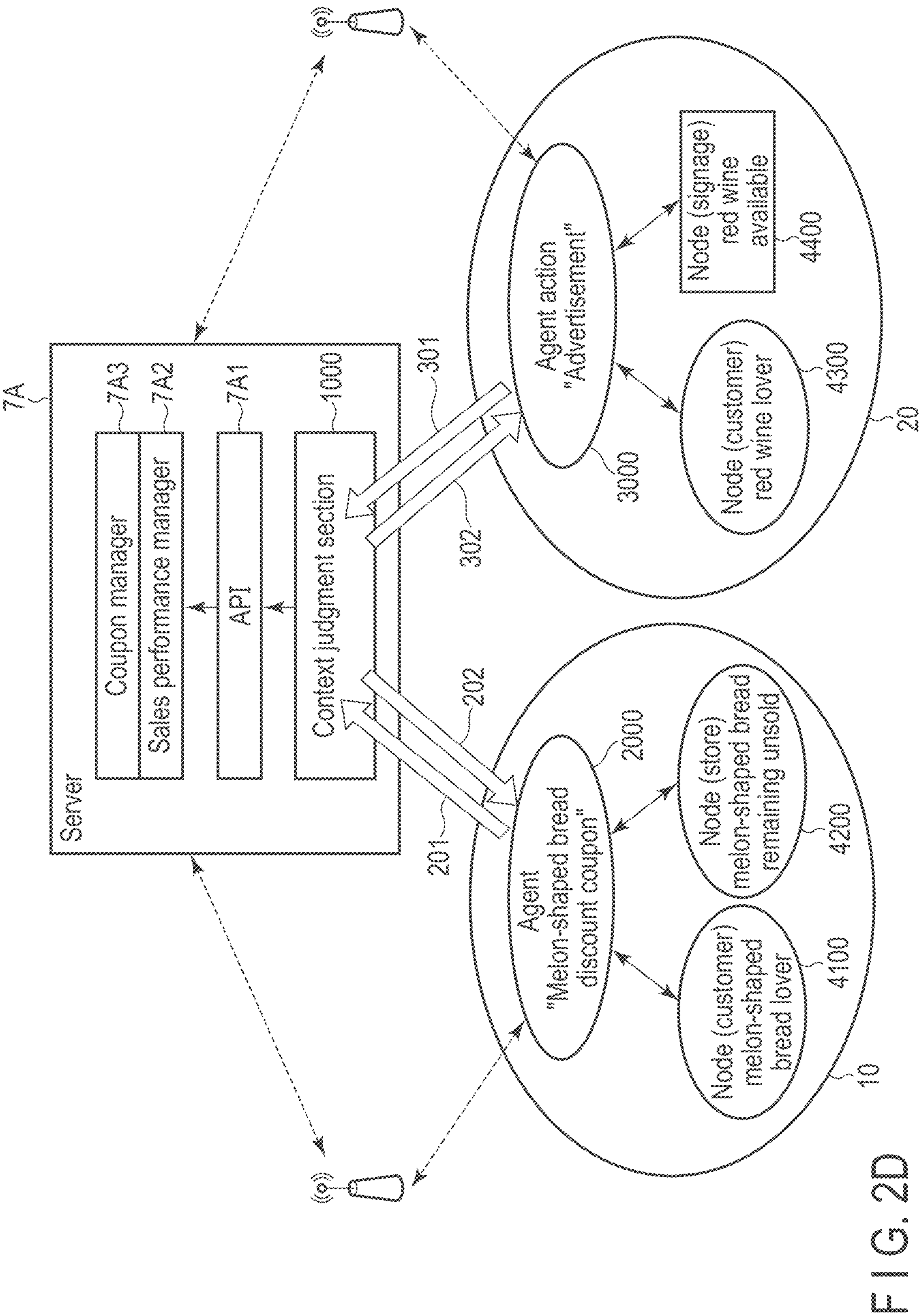
F I G. 2D

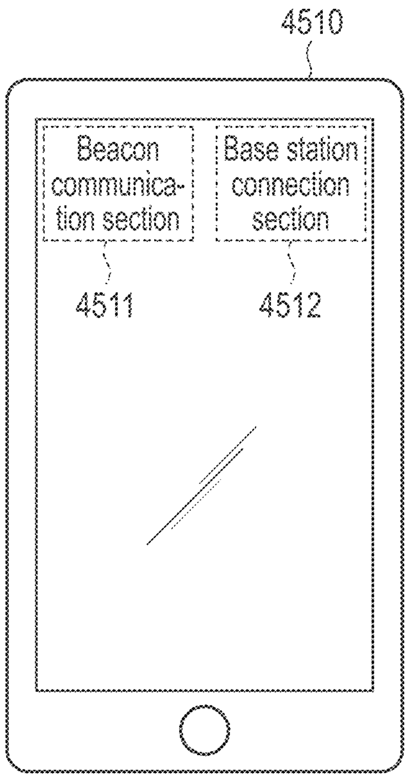
F I G. 5A
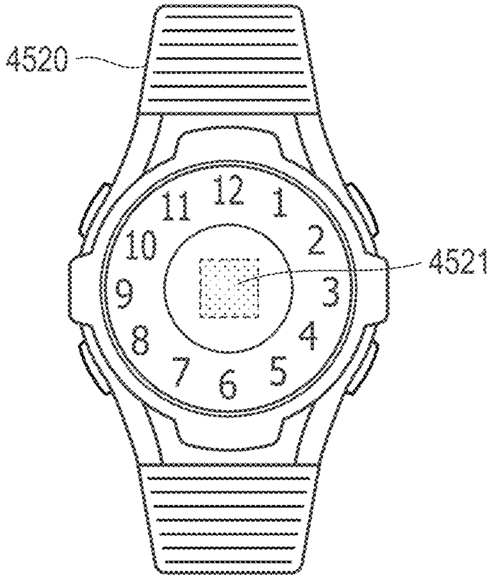
F I G. 5B

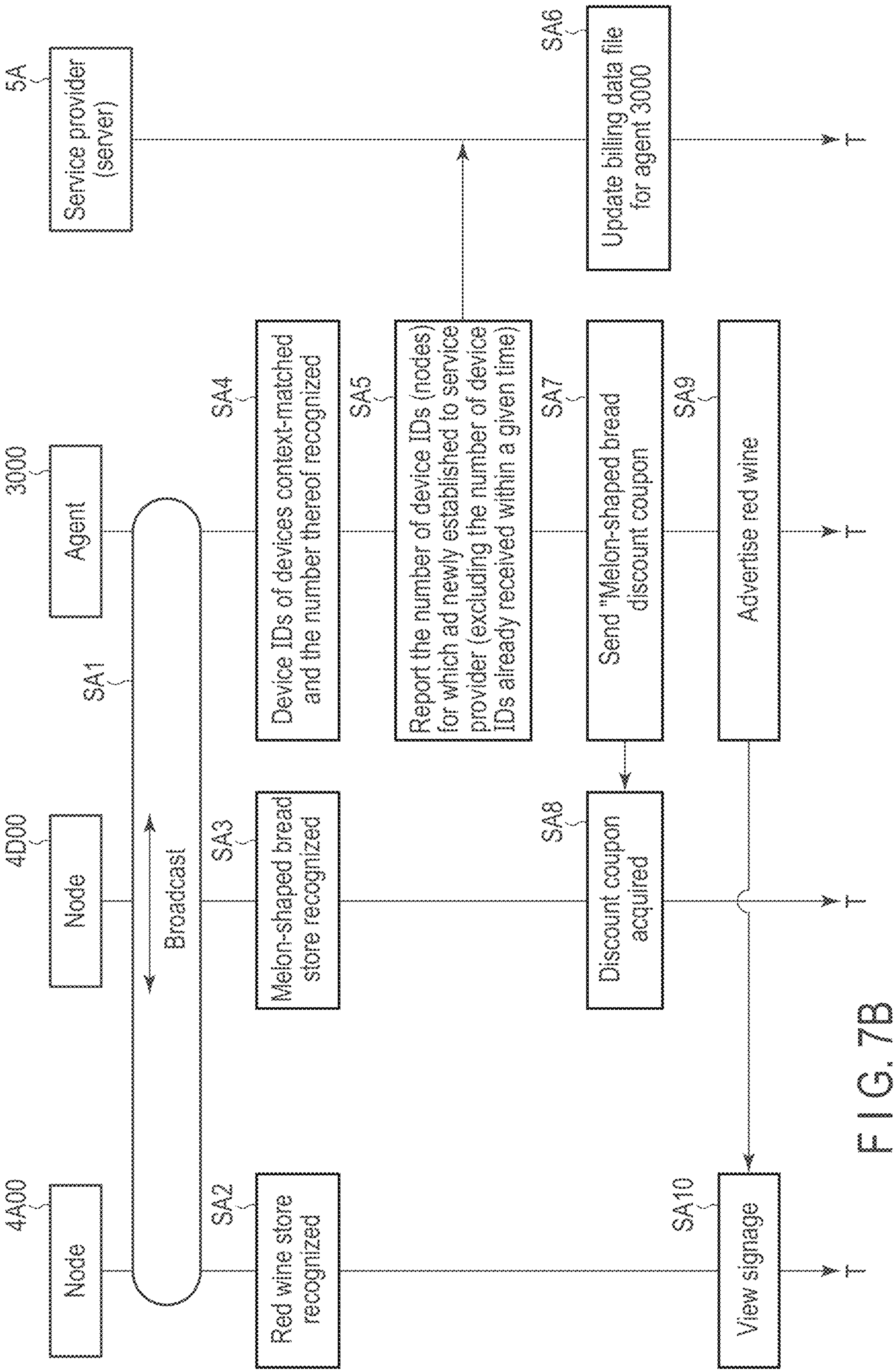
F I G. 7B

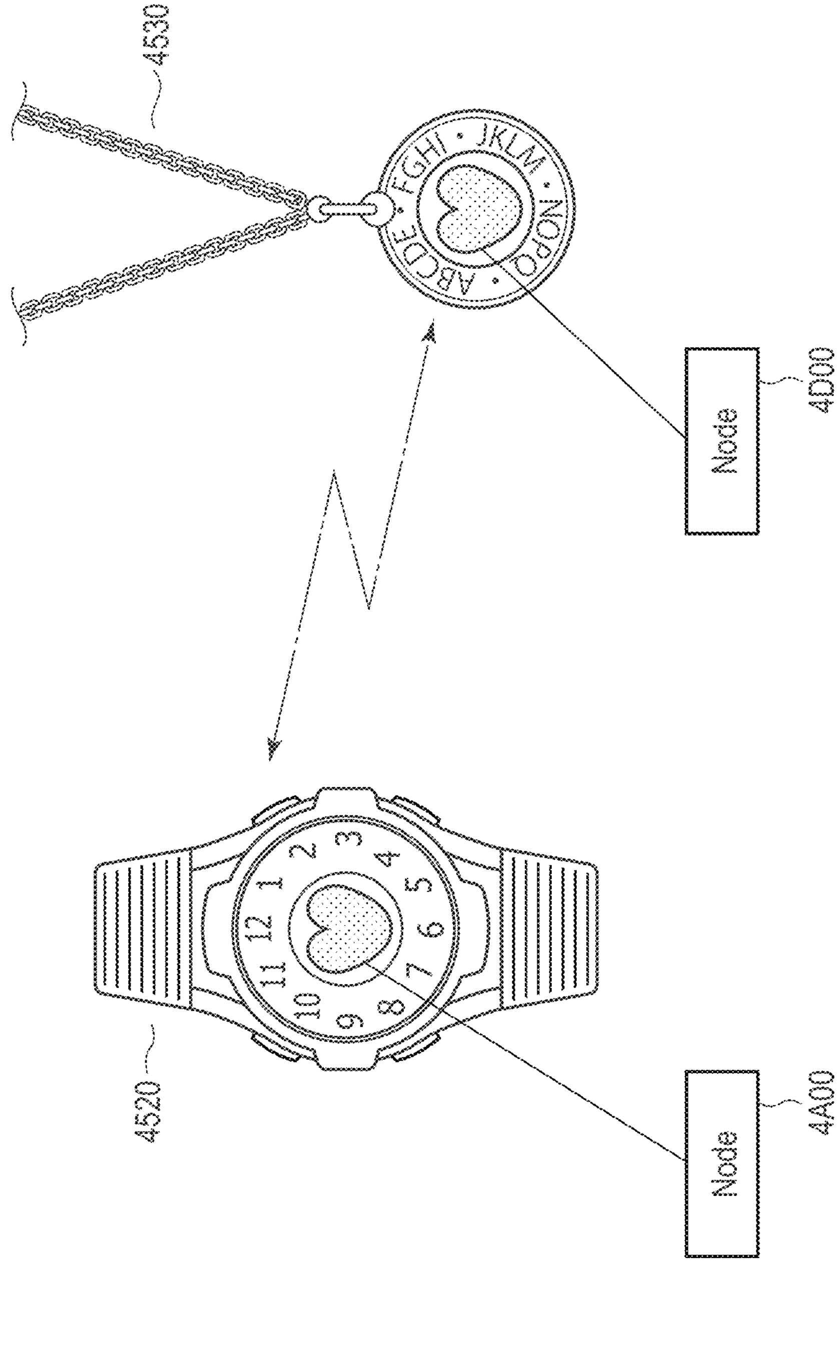
F I G. 10A

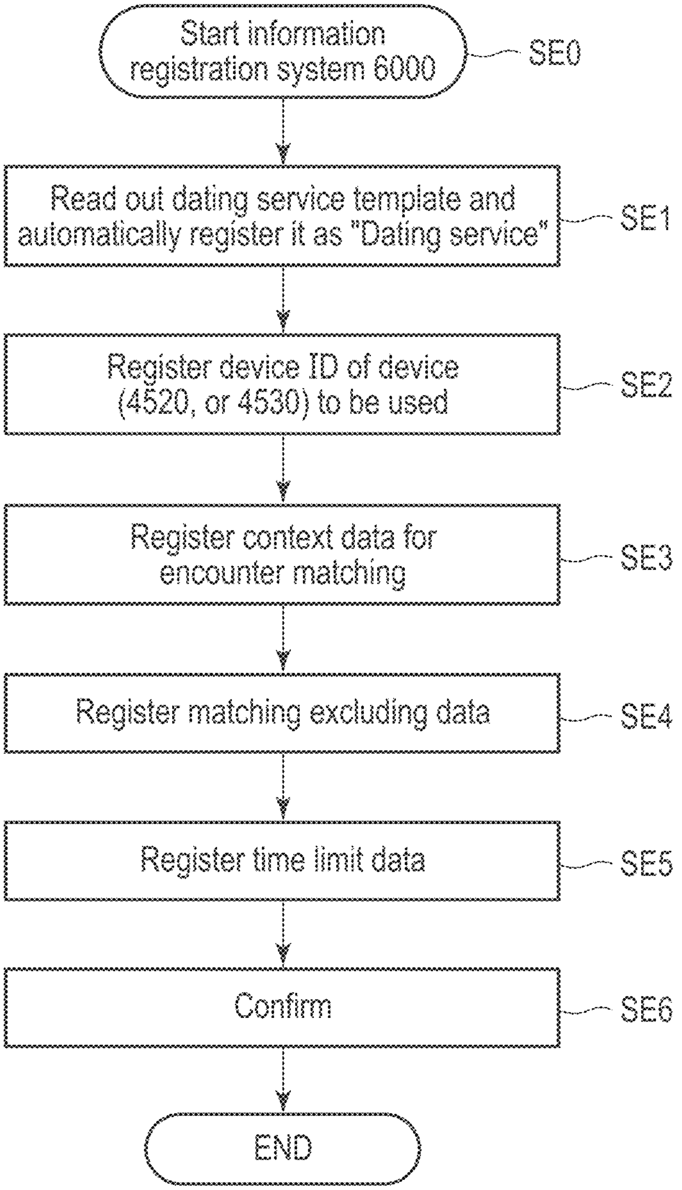
F I G. 10B

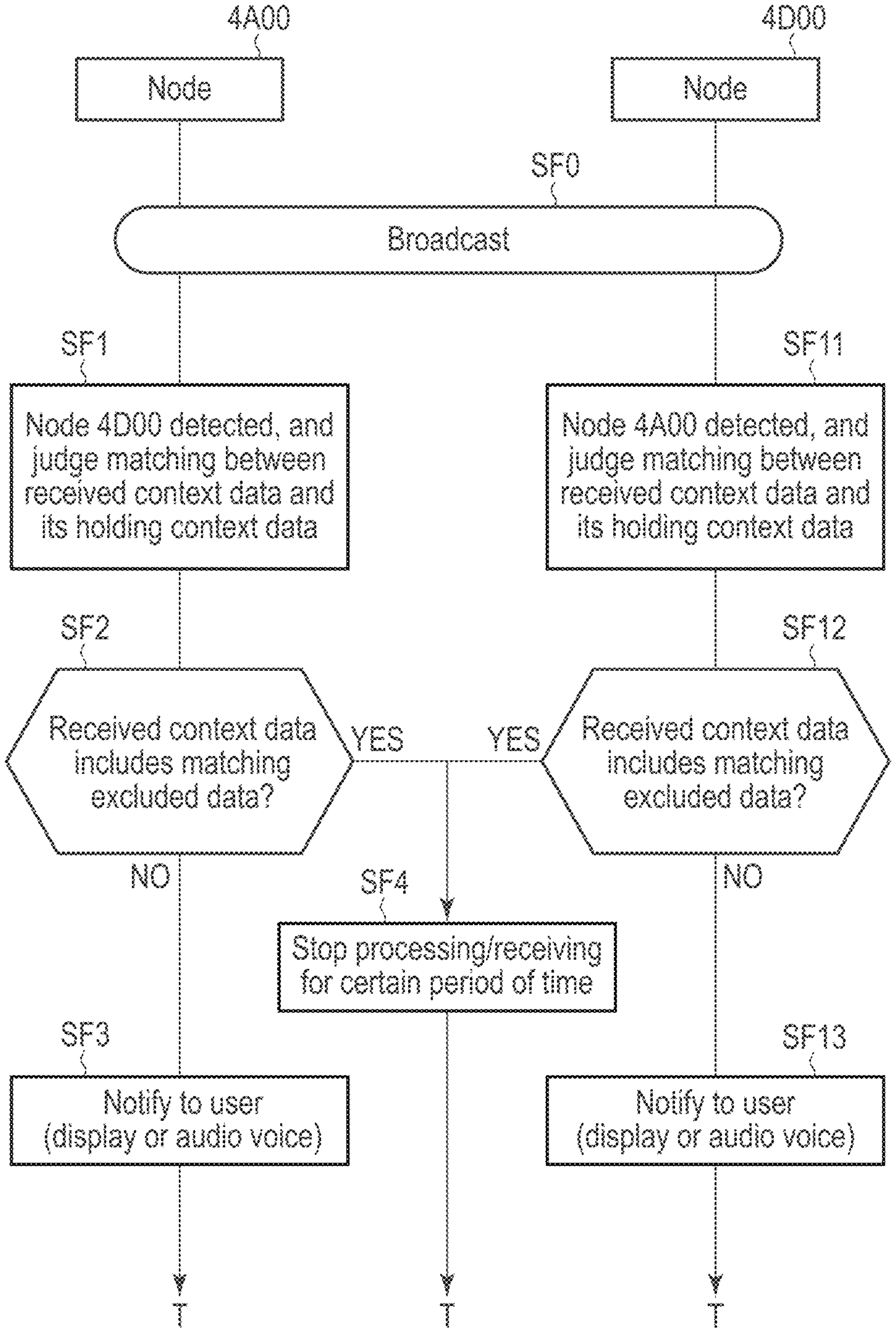
F I G. 10C

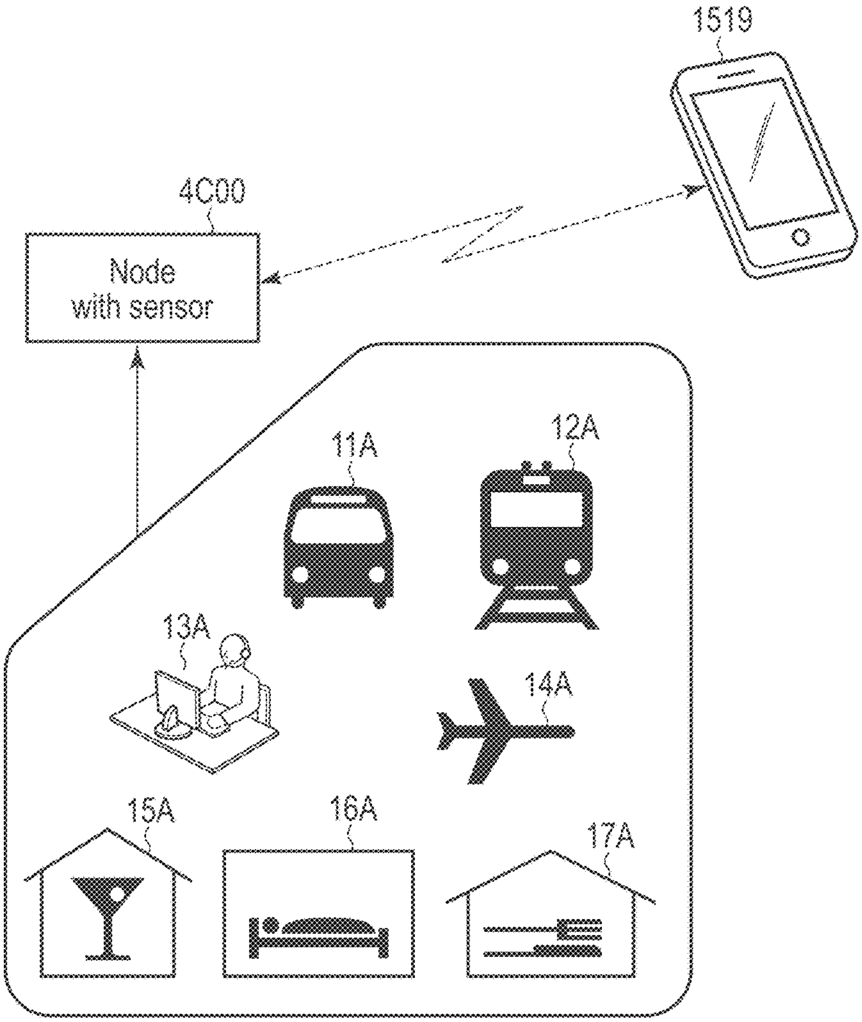
F I G. 12A
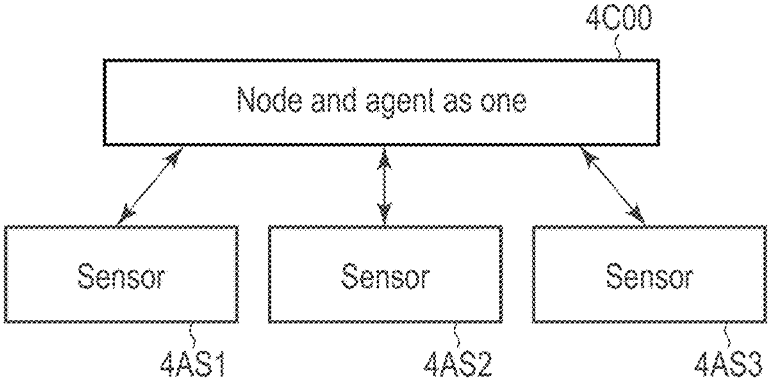
F I G. 12B 6030
6020
6010

| Rule sets | Rules | IF clauses | THEN clauses | Explanations |
|---|---|---|---|---|
| Set 1 | Rule 1 | IF1 | THEN1 | THEN1 is triggered when condition of IF1 is met is triggered |
| | Rule 2 | IF2 | THEN2 | THEN2 is triggered when conditions of IF2 and IF3 are met simultaneously |
| | | IF3 | | |
| | Rule 3 | IF4 | THEN3 | THEN3 and THEN4 are triggered simultaneously when condition of IF4 is met |
| | | | THEN4 | |
| | Rule 4 | IF5 | THEN5 | THEN5 and THEN6 are triggered when conditions IF5 and IF6 are met simultaneously |
| | | IF6 | THEN6 | |

Rule Set 1...Summary, identification data, name, (supported microservices), (priority, enable/disable settings, usage environment) information ~6011

Rules 1-4... Name of each rule, identification data ~6012

IF set (IF1, IF2, IF3, ...)
IF ... device name (sensor name), serial number, summary, conditions
(attribute information such as range, threshold, inhibition time, individual parameters, etc.)
(supported microservices) ~6013

THEN set (THEN 1, THEN2, THEN3, ...)
THEN ... Device name, serial number, summary, conditions
(Attribute information such as inhibition time, sensor name, control target, individual parameters, etc.)
(supported microservices) (event related information) ~6014

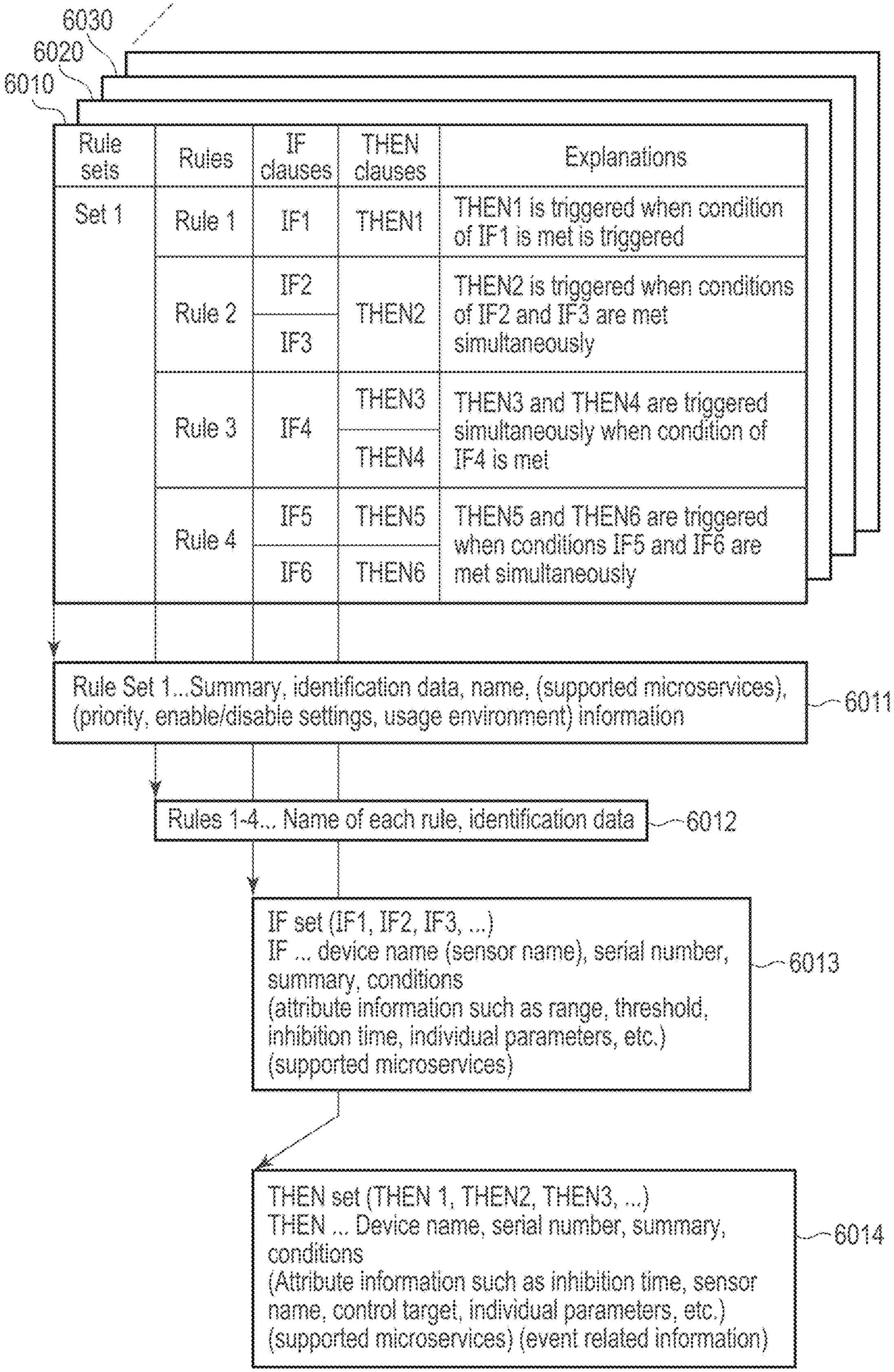

F I G. 17

| BYTE | 0 | | | | | | | |
|---|---|---|---|---|---|---|---|---|
| bit | 7 | 6 | 5 | 4 | 3 | 2 | 1 | 0 |
| field | REQ/RSP | REPLY | COMMAND | | | | | |
| | 0: Request | 0: No response required | 1: Device registration (unused) | | | | | |
| | 1: Response | 1: Response required | 2: Device registration result (not used) | | | | | |
| | | | 3: Sensor value notification | | | | | |
| | | | 4: JOB notification | | | | | |
| | | | 5: JOB result notification | | | | | |

F I G. 18

| Frame type | Set value |
|---|---|
| Sensor value notification (no response required) | 0x03 |
| Sensor value notification (response required) | 0x43 |
| Sensor value notification response | 0xC3 |
| JOB notification (no response required) | 0x04 |
| JOB notification (response required) | 0x44 |
| JOB result notification | 0xC4 |

FIG. 19

Example of schema information:

Device name: "SampleDevice1", "SampleDevice2"
schema information:

```
<?xml version="1.0" encoding="utf-8"?>
<schema name="SampleDevice1">
    <property name="devicename" type="string" />
    <property name="deviceserial" type="string" />
    <property name="timestamp" type="timestamp" />
    <property name="memberid" value="0x0000" />
    <property name="moduleid" value="0x0001" />
    <property name="param1" type="float" />
    <property name="param2" type="int" />
    <property name="param3" type="string" />
    <property name="param4" type="string" />
</schema>
<schema name="SampleDevice2">
    <property name="devicename" type="string" />
    <property name="deviceserial" type="string" />
    <property name="timestamp" type="timestamp" />
    <property name="memberid" value="0x0000" />
    <property name="moduleid" value="0x0002" />
    <property name="param1" type="float" />
    <property name="param2" type="int" />
    <property name="param3" type="string" />
    <property name="param4" type="string" />
</schema>
```

FIG. 20

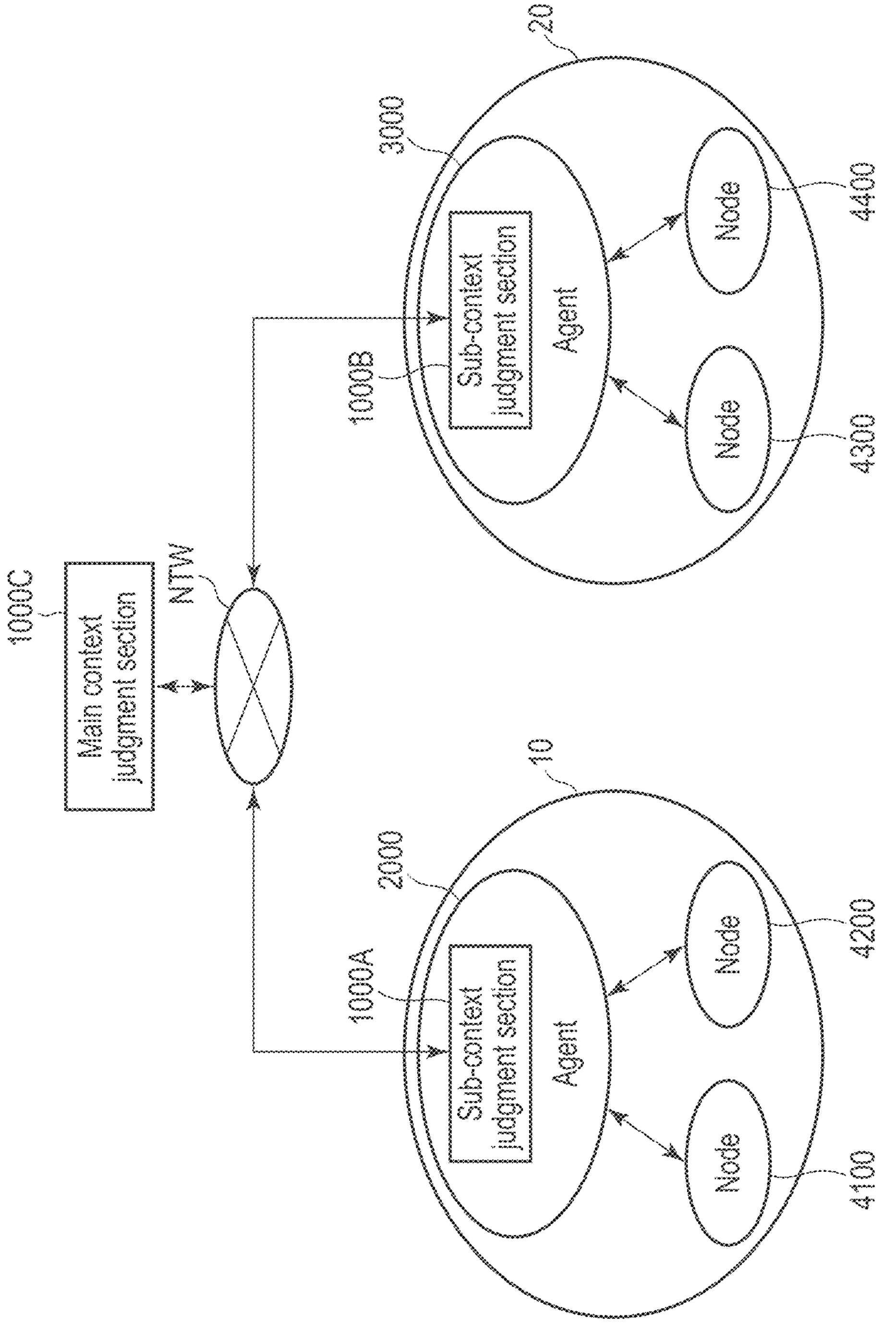
F I G. 24

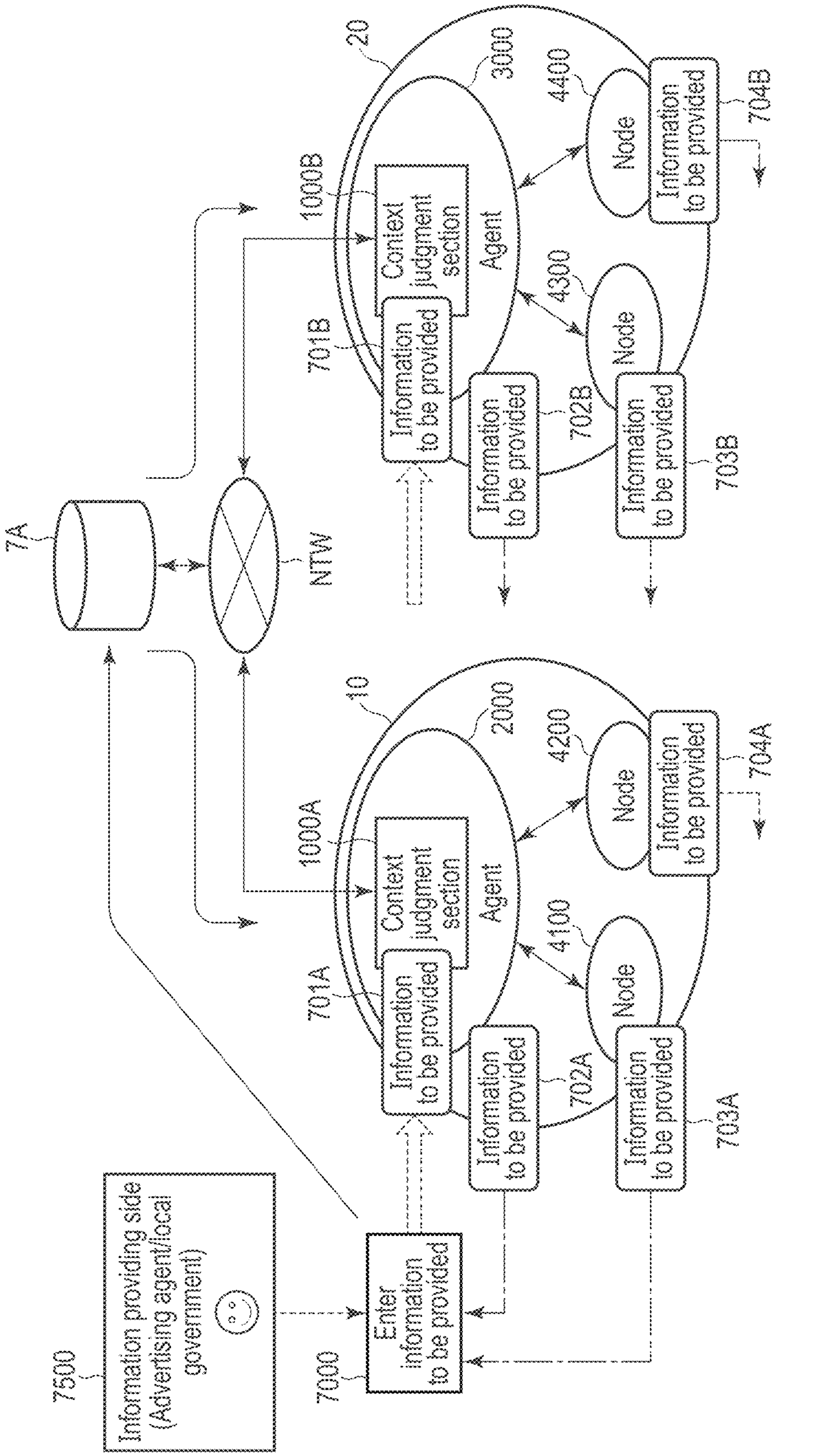
F I G. 30

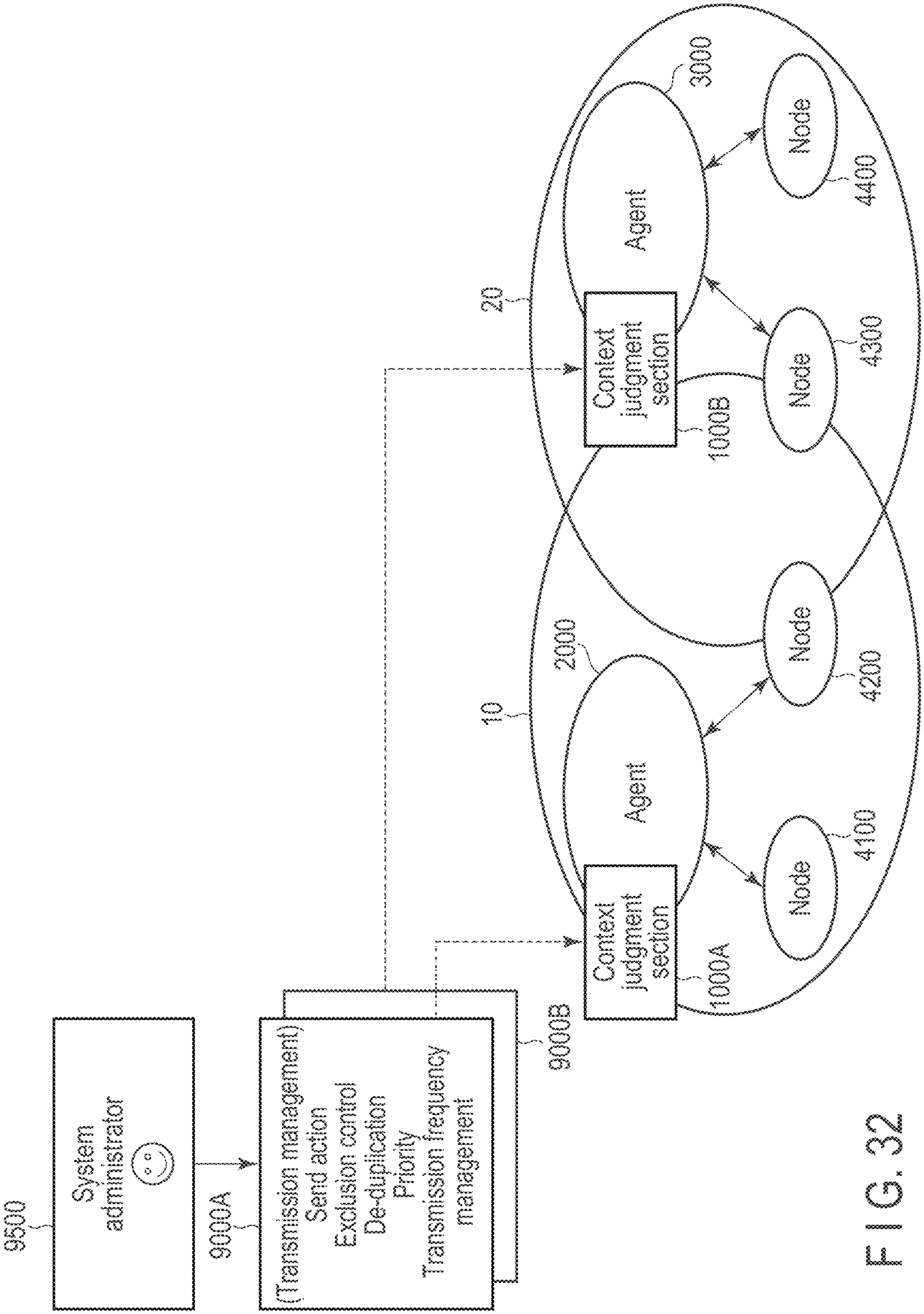
F I G. 32

CONTEXT MATCHING RELATED INFORMATION PROCESSING SYSTEM, INFORMATION PROCESSING METHOD AND INFORMATION PROCESSING DEVICE

CROSS-REFERENCE TO RELATED APPLICATIONS

This application is a Continuation Application of PCT Application NO. PCT/JP2022/042205, filed Nov. 14, 2022 and based upon and claiming the benefit of priority from Japanese Patent Application No. 2021-186348, filed Nov. 16, 2021, the entire contents of all of which are incorporated herein by reference.

FIELD

Embodiments described herein relate generally to a context matching related information processing system, an information processing method, and an information processing device, and further, to a signal receiving method, a transmission method, a server and the like.

BACKGROUND

In general, there are methods such as follow, for example, for a user to obtain some sort of service information using a communication system. The user uses a personal computer (hereinafter referred to as "PC") or a mobile terminal (for example, a smart phone (hereinafter referred to as "smartphone")), and enters search information or a uniform resource locator (URL) according to his/her needs, or clicks on a commercial screen displayed on the screen, so as to establish a communication environment with the relevant server. Then, the server will provide service information to the PC or the smartphone.

As described above, a method for a user to obtain some sort of service information is that the user operates a PC or smartphone according to the user's "needs", actively accesses the server, and obtains the service information provided by the server. Such a method will be referred to as a "user origin" method because the user is a starting point.

Apart from the "user origin" method described above, there are special cases in which service information can be obtained. Such special cases include, for example, that when a specific organization (for example, an official specialized organization such as the Japan Meteorological Agency) sends out "emergency notifications" all at once when an earthquake occurs. In this method, the recipients (users) are not identified, and the users receives the information simultaneously on the smartphone. The provision of such information is useful to the users. On the other hand, there are communication systems that send various types of service information (commercials and the like, which are not intended by the user) to the user's smartphone or PC. According to these communication systems, users are often provided with even service information in which they are not interested.

As described above, many conventional service information providing systems are based on the "user origin" method, and they are systems which provide service information in response to the specific "needs" or "requests" of the user. In the meantime, the systems which adopt the "user origin" method provide service information only when users explicitly indicate their intended "needs" or "requests". For this reason, it can be said that the conventional service information providing systems involves a small scale of chance to provide service information. Further, a service information providing system such as "earthquake prompt announcement", which is not of the "user origin" system, is limited to special cases and have limited flexibility.

BRIEF DESCRIPTION OF THE DRAWINGS

FIG. 2D is a diagram showing another configuration example of the embodiment.

FIG. 5A is a diagram showing an exterior configuration example of a node used in the embodiment.

FIG. 5B is a diagram showing another exterior configuration example of the node used in the embodiment.

FIG. 7B is an explanatory diagram showing an example of system operation of the case where the basic system of the invention is utilized for a product sales promotion system in the context area 20.

FIG. 10A is an explanatory diagram showing an embodiment of the case where the basic system of the present invention is utilized for an encounter detection system.

FIG. 10B is an explanatory diagram showing a procedure of the case where the basic system of the present invention is utilized for the encounter detection system when a user sets up prologue information.

FIG. 10C is an explanatory diagram showing an example of system operation of the case where the basic system of the present invention is utilized for the encounter detection system.

FIG. 12A is an explanatory diagram showing an embodiment of the case where the basic system of the present invention is applied to a spatial environment detection system.

FIG. 12B is a diagram showing an example of a functional configuration of a node utilized for embodiment of FIG. 12A.

FIG. 17 is a diagram showing a configuration example of an IF-THEN rule.

FIG. 18 is a diagram showing an example of a configuration of a frame type (Flame Type) shown in FIG. 1.

FIG. 19 is a diagram showing an example of a setting value of the Flame Type shown in FIG. 18.

FIG. 20 is a diagram showing an example of schema information according to the embodiment.

FIG. 24 is an extracted schematic diagram showing a basic configuration of still another embodiment.

FIG. 30 is an extracted schematic diagram showing a basic configuration of still another embodiment.

FIG. 32 is an extracted schematic diagram showing a basic configuration of still another embodiment.

DETAILED DESCRIPTION

Figure 1:
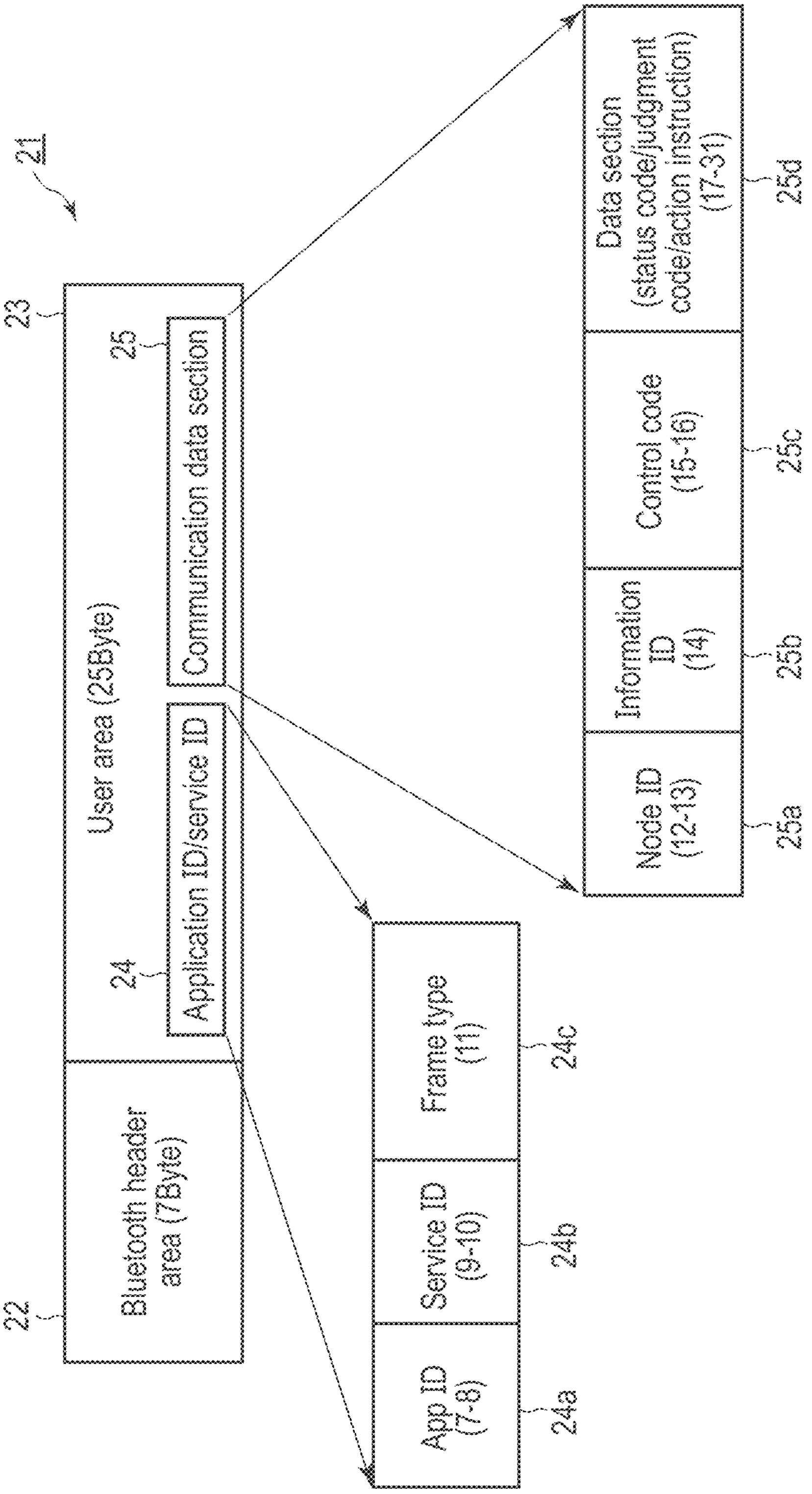
FIG. 1 is a diagram showing a configuration example of an advertisement packet (beacon packet) of a common format used by an information processor including a beacon device according to an embodiment.

Embodiments will now be described with reference to the accompanying drawings.

Here, the inventors of the embodiments focused on the point that the chance to provide service information to a user in response to a "need" or a "request" of the user, or the chance for a user to receive service information often occurs even at the timing when the user is not explicitly aware of the "need" or "request".

This timing is when multiple states where multiple users and objects occur in combinations in the vicinity, and such a combination of multiple states will be referred to as a "situation". Note that the situation may as well be referred to as "environment", "atmosphere" "context scheme rule setting" or simply "rule setting".

Further, "multiple states" can be various states depending on the purpose of the service. Typical examples of states are as follows. That is, a state in which there is commonality of purpose among multiple users; a state in which a specific object and a user are in close proximity; a state in which a user receiving a service and a user providing the service are in close proximity; a state in which a predetermined number of objects and users are present; and others.

Under such circumstances, the present embodiments has been devised to provide a novel method, device and system, which have not been available with conventional technique, that is not a "user origin" method, but a method that utilizes a situation or a situation rule as a starting point (hereinafter tentatively referred to as a "situation origin" or "situation rule origin" method), so as to be able to provide service information or receive service information.

In general, according to one embodiment, an object here is to provide a context matching related information processing system and such an information processing device, by which a user can receive at least service information or provide service information by using a situation rule as a starting point.

One of the embodiments described herein comprises a first information processor that registers a first context in a context judgment section and a second information processor that registers a second context in the context judgment section. The first information processor and the second information processor perform beacon communication with each other and each comprise a judgment section that judges the context-related information contained in the beacon packet.

There is provided an information processing system, wherein the first information processor has a first processor and a second processor, the first processor processes the result data as output data for node notification, and the second processor processes the result data as output data for user notification, when the result data of the judgment indicates the first and the second context are in a matching relationship.

According to another embodiment, the context may be pre-coded.

Further, in order to make the description clearer, the drawings may be represented schematically in terms of width, thickness, shape, etc., of each part compared to the actual state. Moreover, the device of the invention is also applicable when the claims are expressed as control logic, as a program including instructions to be executed by a computer, and as a computer-readable recording medium containing the instructions. The names and terms are not particularly limited to those used here, and even other expressions are included in the present invention if they are substantially the same in content and intent.

In this embodiment, the term "information processor" is used to include the following devices, software, or equipment.

One including a transmitter constituted by a semiconductor chip, which has an input unit for sensor signals and transmits signals input from a sensor and processed.

One including a transmitter whose input unit for sensor signals is directly connected to the sensor, which transmits signals input from a sensor and processed.

One including a transmitter/receiver whose input unit for sensor signals receives wireless signals from the sensor, which transmits the signals input from the sensor and processed.

One having an external appearance with a configuration of a hardware block and configured as a gateway, that includes a gateway having a function for short-range wireless communication and a function for enabling it to connect to a network.

One including the gateway when operating as an agent.

One having an external appearance of a smartphone and includes the smartphone when operating as a simple notification function, a simple reception function, and operating as an agent.

Regardless of the outer appearance, one including a tape, card, substrate or the like, in which the microchip is embedded, and further when installed as a data processing program in a device which operates by a program, as well.

These are included in the information processor meant by the present embodiments.

<Beacon Signals>

With reference to FIG. 1, first, the beacon signal used in this embodiment will be explained. An information processor having a communication function uses an advertising packet used in the BLE (Bluetooth (registered trademark) Low Energy) function as a beacon signal.

According to the Bluetooth Low Energy standard, 40 channels are reserved for communication channels, three of which are used as advertising channels. The advertising channels are each used to transmit advertisement packets, and they transmit data used to inform the surrounding environment of the presence of the device itself. The interval time for advertising is from 20 msec to 10.24 msec. In the advertising, a beacon signal carrying the advertisement packet is broadcasted on each of the three channels that have been set up.

There are various types of information processors with communication functions, including those that are connected to servers via the Internet and can be communicated with each other.

This embodiment focuses on the point that "the above-described advertisement packet includes, as a part thereof, an area that can be arbitrarily used by the user".

Further, the information processor may not only be configured as a beacon device in a simplified configuration, but the information processor may as well be configured as a composite chip or composite device or a part thereof that is composite with a sensor. Furthermore, the information processor may as well be configured as a composite device or composite system or a part thereof, composite with a smartphone as a beacon module. Furthermore, the information processor may as well be configured as a composite device or composite system or a part thereof, composite with an edge computer as a beacon module.

In this embodiment, the configuration of the advertisement packet (hereinafter referred to as "beacon packet") is set as follows in order for the advertisement packet to be effectively applicable to the above-described composite chip, composite device, or composite system.

<Beacon Packet>

FIG. 1 shows a beacon packet 21 in a common format used by the above-described information processors. The beacon packet 21 is constituted by 32 bytes, with 7 bytes in a header area 22 and 25 bytes in a user area 23. The user area 23 includes an application ID/service ID area 24 and a communication data section area 25. The data described in the user area 23 is the relevant data for context matching. The information described in the service ID area 24 may as well be referred to as an application ID or service ID in whole or in part.

The header area 22 is of the Bluetooth Low Energy standard itself and will not be described in detail here. In this embodiment, we focus on byte 7 to byte 31, which is the range that users can use in their own ways.

In byte 7 to byte 8 (the area indicated by a reference symbol of 24*a*), the application ID is described. In the application ID, a member ID (Member ID: identification information of the user of the electronic device) is described. The member ID (Member ID: identification information of the user of the electronic device) is information that identifies a company or organization. When byte 7 to byte 8 are of a reserved value (Reserved) of for example, 0×0000, they are assumed to be used in special usage and are prohibited for normal use.

In byte 9 to byte 10 (the area indicated by a reference symbol of 24*b*), the service ID is described. In the service ID, a module ID (Module ID: identification information for non-specific applications) is described. The module ID (Module ID) is internal identification information of a program module for each company or organization, and for example, when a plurality of individual applications of a certain company or organization are installed in a user's smartphone, a module ID can be assigned to each of the individual applications so as to be able to identify the data structure thereof from each other.

In byte 11 (the area indicated by a reference symbol of 24*c*), a frame type (Frame Type) is described. The frame type (Frame Type) indicates the transmission type. The Frame Type is provided to improve the accuracy of communication when communication between devices takes place, and contains a flag and a command that indicate "response required" or "response not required" to the other party. The command can be, for example, to notify a sensor value, to notify a JOB, or to notify a JOB result, etc. With this configuration, mutual communication can be reliably carried out.

Byte 12 to byte 31 (the area indicated by a reference symbol of 25) are of a parameter section (Parameters: transmission information), which is referred to as a communication data section. The parameter section stores a plurality of parameters. Each parameter is constituted by a TL section and a VAL section. The TL section has 1 byte and is constituted by a TYPE field and a LENGTH field. The TYPE field identifies the type (there are int-type, float-type and string-type) of data in the VAL section as to which of the int-type, float-type and string-type it is (in preset hexadecimal number). The LENGTH field indicates the length of the data of the VAL section (in predefined hexadecimal number). In the VAL section, the data of the type specified by the TYPE field and having the length specified by the LENGTH field is described.

Using the above-described description mode, the following information is described, for example. In byte 12 to byte 13 (the area indicated by a reference symbol of 25*a*), a node ID is described, in byte 14 (the area indicated by a reference symbol of 25*b*), an information ID is described, in byte 15 to byte 16 (the area indicated by a reference symbol of 25*c*), a control code is described, in byte 17 to byte 31 (the area indicated by a reference symbol of 25*d*), and in byte 17 to byte 31 (the area indicated by a reference symbol of 25*d*), a data section (status code, identification code, action instructions) and the like are described.

The node ID is identification data of the device which transmits the beacon packet 21, that is, identification data that identifies devices such as an agent, node, smartphone, gateway, etc., from each other.

The information ID indicates what type of information is being sent. Examples of the types are GPS information, sensor information, and the like.

The control code is utilized, for example, when informing that a new situation rule is registered, when informing that there is a change in the situation rule, or informing the rule itself.

For the data (status code, identification code, action instruction code and the like) in the data section, schema information corresponding to the context is utilized. That is, codes with meanings agreed upon in advance by the sender and receiver are used. Further, depending on the type of the context matching service used, raw context data may as well be used.

The information of the above-described areas is generally referred to as attribute information. The attribute information described above is not fixed or limited to those mentioned. The attribute information is basically used to direct the handling of so-called context data. Therefore, in the system operators, the format and content of the attribute information can vary from one to another, and what is important is that the attribute information is present in this area.

Note that in some cases, the data in the parameter section described above is subject to encryption processing. Or as a special case, the data may be compressed using a password. When a password is used between the first device of the first user and the second device of the second user, the respective user can register the password in advance on each respective device. With this configuration, it is designed that the beacon communication between the first device and the second device is automatically decompressed.

<Outline of Operation of Embodiment>

Here, an example of an outline of the operation of one embodiment will be described.

It is first assumed that the service provider (the party which provides information) possesses a first information processor (agent). On the other hand, the service requester (the party who wants information, or the party who wants to receive assistance in providing information) possesses a second information processor (node).

Now, it assumed that the service requester (store) has registered the device ID1 of the second information processor (hereinafter referred to as the first node) and the first context data (for example, melon-shaped bread remaining unsold) in the context judgment section (a register, which will be described later).

It is assumed here that a service requester (customer) registers a device ID2 and second context data (for example, melon-shaped bread lover) of the second information processor (hereinafter referred to as "second node") in the context judgment section (the register, which will be described later).

Further, it is further supposed that the first information processor (hereinafter referred to as agent) has registered the context data "melon-shaped bread discount coupon" in the context judgment section (the register, which will be described later). Note that the agent and the node of the store may be one and the same.

By the above-described setting, the agent can prepare to transmit the context data "melon-shaped bread discount coupon" based on a command from the context judgment section.

The context judgment section determines that the keyword (melon-shaped bread) for (melon-shaped bread discount) and (melon-shaped bread lover) for (melon-shaped bread) are in a matching relationship at the time of registration as described above. The context judgment section then manages the device ID1 of the first node and the device ID2 of the second node as of the same group, taking the keyword (melon-shaped bread) in the context data as a common word. In another words, the first node and the second node are linked up together. Further, at this time, agents are linked up with the first node and the second node taking "melon-shaped bread" as the common word, to be grouped.

The agent can receive the devices ID1 and ID2 of the nodes in the same group from the context judgment section. Let us suppose now that the first node (owned by a customer) enters a communication area of an agent and caries out a broadcast. In this case, since the first node is not an agent, it simply describes only the device ID2 of its own device in the node ID area of the parameter section and carries out the broadcast.

At this time, the agent has received the devices ID1 and ID2 of the same group from the context judgment section, and therefore it can recognize that a device (the first node) grouped by context matching has entered the communication area. The agent then automatically transmits a "melon-shaped bread discount coupon" to the first node as one of jobs or actions. The data of "melon-shaped bread discount coupon" is described in the data section, to be sent. This data (that is, context) may be one that is coded (for example, one subjected to context numbering), which can be done when the system possesses conversion processing functions.

With this configuration, it is possible for the first node (the customer) to automatically obtain the "melon-shaped bread discount coupon" without carrying out any operation or search.

As described above, the first node (customer) can detect that a predetermined situation rule (a state of "context matching" between multiple information devices) has been established because a device ID of its own and a "melon-shaped bread discount coupon" (or predetermined matching notification information) are present in the parameter section 25 transmitted by the agent.

On the other hand, the second node (store) can recognize that the agent has transmitted a "melon-shaped bread discount coupon" in response to the context "melon-shaped bread discount coupon" provided by its own device. That is, it can recognize that the assistance (or CM) to the second node (store) was successful. With this configuration, the system can further enhance the matching effect (that is, obtain enhanced sales promotion). On the other hand, the agent detects, at the time when it detects the device ID1 of the first node from the received signal, that a predetermined situation rule has occurred in the communication area of its own device. That is, the agent (the first information processor) can judge that the first node (the second information processor) is in a state where it is in a predetermined location (in the communication area), the relationship with the first node (the second information processor) is in a state of context matching, and that it is in a state that a first node (a second information processor) other than its own device is present (that is, the state in which multiple information processors are present).

The area where such a situation rule can occur is referred to as a context area in this embodiment.

The above-provided descriptions explain that the first information processor (agent) broadcasts the device ID1 of its own device and the devices ID1 and ID2 of the second information processors (the first node and second node). Then, the first information processor (agent) further transmits context data (a melon-shaped bread discount coupon) as "predetermined matching notification information" (one of jobs or notifications). Apart from this, it may simply transmit "matching" or voice data as a comment.

In this case, when the second information processor (node) can compare context data (or matching confirmation data) stored in its own device with the "predetermined matching notification information" sent from the outside, it can display the context data (melon-shaped bread discount coupon) on its display section. In the case of a smartphone, this comparison capability and display capability can be can be fully equipped by adding respective software thereto.

The above-provided descriptions explain a simple example of operation in the embodiment. However, the basic system of the invention can perform a variety of operations as will be described from now.

<Basic Configuration and Function 1 of Information Processing System>

Figure 2A:
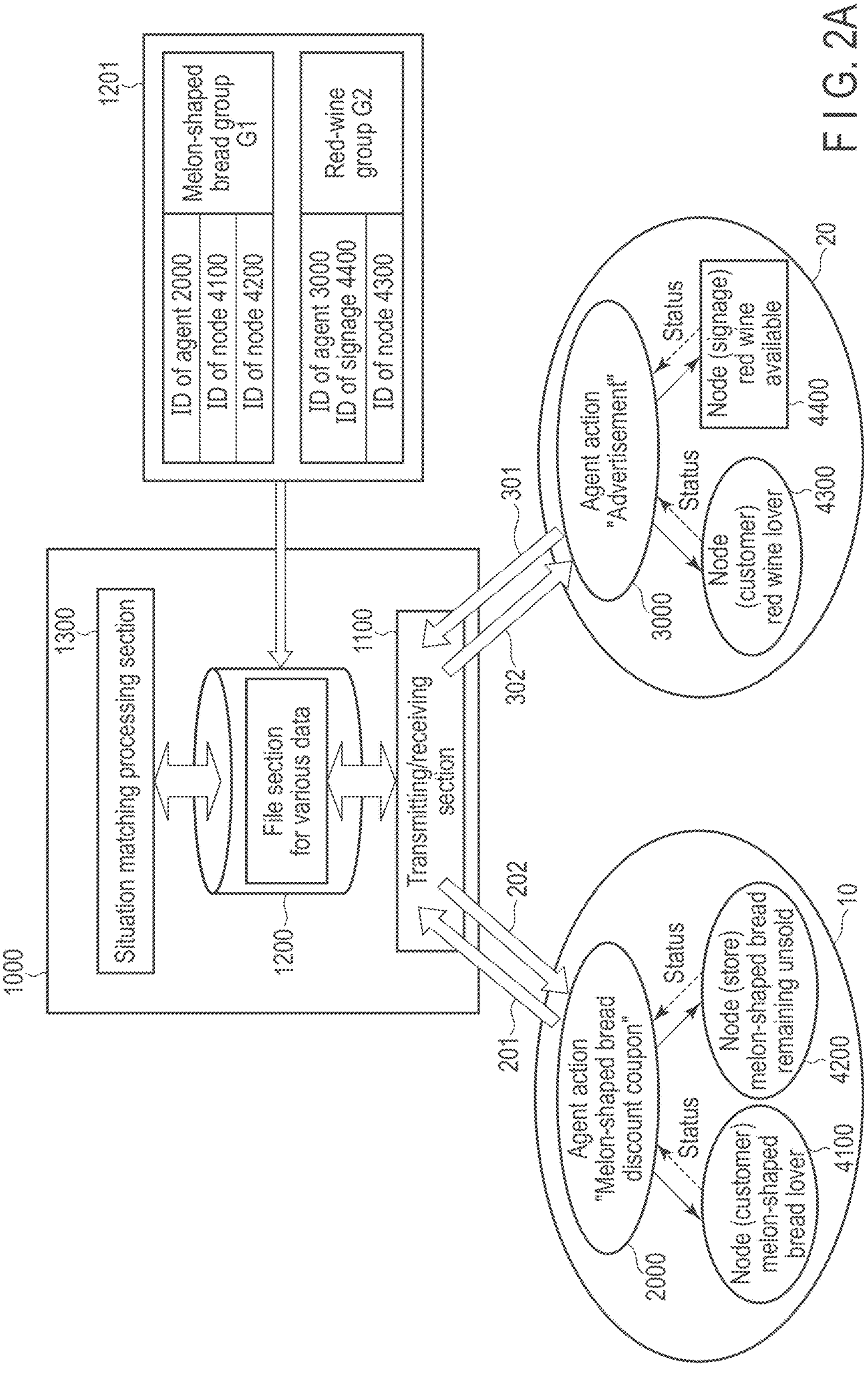
FIG. 2A is a diagram showing a configuration example of the embodiment.

FIG. 2A shows a configuration example of the basics of an embodiment of an information processing system.

In a real system, there may be a number of context areas, but this embodiment shows an example where there are two context areas 10 and 20.

The context area 10 is an area where an agent 2000, a node 4100 owned by the customer, and a node 4200 owned by the store can communicate with each other by broadcast. Note that the agent 2000 may be integrated with the node 4200 owned by the store in some cases.

The context area 20 is an area where an agent 3000 and a node 4300 can communicate with each other by broadcast. Note that the node 4400 is a signage that can be controlled by the agent 3000 and is handled as one with the device ID of the agent 3000 at all times. Alternatively, the signage 4400 may as well be set as a node that carries out a broadcast.

The agents 2000 and 3000 are realized by, for example, gateways, smartphones, personal computers (PCs), tablet PCs and the like. Examples of locations where the agents 2000 and 3000 can be installed in includes various places such as supermarkets, convenience stores, department stores, offices, restaurants, factories, in cars, in hospitals, in flying bodies, along roads, and so on. Such installation locations can as well be "objects" such as lighting fixtures, televisions, signage, pedestrian crossing signals, utility poles, streetlights and the like.

The nodes 4100 and 4200, the node 4300 and the like are portable ones, for example, smartphones, personal computers (PCs), tablet PCs, accessories, watches, bands and the like. Therefore, these nodes can be moved to different context areas. The node 4400 is a signage controlled by the agent 3000, but, naturally, it may as well be a device which carries out beacon communication.

When the agent described above is an in-vehicle type that moves, the node is utilized as a type that is placed at a fixed location. This type of node is, for example, a device with a sensor and is placed on bridges, roads, buildings, construction sites, robots, and the like.

Further, the agents and these nodes can be equipped or mounted onto a moving object, and can as well be used in systems where when a node enters the context area of an agent, they carried out mutual recognition with each other.

The agents 2000 and 3000 can each communicate mutually with the context judgment section 1000 to send and receive data. The context judgment section 1000 is installed in a server, for example. Note that the context judgment section 1000 may be integrated with the agent 2000 or 3000 as once in some embodiments.

The context judgment section 1000 includes a transmission/reception section 1100, various types of file sections (including memories and controllers) 1200, and a situation matching processing section 1300. The transmission/reception section 1100 communicates mutually with the agents 2000 and 3000 each other. When the context judgment section 1000 is placed in the cloud as a server, the context judgment section 1000 and the agents 2000 and 3000 are connected to each other via the Internet. When the context judgment section 1000 is integrated with, for example, the agent 2000 as one, the context judgment section 1000 is connected to the input/output section of the agent by internal wiring lines (including semiconductor boards and flexible boards) or cables.

The context judgment section 1000 includes a file section 1200. The file section 1200 can store various types of files (data, software, attribute data and the like) and further includes a controller (not shown). The software includes programs to perform such processing as context matching, context grouping, reading, data capturing, writing, and outputting and the like. The files and their data are controlled by the controller (not shown).

The context data is registered in the context judgment section 1000 by users using the agents 2000, 3000, and nodes 4100 to 4400 and the like, from the registration system, which will be explained later.

The act of registration is such a case where, for example, the user of the node 4100 registers the context data "melon-shaped bread lover" and the user of the node 4200 registers the context data "melon-shaped bread remaining unsold" to the file section 1200. With this act of registration, the file section 1200 further stores the device IDs of the agents 2000, 3000, and the nodes 4100 to 4200 and the like, as well.

Let us now assume that the following registration is carried out onto the file section 1200. Here, suppose that a user (customer) of the node 4100 and a user (store) of the node 4200 register "melon-shaped bread lover" and "melon-shaped bread remain unsold", respectively. Further, suppose that the agent 2000 has registered the context "melon-shaped bread discount coupon" so as to issue a "melon-shaped bread discount coupon" as an action.

In the meantime, suppose also that a user (customer) of the node 4300 has registered "red wine lover" and a user of the agent 3000 (in this example, a store) has registered the context "red wine advertisement" as an action. In this case, let us suppose that the node 4400 is, for example, a signage (an electronic billboard near the store).

Then, the file section 1200 classifies agent IDs and node IDs (hereinafter collectively referred to as device IDs) for each context by the context matching process, and forms a device ID group for each context (that is, keywords). This group data is stored in a table 1201.

In the example shown in the figure, a melon-shaped bread group G1 is formed as the device ID of the agent 2000, the device ID of the node 4100, the device ID of the node 4200, and the device ID group.

In the meantime, the red wine group G2 is formed as the device ID of the agent 3000, the device ID of the node 4300, and the device ID of node 4400. The device ID of the node 4400 should desirably be registered in the context judgment section 1000 as an associated device (signage) by the agent 3000 as a store.

These group data are stored in the file section 1200 as the table 1201. This table 1201 is updated every few minutes, for example, by an update program. Or, the table is updated once or several times a day according to the content of the registered context (the number of updates can be changed separately by the system administrator). The new registration data is temporarily stored in a buffer memory, which is not shown in the figure, until the update is performed.

As described above, it can be said that the context data registered by the users are each a context linked up with (belonging to) a predetermined agent and also a context linked up with (belonging to) a predetermined node.

Further, in the case where the context judgment section 1000 is provided in a server, the group data associated with the agent 2000 may be sent in advance to the agent 2000 and stored in the memory there (this point will be explained with reference to FIG. 2B). Similarly, the group data associated with the agent 3000 may as well be sent in advance to the agent 3000 and stored in the memory here (this point as well is explained with reference to FIG. 2B).

Further, the node 4200 especially in the store and the agent 2000 in the context area 10 are in a close relationship, and information such as the number of products sold, sales price and the like, obtained by the node 4200 of the store are always notified to the corresponding agent 2000 as a job. Similarly, especially the node (signage) 4400 of the store and the agent (store) 3000 in the context area 20 are also in a close relationship, and the agent (store) 3000 may be configured to be able to directly control the display of the node (signage) 4400 of the store. Naturally, the agent 3000 and the node 4400 may communicate with each other by a broadcast, and the command "advertisement implementation" may be given to the node 4400 by the agent 3000.

When the node 4300 enters the context area 30 by this system operation, the node (signage) 4400 displays an advertisement such as "red wine available".

As described above, the agent 2000 sends job data to the server or the context judgment section 1000, and also sends a discount coupon to the node 4100 in the area. Further, the agent 3000 can carry out commercial advertisement to specific customers at appropriate timing to the node (signage) 4400.

As to these actions, the fact of transmitting a discount coupon by the agent 2000 and the fact of advertising promotion of the signage by the agent 3000 are subjects of job data transmission to the server and the context judgment section 1000.

<System Support to Registration of "melon-shaped bread discount coupon">

In the case where a "melon-shaped bread discount coupon" is registered in the context judgment section 1000, the program for processing discount coupons in the file section 1200 is activated. In the case where a "discount coupon" for another product is registered in the context detection section 1000 as well, the program for processing coupons is similarly activated.

The program for processing the coupon is activated, for example, by using "discount coupon" as a keyword. Then, it determines from which agent the "discount coupon" was sent, and identifies the agent of the originating source. Next, the program adds the attribute information (discount value or discount rate, and issue a time limit (from date and time of start to date and time of end)) set for the "discount coupon" to the agent of the originating source, and transmits it to the agent of the originating source.

The attribute information (discount value or discount rate and issue a time limit (from date and time of start to date and time of end)) set in the "discount coupon" is, in some cases, set by the agent of the originating source (dealer) (specifically, the user operating the agent) or in other cases, by the "wholesaler" of the product to be discounted (specifically, a special user who can operate the context judgment section 1000, or the system administrator). The system administrator sets the above-described attribute information based on instructions from the wholesale store. Further, the issue condition (attribute information) of the "discount coupon" may be determined according to the number of nodes in the context area, which are in the context matching relationship. In other words, a "discount coupon" is issued when the number of nodes is N (set number) or more.

<Example of System Operation Related to Context Area 10>

Next, an example of system operation related to the context area 10 will be described. Here, in this example, the context judgment section 1000 is located on a server, and the table 1201 in the file section 1200 is utilized.

The context of the agent 2000 in the context area 10 is "melon-shaped bread discount coupon", and here the case will be described in which this context is registered in the file section 1200.

<Situation Detection Mode of Agent 2000 in Context Area 10>

Let us suppose now that a broadcast is carried out between the agent 2000 and the nodes 4100 and 4200 in the context area 10 (the operating mode at this time is the situation detection mode by the agent). The agent 2000 transmits at least the device IDs of the nodes 4100 and 4200 together with the device ID of its own device to the file section 1200 of the context judgment section 1000 (this is referred to as a situation notification 201).

Then, the situation matching process section 1300 of the context judgment section 1000 refers to the data file (table 1201) in the file section 1200 and searches for the multiple device IDs that have been sent, out of the device ID group. In the current situation in the context area 10, it is determined that the agent 2000, the node 4100 and the node 4200 belong to a melon-shaped bread group G1. Further, it is determined that the agent 3000 and the node 4300 belong to a red wine group G2. In the example shown in the figure, further, the device ID of the node 4400 is integrated with the device ID of the agent 3000 as a signage that is under control of the agent 3000.

Based on the above-described determination, the file section 1200 notifies the agent 2000 of the device IDs belonging to the melon-shaped bread group (that is, the device ID of the agent 2000 and the device IDs of the nodes 4100 and 4200) (this is referred to as establishment of a situation rule, that is, matching notification 202).

<Matching Reporting Mode for nodes of the agent 2000 in Context Area 10>

Next, let us suppose that after the above-described matching notification 202(, which may as well be referred to as the situation rule establishment notification), a broadcast is carried out between the agent 2000, the nodes 4100 and 4200 in the context area 10 (this operation is the matching report mode by the agent 2000).

Here, the agent 2000 holds the matching notification information (the device ID of its own device and the device ID of the node 4100) based on the function of the data processing section, and therefore it describes this information in the parameter section described with reference to FIG. 1 and executes the broadcast. Then, the node 4100 can detect the device ID of its own, the device ID of the agent 2000 and the "context matching-related information" from the parameter section of the advertisement packet received.

With this configuration, the node 4100 can made some kind of reaction based on the function of its data processing section and attract the user's attention. For example, it can automatically receive a "melon-shaped bread discount coupon" from the agent 2000. Thus, the advertising effect can be further enhanced. Further, the sales promotion can be made.

Other reactions of the node 4100 may include blinking of light, outputting of notification sound by voice, vibration, or displaying of text. This notification method can take various forms depending on the type and performance of the node 4100. In the case of a simple accessory type, blinking or voice notification or vibration notification can be used.

Or in the case of a smartphone type, additionally, it can display text, images or the like, based on the functions of the data processing section. For example, when the agent 2000 describes the context "melon-shaped bread discount" in the parameter section and transmits it, the user of the node 4100 can see the text display of the "melon-shaped bread discount" or hear the audio voice output, or even view a melon image. It is only natural as explained earlier that the "melon-shaped bread discount coupon" can be received.

When the node has the function to compare contexts, the agent 2000 may as well transmit predetermined matching notification information. The predetermined matching notification information may be, for example, "melon-shaped bread discount" or the like. With this configuration, it is possible for the user who owns the node 4100 to easily recognize that there is a user nearby who provides a service, at least with respect to the "melon-shaped bread".

On the other hand, the agent 2000 can grasp how many "melon-shaped bread-loving" users (such as the nodes 4100 and the like) are in the communication area each time the "situation notification" and the "matching notification" are executed. With the thus grasped information, the agent 2000 can collect data on the number of "melon-shaped bread-loving" users and the sales volume of the melon-shaped bread, and calculate the correlation between the number of users and the sales volume. Further, this is achieved by direct advertising, which notifies the given server of its job information. The job information is the data collected by the agent and/or the results of the calculation of the correlation (ratio, etc.) between the number of users and the sales volume, described above.

The agent 2000, when counting the nodes in the communication area, is equipped with a counting program that counts the device ID of the node 4200 as a store as well. But, the agent 2000 holds in advance the device ID of the node 4200 (store), which is the administrative jurisdiction. For this reason, the counting program of the agent 2000 is configured to subtract the device ID of the node 4200 (store) and count the number of nodes that are actually "customers".

<Example of System Operation Related to Context Area 20>

Next, an example of system operation related to the context area 2 will be described.

Now, such a case will be explained that the context of the agent 3000 in the context area 20 is "red wine for sale" and this context is registered in the file section 1200.

In the case of the context area 20, it is assumed that the node 4300 owned by the customer has registered "red wine lover" in the file section 1200. Further, it is assumed that the agent 3000 owned by the store has registered "red wine for sale" in the file section 1200. Furthermore, the agent 3000 has registered the node (signage) 4400 as a related device in the file section 1200.

In this case, the agent 3000, the device ID of the node 4300, and the device ID of the node 4400 are classified in the red wine group G2.

<Situation Detection Mode of Agent 3000 in Context Area 20>

Let us suppose now that a broadcast is carried out between the agent 3000 and the node 4300 in the context area 20 (the operation at this time is the situation detection mode by the agent). Then, the agent 3000 transmits at least the device ID of the node 4300 together with the device ID of its own device to the file section 1200 of the context judgment section 1000 (this operation is referred to as a situation notification 301).

Then, the situation matching processing section 1300 of the context judgment section 1000 refers to the table 1201 in the file section 1200 and searches for the multiple device IDs sent thereto out of the device ID group. In the current situation (situation), it is determined that the agent 3000 and the node 4300 belong to the red wine group G2 (determination of situation rule).

Based on this determination, the file section 1200 notifies the agent 3000 of the multiple device IDs (the device ID of the agent 3000 and the device ID of the node 4300) belonging to the red wine group G2 as a red wine group (this operation is referred to as matching notification 302).

<Matching Reporting Mode with respect to Node by Agent 3000>

After the above-described matching notification 302 is made, a broadcast is carried out between the agent 3000 and the node 4300 in the context area 20 (this operation is referred to as the matching reporting mode by the agent 3000).

The agent 3000 holds the matching notification information (the device ID of its own device and the device ID of the node 4300) and describes this information in the parameter section described with reference to FIG. 1 to execute the broadcast. Then, the node 4300 can detect the device ID of its own and the device ID of the agent 3000 from the parameter section of the received advertisement packet. With this configuration, the node 4300 can make some kind of reaction and attract the user's attention. This method of attracting attention is similar to the method described above in connection with the node 4400.

Further, in this case, the agent 3000 notifies the node (signage) 4400 to display "red wine for sale" as an automatic action. With this configuration, the customer who owns the node 4300 can see the nearby signage to be able to recognize with high probability that a "store selling red wine" is nearby. In this manner, the effectiveness of the advertising can be further increased. Further, the sales promotion can be made.

Note that in the case where the agent 3000 is "selling melon-shaped bread" as well and further, another node (not shown) has registered the context "melon-shaped bread lover", the second matching notification information will be further processed. In such a case, these multiple matching notification information can be broadcast at the same time or with a time lag.

In addition, the agent 3000 notifies the file section 1200 of the context judgment section 1000 or a separately designated server of that the "advertisement of red wine" has been carried out as a job. Here, the billing data in the billing table of the "red wine distributor" registered in the context judgment section 1000 or the designated server may be updated for the billing process to be carried out. In this case, the billing here is a direct commercial success fee.

<Prior Deployment of Matching Notification Information>

The above-provided explanation is directed to such a case that the context judgment section 1000 is provided in the server and the context judgment section 1000 owns the table 1201(, which is a table grouping agent IDs and node IDs by context). Further, in this case, agents are supposed to make situation notifications 201 and 301 and receive matching notifications 202 and 302 from the context judgment section 1000.

However, the information on the matching notifications 202 and 302 for the agents 2000 and 3000 may be deployed prior to the agents 2000 and 3000, respectively. According to this method, it is possible to reduce the load on the server (the context judgment section) and expedite the transmission of matching reports and discount coupons by the agents to the nodes.

Figure 2B:
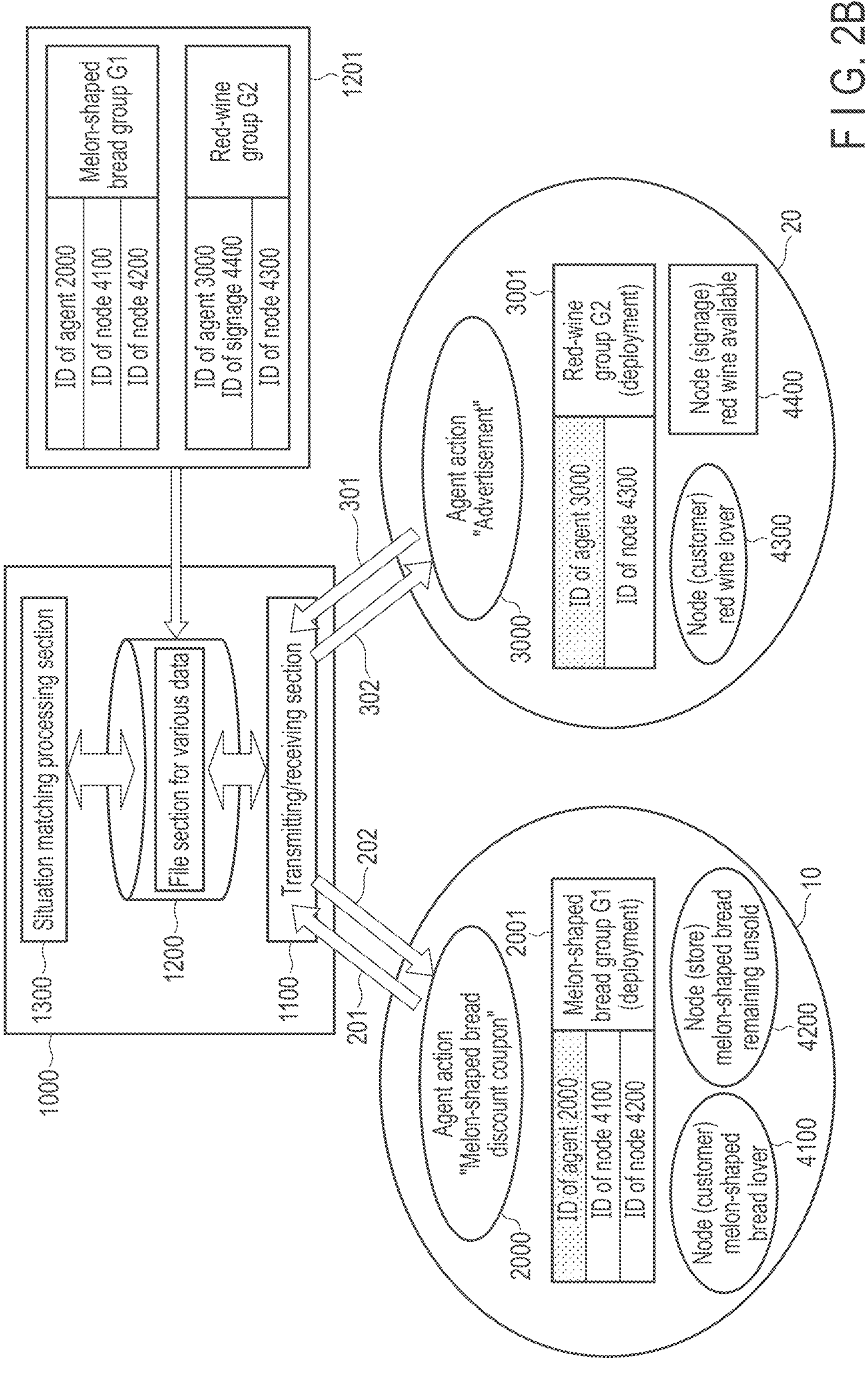
FIG. 2B is a diagram showing another configuration example of the embodiment.

FIG. 2B shows an embodiment in which relevant matching notification information is deployed to an agent prior thereto. The same parts shown in FIG. 2A are denoted by the respective same reference symbols, and redundant explanations are omitted. This embodiment is characterized by the processing after the agents 2000, 3000, and the nodes 4100, 4200, and 4300 register their own device IDs and contexts in the file section 1200 of the context judgment section 1000, respectively.

The file section 1200 of the context judgment section 1000 creates a table 1201 as described previously. Here, the context matching process is performed to classify the device IDs of the agents and nodes by context (keywords).

As described earlier, the context matching process section 1300 transmits, when the situation notifications 201 and 301 are sent to the context judgment section 1000 from the agents, the matching notifications 202 and 203 to the agent 2000 and the agent 3000 as a reply action.

Note here that the situation matching process section 1300 may as well carried out the matching notification in advance to the agents 2000 and 3000 after the updating process of the table 1201 is executed. That is, for the agent 2000, a sub-table 2001 containing the device IDs of the nodes belonging to the group of the context registered by the agent 2000 and the device ID of the agent 2000 is deployed in advance. In the example shown in the figure, these are the device IDs belonging to the melon-shaped bread group G1 (ID of 4100, ID of 4200, and ID of 2000).

Further, for the agent 3000, a sub-table 3001 containing the device IDs of the nodes belonging to the group of the context registered by the agent 3000 and the device ID of the agent 3000 is deployed in advance. In the example shown in the figure, they are device IDs belonging to the red wine group G2, namely, the ID of the node 4300, the ID of 4400 and the ID of the agent 3000.

As described above, the table 2001 is pre-deployed (or prearranged) to the agent 2000, and the table 3001 is pre-deployed (or prearranged) to the agent 3000. In this status, when the broadcast is carried out, each of the agents 2000 and 3000 can immediately make a matching report and transmit a "discount coupon" immediately. Further, the agent 3000 can make the node 4400, which is a signage, to carry out advertisement, immediately.

In other words, the operation of the agent 2000 can be described as follows. That is, when the agent 2000 carries out the broadcast, it automatically describes the device ID of the node in the melon-shaped bread group G1 and the device ID of its own device in the parameter section described in FIG. 1, and executes the broadcast. Then, in this case, the node 4100 is present in the context area 20, and therefore this node 4100 can obtain some kind of reaction. Further, the node 4100 broadcasts the device ID of its own device.

The agent 2000 then recognizes that the node 4100 is present in the context area and therefore it can immediately transmit a "melon-shaped bread discount coupon" to the node 4100.

Here, let us suppose that a user (that is, a customer) of the node 4100 uses a coupon in the mode 4200 (that is, a store) to purchase melon-shaped bread. This sales information (job information or report information) is transmitted from the node 4200 to the agent 2000. The agent 200 also transmits the sales information to the context judgment section 1000, or the server of the wholesaler of the melon-shaped bread, or the manufacturer thereof. The wholesaler or manufacturer of the melon-shaped bread can request the context judgment section 1000, the operator or the system administrator of server to adjust the number of coupons to be issued, the date limit for issuing coupons, the time zone for issue and the like, depending on the sales situation. Thus, in this system, the issuing of coupons can be implemented or changed immediately according to the number of products sold, the time zone of the day, and the date and time.

When the agent 3000 carries out a broadcast, it automatically describes the device ID of the node in red wine group G2 and the device ID of its own device in the parameter section described with reference to FIG. 1 and executes the broadcast. Then, the node 4300 is present in the context area 20 in this case, and therefore the node 4300 makes some kind of reaction. Further, the node 4300 broadcasts the device ID of its own device.

The agent 3000 then recognizes that the node 4300 is present in the context area, and therefore it can immediately transmit a message of "red wine available" to the node (signage) 4400. In this manner, at the node (signage) 4400, immediately an audio voice output or display of "red wine for sale" can be obtained. Note here that when a node (not shown) that has registered "red wine lover" moves from the context area 10 to the context area 20, the node can immediately receive the service from the agent 3000.

As described above, the agents 2000 and 3000 can transmit a "discount coupon" to each of the nodes detected in the context area and context-matching as an automatic action, and thus the CM-effect is high and direct. Therefore, the CM efficiency is high.

Figure 2C:
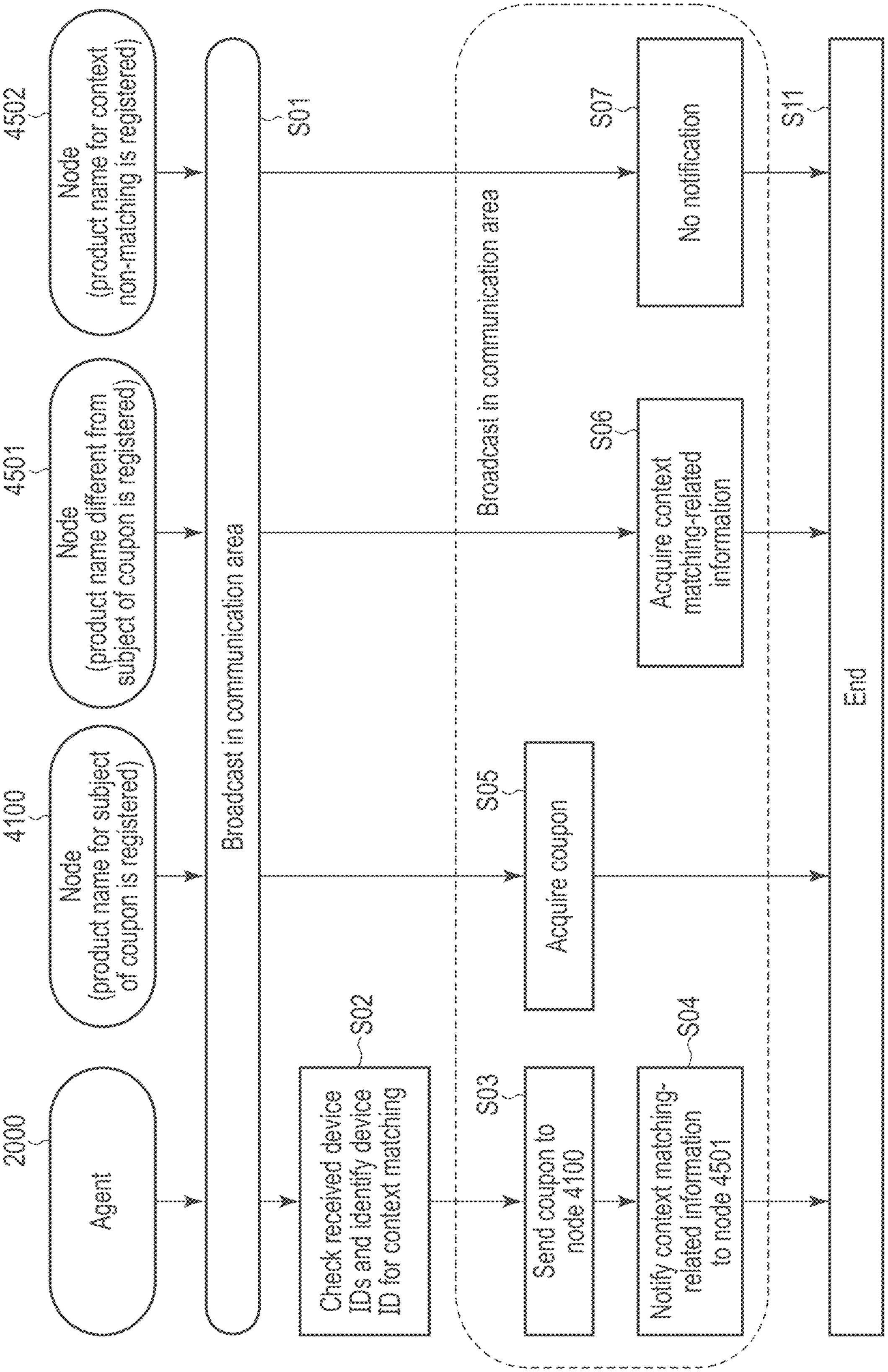
FIG. 2C is a flowchart showing an example of one operation of the embodiments.

FIG. 2C is a flowchart showing an example of operation when the agent 2000, the node 4100, the node 4501, and the node 4503 are in the communication area (context area) at the same time and they carry out a broadcast.

Here, it is assumed that the agent 2000 owns and can issue a "melon-shaped bread discount coupon". Further, it is assumed that the agent 2000 has registered "peaches for sale" for example, in the context judgment section 1000.

Further, it is also assumed here that the node 4100 has registered "melon-shaped bread lover" in the context judgment section 1000, that the node 4501 has registered "peach lover", which is different from the subject of the coupon, in the context judgment section 1000, and that the node 4502 has registered "hamburger lover" in the context judgment section 1000.

Let us suppose now that the agent 2000, the node 4100, the node 4501, and the node 4503 carry out a broadcast at the same time in the communication area (context area) (S01). Then, the agent 2000 checks the received device IDs (device ID of each of the nodes 4100, 4501 and 4503) and identifies the device IDs in the context matching relationship (S02).

Further, the agent 2000 determines that the device ID of the node 4100 is of the "melon-shaped bread group G1" and further determines that the device ID (node 4100) is a subject of coupon distribution. Thus, the agent 2000 describes data that pairs the device ID of the node 4100 with the coupon data "melon-shaped bread discount coupon" in the parameter section shown in FIG. 1 and transmits it. More specifically, the device ID of the node 4100 and "melon-shaped bread discount coupon" are described in the data section and transmitted (S03). In this manner, the node 4100 can acquire the "melon-shaped bread discount coupon" (S05).

Further, the agent 2000 determines that the device ID of the node 4501 is of a "peach loop GX". In this case, the agent 2000 describes data that pairs the device ID of the node 4501 with "peaches for sale" in the data section shown in FIG. 1 and transmits it to the node 4501. In this manner, the node 4501 can acquire the "context matching-related information" of "peaches for sale" (S06).

Furthermore, the agent 2000 also determines that the device ID of the node 4502 is not a subject of the service. In this case, the data related to the node 4502 is not described in the parameter section shown in FIG. 1. Therefore, the node 4502 does not obtain any "context matching-related information" from the agent 2000 (S07). Then, the process based on the broadcast (S01) is completed (S11).

As described above, this embodiment comprises a first information processor (agent) that registers a first context in the context judgment section and a second information processor (node 4100) that registers a second context in the context judgment section.

Then, the first information processor and the second information processor are characterized by comprising a judgment section which carries out beacon communication with each other and judges the context-related information contained in the beacon packet. The first information processor comprises a data processor that processes the result data as node notification data and the second information processor comprises a data processor that processes the result data as user notification (display or voice or vibration) output data, when the result data of the judgment indicates that the first context and the second context are in a matching relationship. This embodiment further extends to an information processing system or a method related to this system, or a device related to this system, or a processing program related to this system.

In the system shown in FIGS. 2A and 2B, after the agent 2000 detected a node in the context matching state, it further automatically deliver coupons and other information to that node in the next broadcast. Thus, it can be said that this system executes the appropriate sales precisely to those who are most likely to be in the business flow. In the above-provided example, the system can certainly provide a "melon-shaped bread discount coupon" to a consumer who is a "melon-shaped bread lover". In addition, the sales effect can be enhanced.

Note here that the transmission of the above-described "discount coupon" is not limited to agents, but may as well be carried out from the server to the nodes. In other words, the server can grasp the status of multiple agents (for example, the number of context matching achieved). Thus, by managing the issuance of "discount coupons" on the server side, the server can manage the overall number of "discount coupons" issued, or their allocation to each agent.

As described above, the method of transmitting a discount coupon to nodes is a transmission method for agents by broadcast, but such a method is possible for the server as well to transmit to agents or nodes via the Internet or some other network.

FIG. 2D shows an example of a method for a server 7A communicates with agents or nodes via a network such as the Internet.

The server 7A includes a context judgment section 1000, an application interface (API) 7A1, a sales performance management unit 7A2, and a coupon management unit 7A3. 7A1 functions as an interface between the context judgment section 1000 and the sales performance management unit 7A2.

The sales performance management unit 7A2 receives JOB information (number of products sold, sales volume, sales data, etc.) from a plurality of agents 2000 and 3000 via API 7A1 from the context judgment section 1000, grasps the sales performance, and then determines attribute data (corresponding to the control code and contents of description in data section shown in FIG. 1) such as the number of coupons to be issued, the agents to whom coupons should be distributed, and the time of day for distribution. In reply to this determination, the coupon management unit 7A3 can transmit coupons to the node 4100, for example, via API 7A1 and the context judgment section 1000. Naturally, in this case, the server 7A grasps the device ID, e-mail address and the like of each agent or node. Each agent or node registers its device ID, e-mail address, etc. when it registers the context of its own device (likes melon-shaped bread) to the context judgment section 1000. This registration data is indirectly utilized by the coupon management unit 7A2 via API.

When an agent that is permitted to issue a coupon is determined by the coupon management unit 7A3, the server 7A may transmit a "discount coupon" directly to this agent in advance via the network. Further, when the context judgment section 1000 determines context matching, the "discount coupon" may be transmitted directly to the corresponding node via the network.

<Setting System for Smooth Operation of Basic System>

As described above, this system appropriately provides service information from the "user on the side of providing service information" to the "user on the side of wanting service information", starting from the rule establishment of the situation. In order to realize this mechanism in a variety of ways, the following setting system can be additionally introduced into this system to further demonstrate its value.

Figure 3:
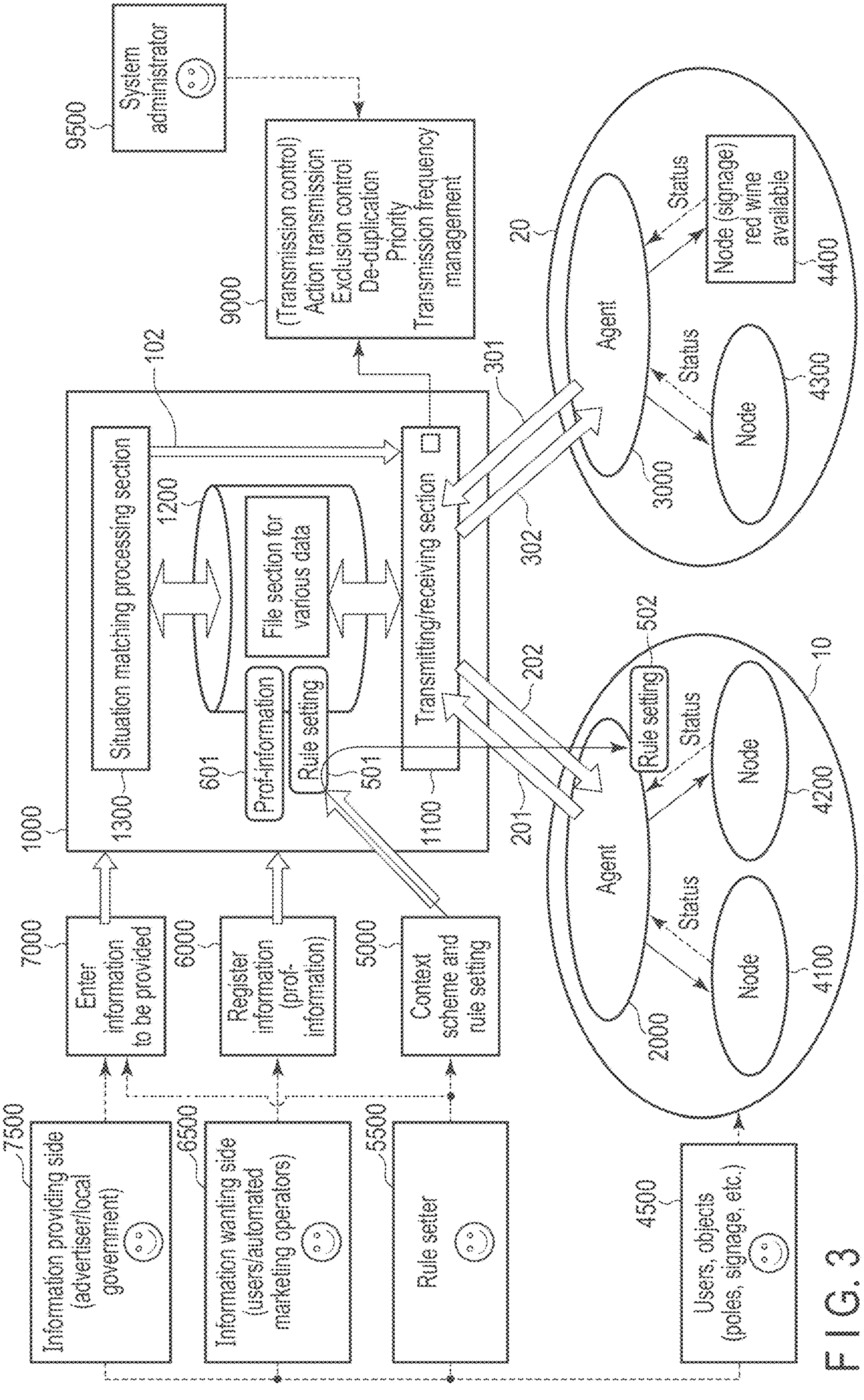
FIG. 3 is a diagram showing a configuration example of the embodiment, to which various setting functions are further added to the embodiments of FIGS. 2A and 2B.

FIG. 3 shows various types of setting systems for the basic system to smoothly operate. Note that in the following figures, the same parts shown in the blocks previously explained are denoted by the respective same reference symbols, and redundant explanations are omitted.

<Context Scheme and Rule Setting System>

In order to set the "rules of the situation" described above, a context scheme/rule setting section 5000 is used. The context scheme/rule setting section 5000 is mainly made full use of, for example, by a rule setter 5500 who devises the form (type, etc.) of information service while utilizing this system, and the user (business owner, service operator, or service schemer or the like).

The rule setter 5500 designs a mechanism for users on an "information providing side" and on a "side who want information" to "provide information" and "receive information" in consultation with users (business owners, service operators, local governments, service schemers or the like). The mechanism may as well be referred to as an information processing procedure.

The above-listed business owners, service operators, local governments, service schemers or the like may be a retailer of various types of products, parents of children (Parent-Teacher Association (PTA)), a public organization such as a local government, a member of a school alumni association, a company or the like, or the rule setter 5500 itself, as well.

Sales retailers wish to promote their sales of commercial products. The commercial products are various articles to be sold, including include foods, various general goods, cloths, industrial products, parts, houses and the like, and even securities and real estates, etc.

Parents of children wish to check the safety of their children going to school.

Public agencies wish to check the range of activities of the elderly.

Committee members of school alumni associations wish to search members of the alumni associations.

Building managers wish to reduce energy consumption in their buildings.

Additionally, managers of large-scale supermarkets and event hall operators wish to set up customer flow lines to guide customers efficiently.

These services are referred to, for example, as "sales service of unsold products" or "product sales promotion service", "child monitoring service", "elderly monitoring service", "meetup detection service", "building energy saving management service", "customer flow line setting service", "meetup service", "hobby/club/alumni association matching information providing service" and so on.

The rule setter 5500 designs a "rule execution program" that is suitable for each of the above-described services and easy for users to use, and an "information input template" to enter information for the program to process.

The contents of rule settings may differ from one case to another depending on the user who actually uses this system, and the rule setter may as well differ according to the contents of the rule settings. For example, in the "product sales promotion service", sales promotion methods (elements that construct the rule setting situation) may differ from one store to another, and sales promotion methods (elements that construct the rule setting situation) may differ depending on the products handled (daily goods, precious metals, passenger cars, etc.).

For ease of understanding, an example of the use of "sales service for unsold products" will be described. The mechanism of the "sales service for unsold products" is designed by the rule setter 5500 in the context scheme/rule setting section 5000. In order to operate the "sales service for unsold products", a "rule execution program" and an "information input template" are required.

The user who requests the setting of the situation, that is, the rule setter 5500, is, for example, a manager of a convenience store, supermarket, or department store, or a member of a PTA (Parent-Teacher Association) or a public organization such as a local government, or a school alumni association, or a company or the like.

The rule setter 5500 prepares its own agents. The multiple nodes are unspecified, such as customers visiting a store, children who need to be looked after, the elderly, etc.

The rule setter 5500 designs what kind of state (placement or location relationship, mutual detection method of nodes and agents, and detection contents) is planned between multiple nodes and agents. For example, it is designed that the preceding agent 2000 can set up its communication area (context area) 10, and the nodes can be detected in this communication area. In order to make the nodes detectable, it is also determined what kind of context matching is planned. In the previous example, the context is "melon-shaped bread remaining unsold" and the keyword is set to "melon-shaped bread", for example.

Note here that in supermarkets and department stores, there are numerous products handled. Further, stores selling expensive precious metals, car dealers and the like may need in some cases to limit the number of visitors to their stores. In such situations, it is necessary to devise a method of how to carry out matching notification for the users.

In order to achieve this, discussions and arrangements are made to devise a way to enter product names into the template (for example, automatically importing product names from a database, manually inputting product names, etc.). Further, when matching notifications are made from the context judgment section 1000 to the agent, arrangements are made to enable the setting of notification conditions. The notification conditions include, for example, notification frequency and exclusion of certain notification recipients. Here, it is only natural as explained earlier that arrangements are also made as to in what situation, instructions to issue the "discount coupon" are carried out, at what date and time the issuance instructions are to be made, and whether changes or modifications to the instructions are allowed to be made.

As described above, in the context scheme/rule setting section 5000, a rule setter who is familiar with the type of business of the user (agent owner) creates a rule execution program and an information input template. The system is then designed so that the user can select the desired template and enter the necessary setting data.

In order to do this, the rule setter may design a field in the template to enter attribute information (which is the control code, data section, etc. described with reference to FIG. 1) attached to the service information (context).

The attribute information further includes information such as the advertising time zone of the context "melon-shaped bread remaining unsold", the validity period of the context, and the like. Further, there is specified information which indicates the length of the data section (length of the context), the language and the like. Furthermore, the context judgment section may as well be used for various types of objects other than the context classification processing. In this case, information which specifies the object is added to the attribute information. For example, there is information which indicates whether the context is encrypted with a password or not. In addition, the attribute information may as well be provided with a field for entering items to be entrusted to the system administrator 9500, which will be described later. The items to be entrusted include, for example, the frequency of transmitting advertisements (matching-related information).

The "rule execution program" and "information input template" created in the context scheme/rule setting section 5000 are stored in the data file section 1200 as rule setting data 501. The rule setting data 501 may as well be transmitted to the agent 2000 in advance as rule setting data 502.

As described above, this embodiment comprises a first information processor that registers a first context in the context judgment section and a second information processor that registers a second context in the context judgment section. The first information processor and the second information processor are equipped with a judgment section that carries out beacon communication with each other and judge context-related information contained in beacon packets.

The first information processor comprises a data processor that processes the result data as node notification data and the second information processor comprises a data processor that processes the result data as user notification (display or voice or vibration) output data, when the result data of the judgment indicates that the first context and the second context are in a matching relationship. Further, it is a rule setting system that can be connected to the context judgment section and is used to design user service forms by setting rules by which the matching relationship can be established, and it comprises a rule setting section that provides input sections for entering at least contexts and device IDs as input elements for setting the rules.

<Information Registration System 6000>

As described above, various types of templates are created in the context scheme/rule setting section 5000. The information registration system 6000 is a system for registering various data using templates and software designed by the rule setter. This information registration system 6000 is used by the user 6500 who is on the "side where information is wanted" to enter specific context data and the device ID of the information processor of its own using the above-described input information template.

The "user on the side where information is wanted" registers information(, which may as well be referred to as profile information or prof-information). In the case of the previous example, the user of the node 4100 registers "melon-shaped bread lover". Or the user of the node 4300 registers "red wine lover". Or, the user of the node 4200 registers "melon-shaped bread remaining unsold". These information items are registered in the data file section 1200 as profile information 601.

Further, the information registration system 6000 may as well be utilized for automated marketing operators as follows.

In the case of the above-described context area 10, when a context matching for "melon-shaped bread" is established, the agent 2000 notifies the job information to the context judgment section 1000. Here, the job information includes the number of melon-shaped bread sold within a certain time as well after the "predetermined situation" is established.

Therefore, the automated marketing operator also prepares a "survey agent" in the context judgment section 1000, which can count the number of nodes of "melon-shaped bread lover" as well as the agent 2000. This "survey agent" receives data on the number of melon-shaped bread sales notified to the melon-shaped bread wholesaler from the agents of a number of convenience stores. Here, depending on the average number of melon-shaped bread sold on that day or over the next few days, or depending on the time zone of day, the automated marketing operator (the "survey agent") can notify each convenience store of the discount rate for melon-shaped bread, or instructions of issuing the "melon-shaped bread discount coupon" and the number of coupons to be issued.

The automated marketing operator and the melon-shaped bread wholesaler may be the same. Thus, the "survey agent" can give instructions to each convenience store agent to issue coupons according to the sales status of the melon-shaped bread.

Alternatively, the "survey agent" can issue instructions to the convenience store to vary the discount rate for special items (for example, boxed lunches, fresh foods, etc.) according to the time zone of day. Such instructions may be further input via the agent to a signage control system located in the storefront or inside the convenience store.

The prof-information 601 contains the device ID of the information processor used by the "user on the side who wants the service information". Then, the prof-information described in the template contains the context related to the wanted information. The contexts are, for example, "melon-shaped bread lover", "red wine lover" and the like.

Further, as the attribute information of the prof-information 601, attribute information indicating that the registration information is from "a user (information processor) on the side who wants the service information" is attached. Note that there are various types of attribute information, and therefore there are codes and symbols that have been agreed upon in advance as headers(, which may as well be referred to as schema information) according to the type of attribute information.

As the attribute information, there may as well be condition data, matching restriction data and the like. The condition data includes the validity period of the context and the like.

The matching restriction data is data that treats a matching as unestablished when there is a special condition present, even if context matching between this information processor and some other information processors is established. For example, the matching restriction data is data by which it can be determined that the grouping program in the data file section 1200 as an unestablished matching if a predetermined device ID (especially an agent) or the name of a predetermined rival store or the like is attached to the context.

For example, in connection with the previous examples shown in FIGS. 2A and 2B, let us suppose that the agents 2000 and 3000 are rival stores. In such a case, in the case where the stores of the agents 2000 and 3000 register the context data in the file section 1200, they may register the information of the rival stores.

When the stores of the agents 2000 and 3000 deal with the same product (for example, melon-shaped bread), it is meant that the device IDs of the agents 2000 and 3000 are present in the melon-shaped bread group G1. In this case, when information on the rival stores is included in the context data, the context judgment section 1000 divides the melon-shaped bread Group G1 into two groups, a melon-shaped bread Group G1-1 for the agent 2000 and a melon-shaped bread Group G1-2, to be managed.

Then, when the context judgment section 1000 carried out a matching notification to the agent 2000, it transmits the device ID contained in the melon-shaped bread group G1-1, whereas when carries out a matching notification to the agent 3000, it transmits the device ID contained in the melon-shaped bread group G1-2.

With the above-described operation, when device IDs in one group are to be transmitted to one agent, the device IDs in the group are transmitted so that the device IDs of other agents do not coexist. In this manner, each agent can eliminate unnecessary processing steps.

Note that the above-description also applies for the case where the table 2001 is deployed to the agent 2000 in advance in this system, as described with reference to FIG. 2B.

As described above, this embodiment comprises a first information processor that registers a first context in the context judgment section and a second information processor that registers a second context in the context judgment section. The first information processor and the second information processor are equipped with a judgment section that carries out beacon communication with each other and judges context-related information contained in beacon packets.

When the result data of the judgment indicates that the first context and the second context are in a matching relationship, the following processes are executed.

That is the first information processor comprises a data processor that processes the result data as node notification data, and the second information processor comprises a data processor that processes the result data as output data for user notification (display, audio voice or vibration).

Further, a profile information input system for setting in advance profile information containing the device ID of each of the first information processor and the second information processor and their respective context data, which are concrete judgment elements of the matching relationship, can be connected to the context judgment section.

<Provided Information Input System 7000>

The provided information input system 7000 is a system for "a user on the side who provides service information" to input "provided information" to the context judgment section 1000 using a template. The programs for input and templates in this provided information input System 7000 as well are created by the rule setter who has set up the situation.

The information to be input to the context judgment section 1000 of this system by the user 7500 of the information providing side includes the device ID of the information processing unit (agent or node) for providing information used by the "user of the information providing side" and at least the context. The context is, for example, that the previous agent 2000 registers "melon-shaped bread discount coupon", or that the user of the node 4200 registers "melon-shaped bread remaining unsold", or that the agent 3000 registers advertising data for signage (for example, red wine available).

This input information may be accompanied by attribute information (a code agreed upon in advance) so that the context judgment section 1000 can determine that the information is from the user 7500 of the information providing side.

The attribute information of the information processor for providing information may be accompanied by matching restriction data. Here, let us suppose that there is a third information processor for which context matching with the information processor for providing information is established. However, depending on the content of the attribute information of the third information processor, it may be preferable to make a final judgment as a matching unestablished (not to provide service information). For example, if the information to be provided is "discounted alcohols for sale", there may be a case where the user attribute information of the third information processor contains age data of 14 years old or younger or 20 years old or younger, and "alcohol for sterilization" is described as the context. In such a case, the situation matching processing section 1300 of the context judgment section 1000 judges that matching between the third information processor and the information processor for providing information is unestablished.

The attribute information is utilized in order to identify the agent to which the "provided information" is to be transmitted, or conversely, to identify the agent that does not transmit the "provided information". For example, in the examples shown in FIGS. 2A and 2B, when the agent 2000 registers "melon-shaped bread discount coupon", the agent 3000 may in some cases be identified in the attribute information as the agent that does not transmit "provided information". For example, the name, telephone number, address or the like of the agent 3000 may be used for the method of describing the attribute information.

The user on the side who provides the situation may as well be the rule setter 5500 itself explained earlier.

As described above, this embodiment comprises a first information processor that registers a first context in the context judgment section and a second information processor that registers a second context in the context judgment section. The first information processor and the second information processor are equipped with a judgment section that carries out beacon communication with each other and judges context-related information contained in the beacon packets.

When the result data of the judgment indicates that the first context and the second context are in a matching relationship, the following processes are executed.

That is the first information processor comprises a data processor that processes the result data as node notification data, and the second information processor comprises a data processor that processes the result data as output data for user notification (display, audio voice or vibration).

Further, there is a provided information input system which can be connected section. The provided information input system is for inputting the result data in advance to be given to the information processor. The result data will be in the matching relationship and to be provided to the other party.

<General User Input System 4500>

The general user input system 4500 is a system used by users who own nodes that are detected or non-detected depending on the situation set by agents or gateways. The input programs and templates used in this user input system 4500 as well are created by the rule setter who has set up the situation.

The user input system 4500 is a system in which the previously described nodes 4100, 4200, and 4300, along with their respective device IDs, register contexts such as "melon-shaped bread lover", "melon-shaped bread remaining unsold", "red wine lover", "red wine for sale, melon-shaped bread for sale" and the like in the file section 1200. The user input system 4500 is designed for general users to register context data at any time. Further, it is also possible to delete context data as needed.

The users who use this user input system 4500 are users who enter the context constructed by the rule setter via the information registration system 6000, or enter the context via the information input system 7000 previously described by utilizing the template. The input information includes the device ID of the information processor used by the user and the context. Further, various types of attribute information may be input.

<Transmission Management for Carrying Out Matching Notification>

Further, this system is provided with a transmission management system 9000 for the case where matching notifications 202 and 302 and situation notifications are made by the system administrator 9500. The transmission management system 9000 controls the transmission/reception section 1100. When the transmission/reception section 1100 carries out matching notifications 202 and 302, action transmission is executed under the control of the transmission management system 9000. The action transmission means, for example, transmission based on exclusive control of transmission operations, elimination of duplication of transmission operations, transmission by priority, and management of transmission frequency.

Regarding Exclusive Control:

It is a mechanism in which the transmission/reception section 1100 carries out, when notifying matching to a large number of agents or gateways, matching notifications basically at an even frequency by setting the order. However, some agents and gateways may want matching notifications more frequently than others, depending on the "time zone of day" or "day", while others may want them less frequently. In such cases, matching notifications to agents and gateways that need less frequent matching notifications are exclusively controlled. For example, when a store is closed on a regular holiday, matching notifications may not be necessary. Also, when a store is open only in the afternoon, matching notifications in the morning may be unnecessary or set to a minimum number. Under these circumstances, each agent or rule setter decides the content of the above-described exclusive control by discussing with the system administrator 9500 regarding the exclusive control.

Regarding Control by Eliminating Duplication:

For example, there may be multiple (for example, two) similar agents in the same context area. Then, the context judgment section 1000 is notified by the two agents of the device IDs of the same node from two locations. This means that the context judgment section 1000 transmits the device IDs of the same node to the two agents. In such a case, the device IDs of the same node are transmitted to the two agents alternately at different times so as to avoid duplicate transmission, which is a control by duplicate elimination.

Regarding Control by Priority:

For example, in the case where multiple agents are connected to the context judgment section 1000, the agents may differ in size from one to another. Further, the service contents and scale may vary from one agent to another, for example, an agent (or gateway) of an emergency hospital, agent (or gateway) of a public institution, an agent of a supermarket, an agent of a convenience store, and the like. Furthermore, depending on the season, some agents may be busy in activity (busy) and some may be not busy (free). In such cases, matching notifications are preferentially transmitted to agents who require immediacy or are busy.

Regarding Control by Transmission Frequency Management:

The context judgment section 1000 has a mechanism to basically transmit matching notifications to each agent (or gateway) at an equal frequency by setting the order. For this purpose, the number of matching notifications to each agent (or gateway) within a certain period of time is adjusted to be equal.

According to the embodiment as described above, it comprises a first information processor that registers a first context in the context judgment section and a second information processor that registers a second context in the context judgment section. The first information processor and the second information processor are provided with a judgment section that carries out beacon communication with each other and judges the context-related information contained in the beacon packets.

The first information processor comprises a data processor that processes the result data as node notification data, and the second information processor processes the result data as user notification output data (display or audio voice or vibration), when the result data of the judgment indicates that the first context and the second context are in a matching relationship.

Further, a transmission management system that inputs transmission management information to the context judgment section, which can be used to transmit the context-related information in one of the following ways: transmission frequency, exclusive control, or duplicate elimination, can be connected to the context judgment section.

<Examples of Devices Used as Agents>

Figure 4A:
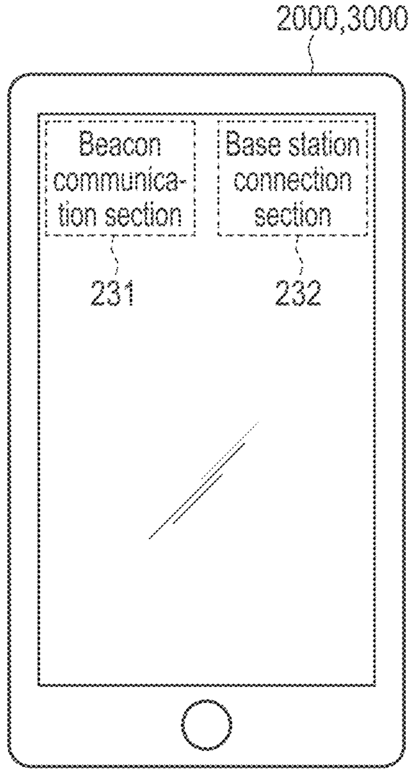
FIG. 4A is a diagram showing an exterior configuration example of an agent used in the embodiment.
Figure 4B:
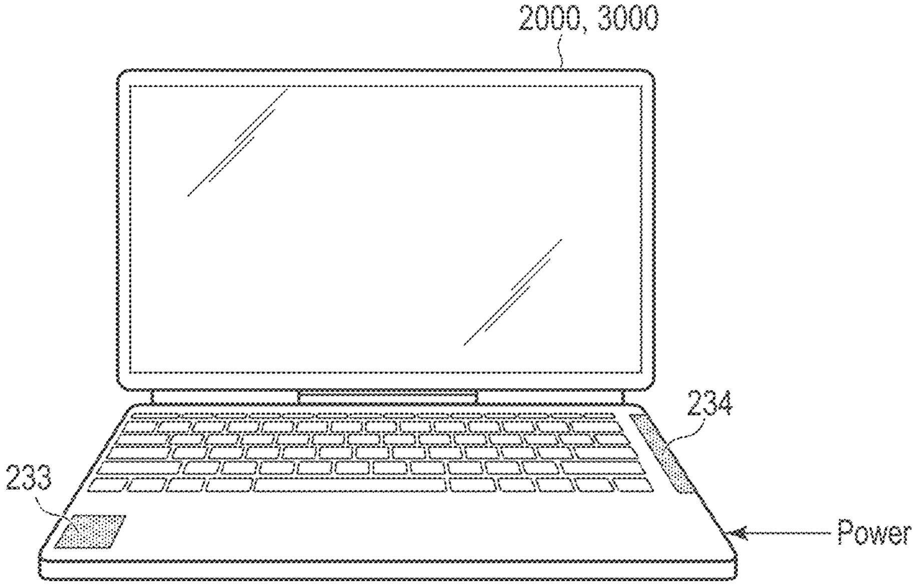
FIG. 4B is a diagram showing another exterior configuration example of the agent used in the embodiment.
Figure 4C:
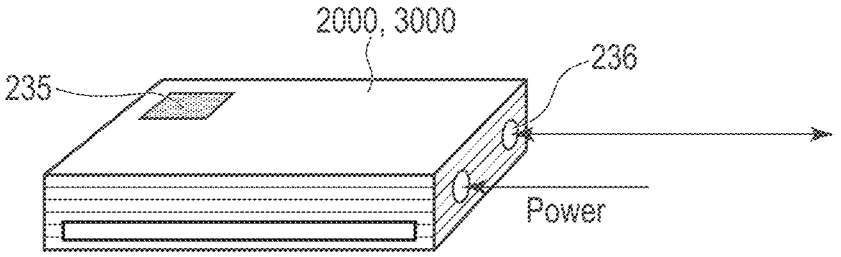
FIG. 4C is a diagram showing still another exterior configuration example of the agent used in the embodiment.
Figure 4D:
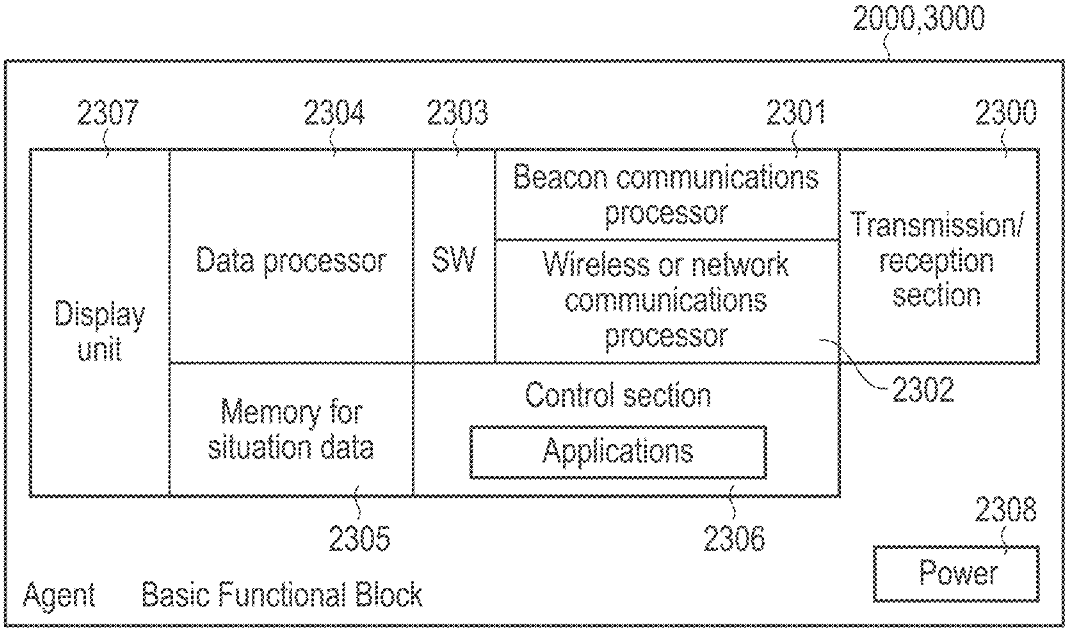
FIG. 4D is a diagram showing an example of functional blocks within the agent.

FIGS. 4A, 4B, and 4C show appearances of an information processor used as an agent, and FIG. 4D shows an internal functional block of the information processor. Note that the examples are not necessarily limited to those illustrated here.

FIG. 4A shows an example in which a smartphone is utilized as an agent 2000 or 3000. The smartphone includes a beacon communication section 231 and a base station connection section 232 for connecting to a telephone line or the Internet. FIG. 4B shows an example in which a personal computer (PC) is utilized as an agent 2000 or 3000. This PC comprises a beacon communication section 233 and a network connection section 234 for connecting to the Internet. FIG. 4C shows an information processor created exclusively for use as the agent 2000 or 3000. This information processor comprises a beacon communication section 235 and a network connection section 236.

FIG. 4D shows the functional block required for the above-described agent 2000 or 3000. It is only natural that they may be used as nodes 4100 to 4300. Further, naturally, they may as well be incorporated in a signage.

The functional block comprises a transmission/reception section 2300, a beacon communication processor 2301, and a wireless or network communication processor 2302. When beacon communication is carried out, the beacon communication processor 2301 and the data processor 2304 are connected by a switch 2303. Or, when wireless or network communication is carried out, the wireless or network communication processor 2302 and the data processor 2304 are connected by the switch 2303.

The memory 2305 for situation data stores the data of the table 2001 and the table 3001 described with reference to FIG. 2B, and various types of attribute data. With this configuration, when beacon communication is carried out, the data processor 2304 reads the data in the memory 2305 and writes it as transmission data in the parameter section of the advertisement packet. The control section 2306 comprehensively controls the transmission/reception section 2300, the beacon communication processor 2301, the wireless or network communication processor 2302, the switch 2303, the data processor 2304, and the memory 2305. Thus, the control section 2306 selectively uses various applications depending on the mode of operation. It is also equipped with a display 2307 and a power supply 2308.

The memory 2305 of situation data, described above may include a memory with a rewritable area (RAM) and a read-only memory (ROM) for context matching in advance. The ROM is an exclusive memory in which various context data are described to increase the value of using the nodes 2000 and 3000, and it may be detachable. For example, there are numerous products for sale used in convenience stores and department stores, and a memory with product names and contexts described in advance may be used. This is also the case for the memory of situation data of a node, which will be described later.

<Other Examples of Devices Used as Nodes>

FIGS. 5A, 5B, 5C, 5D, and 5E show examples of a device (information processor) used as a node. Note that the examples are not necessarily limited to those illustrated here.

Figure 5C:
FIG. 5C is a diagram showing still another exterior configuration example of the node used in the embodiment.
Figure 5D:
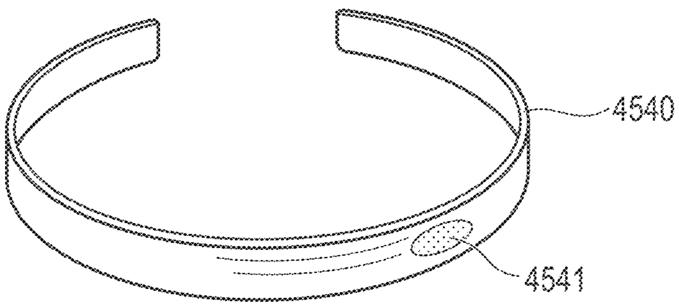
FIG. 5D is a diagram showing still another exterior configuration example of the node used in the embodiment.
Figure 5E:
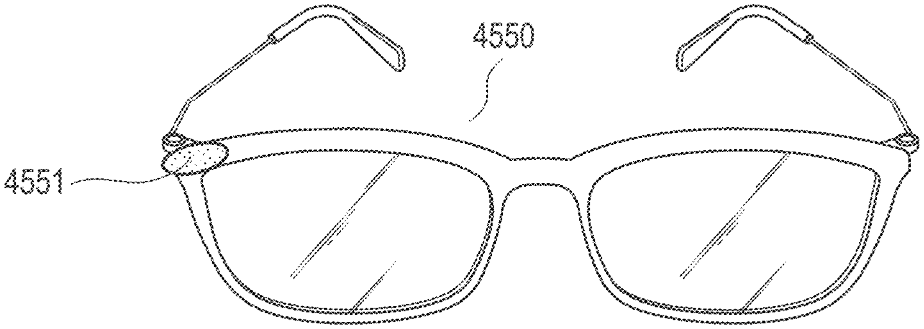
FIG. 5E is a diagram showing still another exterior configuration example of the node used in the embodiment.

FIG. 5A shows an example of a smartphone 4510, which includes a beacon communication section 4511 and a base station connection section 4512 for connecting to a telephone line or the Internet. FIG. 5B shows an example in which a wristwatch 4520 is utilized, and a beacon communication section 4521 is built in the wristwatch 4520. FIG. 5C show an example in which a pendant 4530 is utilized, and a beacon communication section 4531 is built into this pendant 4530. FIG. 5D shows an example in which a bracelet 4540 is utilized, and a beacon communication section 4541 is attached to this bracelet 4540. FIG. 5E shows an example in which glasses 4550 are utilized, and a beacon communication section 4551 is attached to the glasses 4550.

<Examples of Node Function>

FIGS. 6A, 6B, 6C, and 6D show examples of various functional blocks of nodes (or also available as agents). These information processors can also be registered as agents when they are registered in the context judgment section 1000.

Figure 6A:
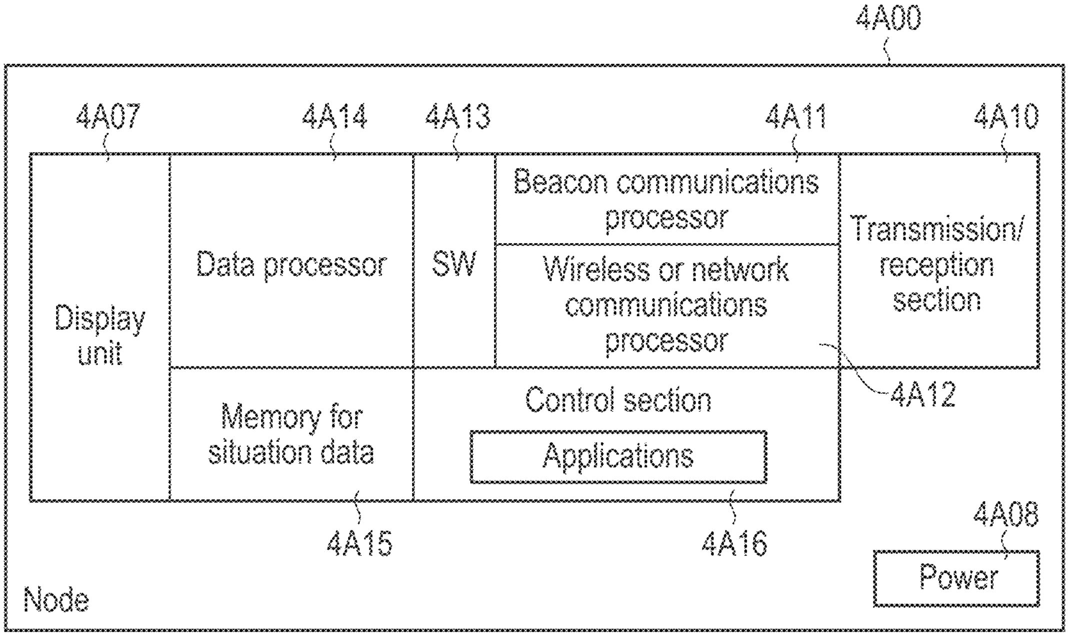
FIG. 6A is a diagram showing an example of a functional configuration of the node shown in FIGS. 2A and 2B.

The following is a brief description of a node. Various types of node functional blocks are used, from simple ones to complicated ones. The functional block of a node 4A00 shown in FIG. 6A is a functional block similar to that of a smartphone, and also has a configuration similar to that of the agent described with reference to FIG. 4D. That is, it comprises a transmission/reception section 4A10, a beacon communication processor 4A11, and a wireless or network communication processor 4A12. The switch 4A13 selectively connects a data processor 4A14 to the beacon communication processor 4A11 and the wireless or network communication processor 4A12 according to the operation mode (beacon communication mode or wireless or network communication mode).

A memory 4A15 for situation data stores the device ID of its own device, the context set by its own device, the attribute data and the like. The data processor 4A14 can read the data in the memory 4A15 and describe the data in the parameter section of the advertisement packet. The control section 4A16 comprehensively controls the transmission/reception section 4A10, the beacon communication processor 4A11, the wireless or network communication processor 4A12, the switch 4A13, the data processor 4A14 and the memory 4A15. Thus, the control section 4A16 selectively utilizes various applications according to the operating mode. It is also equipped with an indicator 4A07 and a power supply 4A08.

This node 4A00 can autonomously perform context matching process and situation matching process by adding applications. In this manner, it is possible to have functions similar to those of the context judgment section 1000 described with reference to FIGS. 2A and 2B by a smaller scale.

Figure 6B:
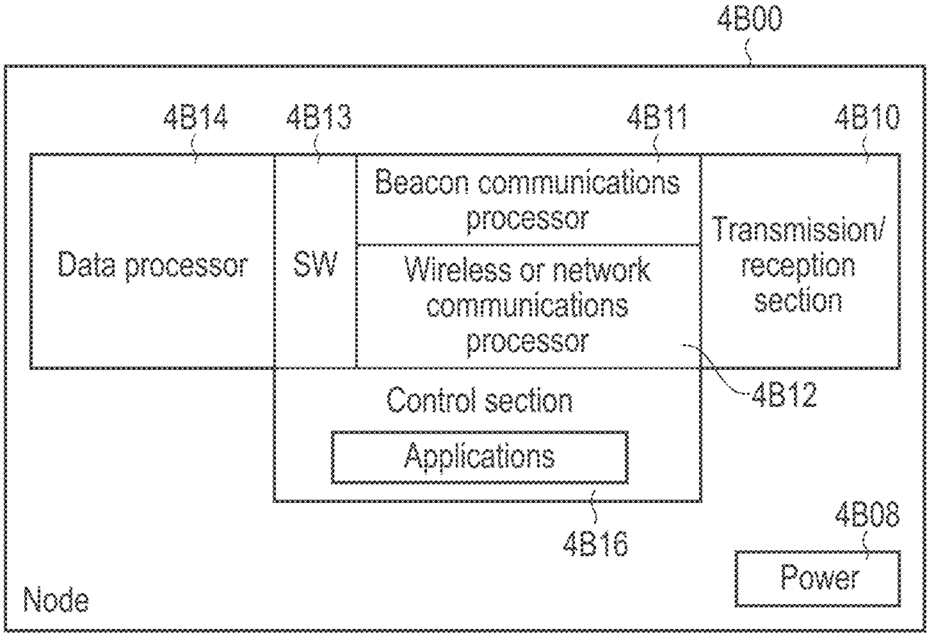
FIG. 6B is a diagram showing another example of the functional configuration of the node shown in FIGS. 2A and 2B.

The functional block of the node 4B00 shown in FIG. 6B is that from which the memory 4A15 for situation data and the indicator 4A07 are excluded from the node 4A00 of FIG. 6A, and the other functional blocks are the same as those of the node 4A00. This node 4B00 can be utilized as an exclusive repeater. For example, it can be utilized as a device that transmits data (for example, device ID) acquired through beacon communication to a server or agent via the Internet. Conversely, data acquired via the Internet can be notified to some other node or agent in a nearby communication area via beacon communication.

Figure 6C:
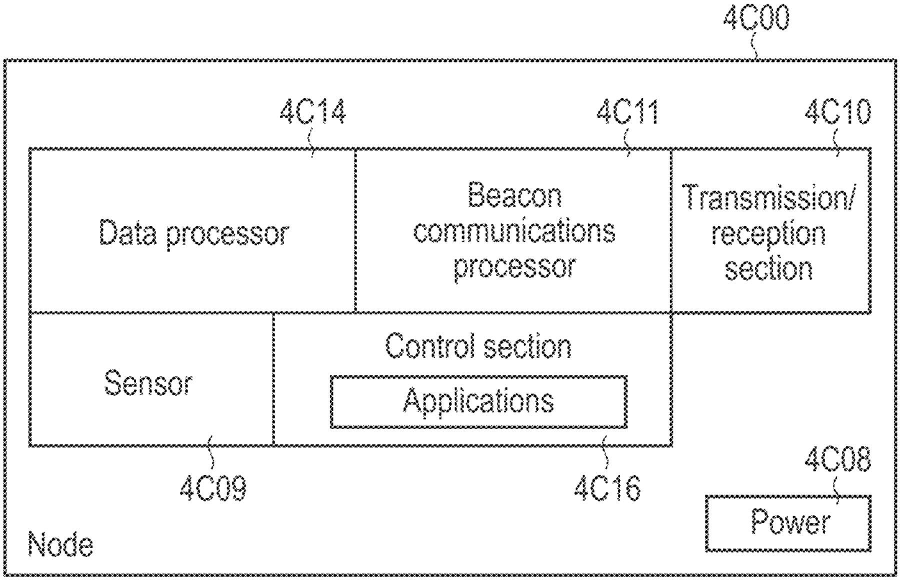
FIG. 6C is a diagram showing still another example of the functional configuration of the node shown in FIGS. 2A and 2B.

The functional block of the node 4C00 of FIG. 6C is that from which the memory 4A15 for status data, the indicator 4A07, and the wireless or network communication processor 4A12 are excluded from the node 4A00 of FIG. 6A and the sensor 4A09 is added, and the other functional blocks are the same as those of the node 4A00. This node 4C00 is configured to carry out only beacon communication and can be utilized, for example, to notify the detection signal level of the sensor 4A09. Types of sensors include an illumination sensor, temperature sensor, humidity sensor, gas sensor, odor sensors, gyro, altitude sensor, GPS, barometric pressure sensor, pressure sensor, water leak sensor, dust detection sensor, $CO_2$ sensor, human detection sensor, image sensor and the like. Note that sensors are not limited to these listed.

Figure 6D:
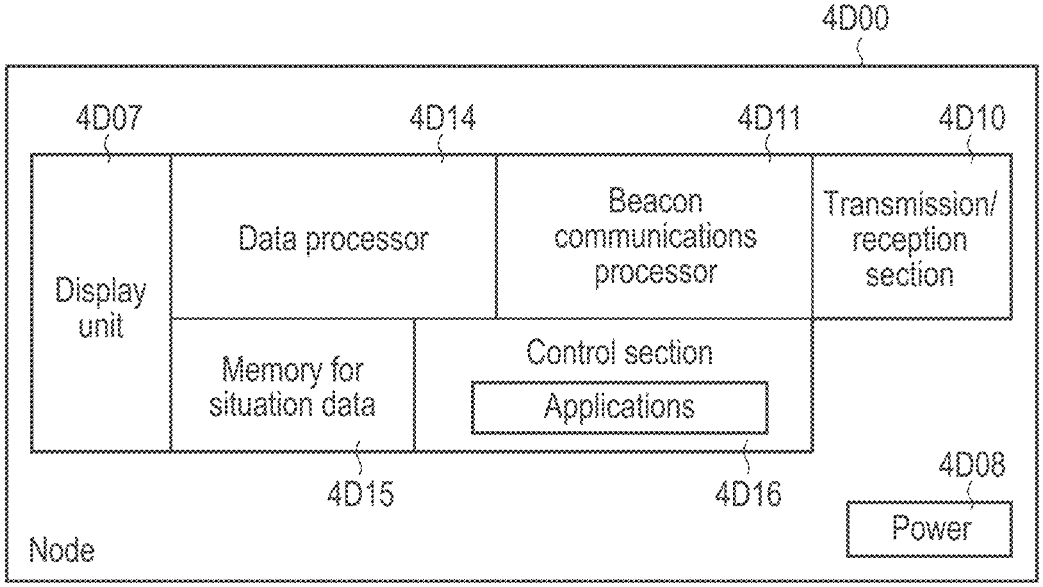
FIG. 6D is a diagram showing still another example of the functional configuration of the node shown in FIGS. 2A and 2B.

The functional block of the node 4D00 of FIG. 6D is that from which the indicator 4A07 and the wireless or network communication processor 4A12 are excluded from the node 4A00 of FIG. 6A, and the other functional blocks are the same as those of the node 4A00. This node 4D00 can perform a simple context matching process when beacon communication is carried out. The result can be notified to the user by the display section 4A15. Although it is difficult to perform context matching on a large scale, processing regarding simple keywords is still possible. This indicator of the node 4D00 as well is useful for the case of a simple indication such as blinking an LED.

Here, it is only natural that the various types nodes described above may as well be equipped with an audio voice output function.

<Examples of System Applications in Various Types of Stores Including Convenience Stores, Supermarkets, Department Stores>

Figure 7A:
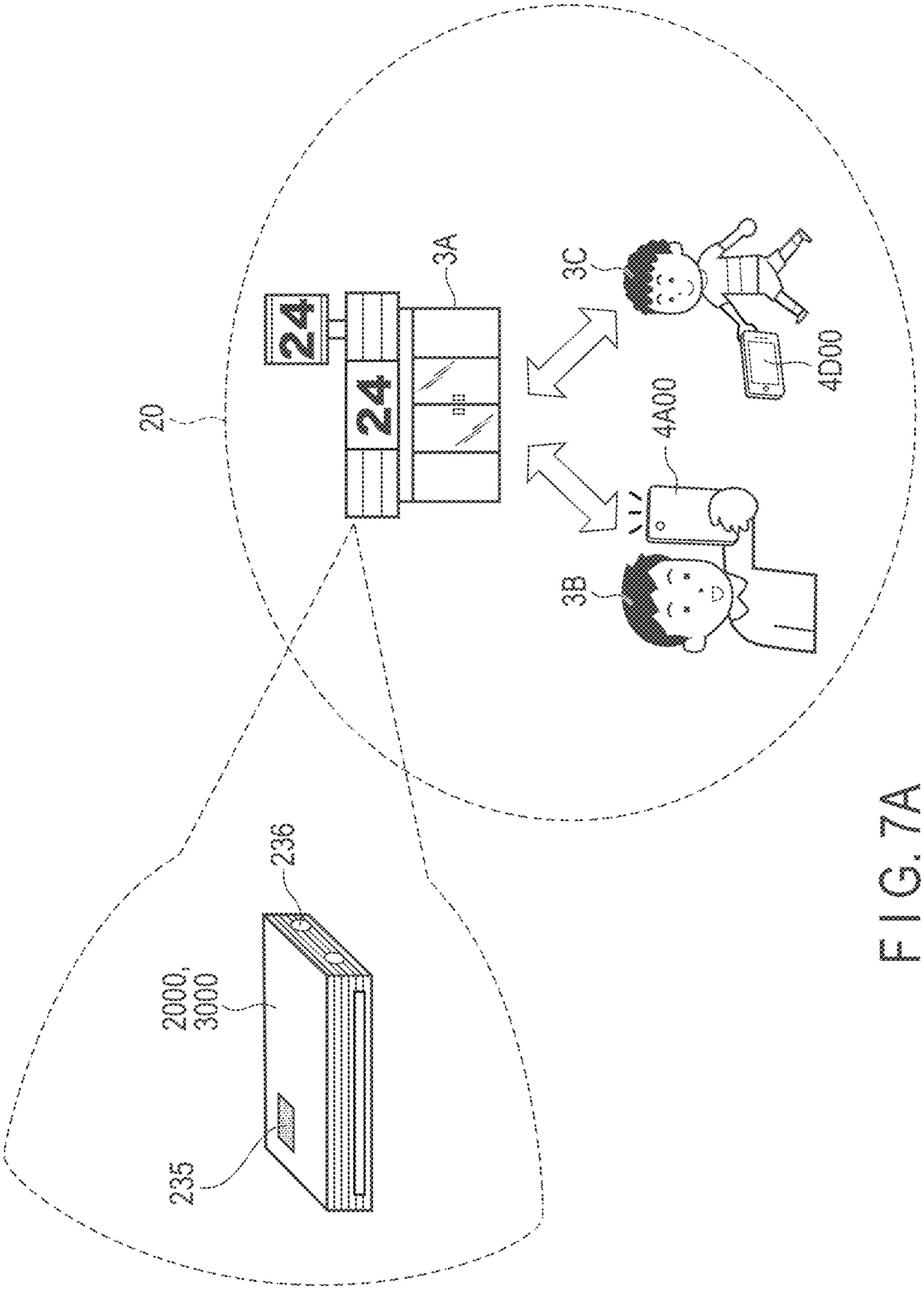
FIG. 7A is an explanatory diagram showing an embodiment of the case where a basic system of the invention is utilized for a product sales promotion system in a context area 20.

FIG. 7A shows an example in which a convenience store 3A applies an embodiment of the present invention to a product sales promotion system. Here, the owner of the convenience store 3A has installed the agent 3000. The agent 3000 includes a context area 20. The agent 3000 is used as a node of the convenience store 3A as well. Then, “red wine for sale” and “melon-shaped bread for sale” are registered in the context judgment section 1000.

Here, let us suppose that a customer 3B has a node 4A00 and has registered “red wine lover” as a context. Further, a customer 3C has a node 4D00 and has registered “melon-shaped bread lover” as a context.

FIG. 7B shows an example of the operation of the sales promotion system along the elapse of time T. Here, let us suppose that the customers 3B and 3C enter the context area 20 and a broadcast is carried out (SA1). Then, the agent 3000, the node 4A00, and the node 4D00 are placed in the context matching state and each detect the context matching state. In this manner, the customer 3B and the customer 3C can each recognize that the product they are interested in is being sold nearby (SA2, SA3). That is, the customer 3B recognizes that there is a store nearby that sells “red wine”, and the customer 3C recognizes that there is a store nearby that sells “melon-shaped bread”.

In the meantime, the agent 3000 obtains the device IDs of the node 4A00 and the node 4D00 when executing the broadcast. In this manner, the agent 3000 can recognize that it has carried out direct advertisement to the customers 3B and 3C who are interested in the product which is promoted for sale (SA4). Then, the agent 3000 counts the device IDs that have been acquired and recognizes the number of devices (SA5). When this counting is carried out, the number of device IDs that have already been received within a predetermined time is excluded. This is because to avoid the counting of the device IDs in duplicate. Further, the agent 3000 transmits the number of device IDs counted to the server 5A of the service operator.

The server 5A of the service operator updates the billing data file for the agent 3000 as a reward for "advertisement established" (SA6).

Here, the agent 3000 may recognize that the user of the node 4D00 is a "melon-shaped bread lover" and that the agent 3000 can issue a "red wine discount coupon". In this case, the "melon-shaped bread discount coupon" is transmitted towards the node 4D00 (SA7). In this manner, the node 4D can obtain the discount coupon (SA8).

Note that the agent 3000 also recognizes that the node 4A00 is a "red wine lover". Here, if there is signage nearby, an advertisement such as "red wine for sale" can be directed to the signage (SA9, SA10).

<Monitoring Service 1>

Figure 8A:
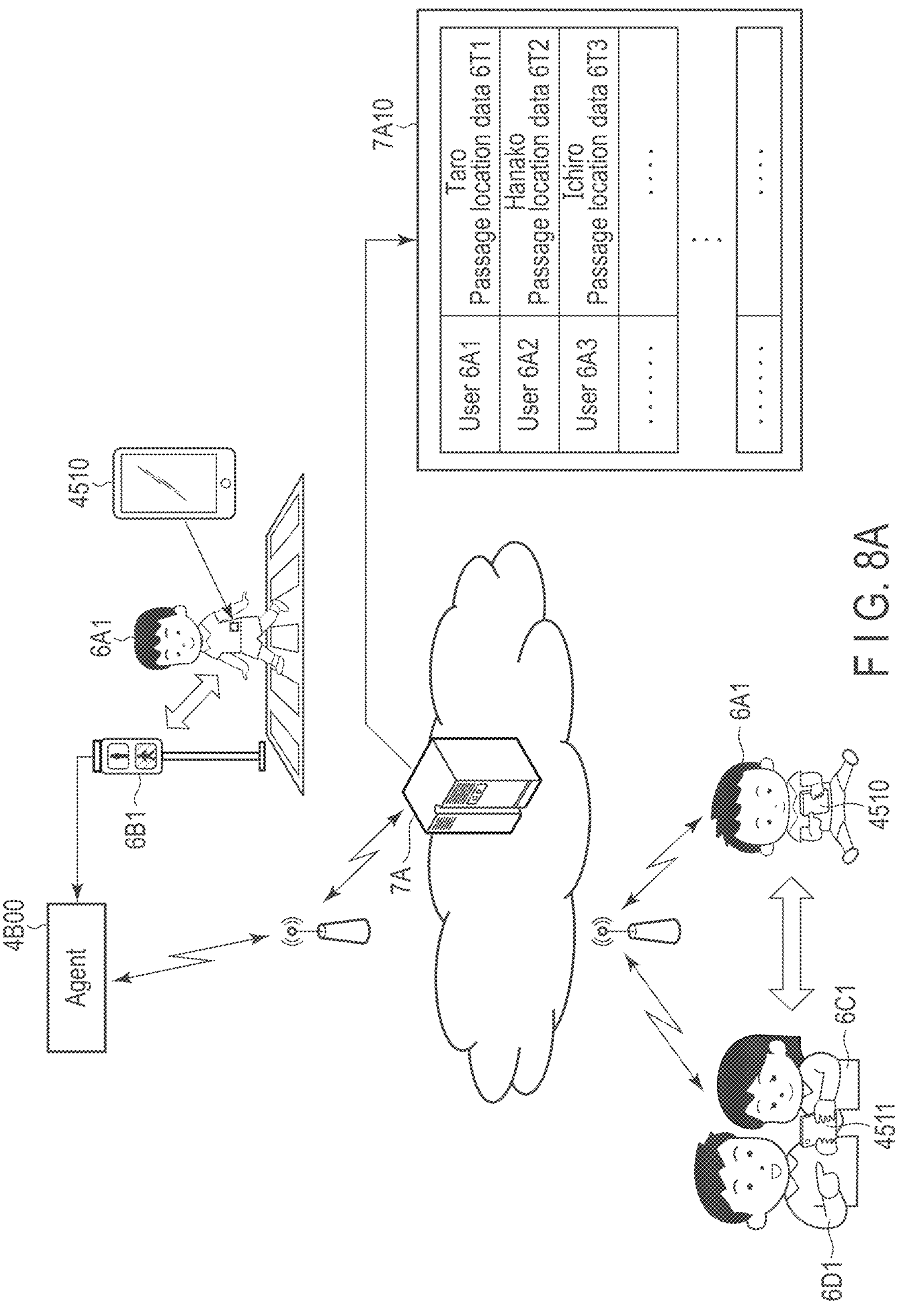
FIG. 8A is an explanatory diagram showing an embodiment of the case where the basic system of the present invention is utilized for a child watching system.

FIG. 8A shows an example in which a service operator (for example, a local government, Parent-Teacher Association (PTA), or security company) applies an embodiment of the present invention to a monitoring service system. The following is an example of a service system for watching over a child 6A going to school.

The child 6A1 owns a smartphone 4510. Here, an agent 4B00 is placed, in this case, at, for example, a traffic light 6B1 at a pedestrian crossing on the way to school for the child 6A1. This agent 4B00 obtains, when the smartphone 4510 of the child 6A1 in the communication area, the device ID of the smartphone 4510 by broadcast. The agent 4B00 transmits the acquired device ID to the server 7A of the service operator via the network.

The server 7A includes a table 7A10 for data storage for users to be watched over, and records in this table 7A10 passing location data 6T1, 6T2, 6T3, . . . of users 6A1, 6A2, 6A3, . . . , respectively. The passing location data include, for example, the location of the traffic light 6B1 (street number, town name, etc.) and the date/time data regarding when the user (user 6A1 in the figure) passed therethrough. The location of the traffic light 6B1 is registered together with the device ID of the agent 4B00 at the same time when the agent 4B00 installed at the traffic light 6B1 is registered in the file section.

The users who can check the data of the user 6A1 of the server 7A are, for example, parents 6C1 and 6D1 who have made a contract with the service operator in advance. When the passing location of the child 6A1 appears to be different from usual, the parents 6C1 and 6D1 can check the situation by directly calling the smartphone 4510 of the child 6A1 using the smartphone 4511.

Further, the server 7A may as well be provided with a service application that notifies the smartphones 4511 of the parents 6C1 and 6D1 when the passing location of the user is different from usual, or when the passing time of the user is significantly different from usual.

Figure 8B:
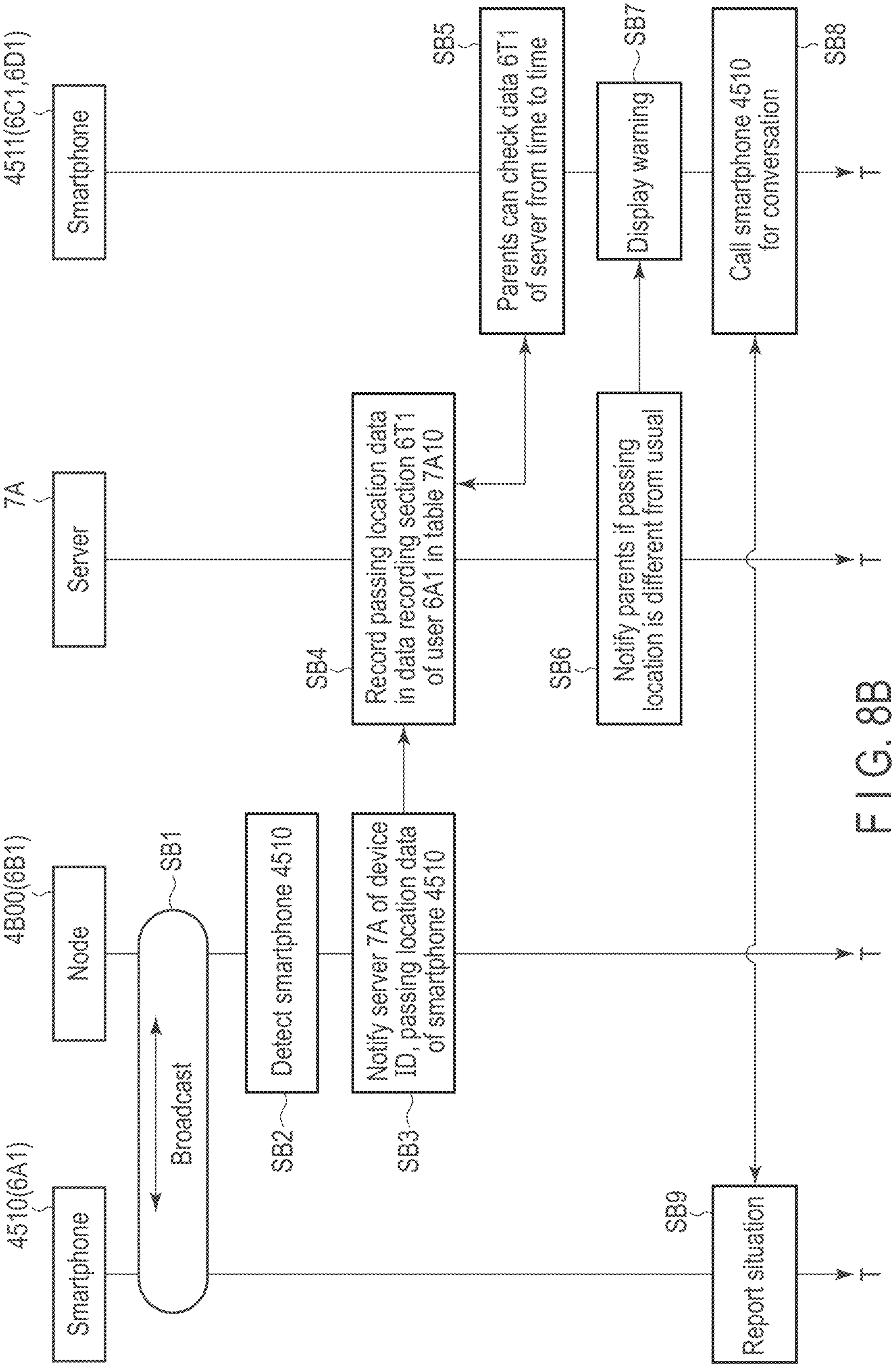
FIG. 8B is an explanatory diagram showing an example of system operation of the case where the basic system of the present invention is utilized for a child watching system.

FIG. 8B shows an example of some operations of the watching system described above along the elapse of time T. When the child 6A1 passes near the traffic light 6B1, a broadcast is carried out between the smartphone 4510 and the agent 4B00 (SB1). The agent 6B1 detects the device ID of the smartphone 4510, which is registered in advance. The agent 6B1 then transmits to the server 7A the device ID of the smartphone 4510 and the data of the passing location, such as the number or address of the traffic light 6B1 (SB3). The server 7A records the passing location data in the data recording section 6T1 of the user 6A1 (child) in the table 7A10 (SB4).

The parents 6C1 and 6D1 can use their smartphones 4511 at any given time to access the server 7A and confirm the passing location data 6T1 (SB5). Further, the server 7A includes a program to check the passing location data 6T1, and if the received passing location is different from the usual position, carries out a warning notification to the smart phones 4511 of the parents 6C1 and 6D1 (SB6, SB7).

In this manner, the parents 6C1 and 6D1 can use their smartphones 4511 to call their smartphones 4510 of the child 6A1 and ask for the situation report (SB9).

<Monitoring Service 2>

Figure 9A:
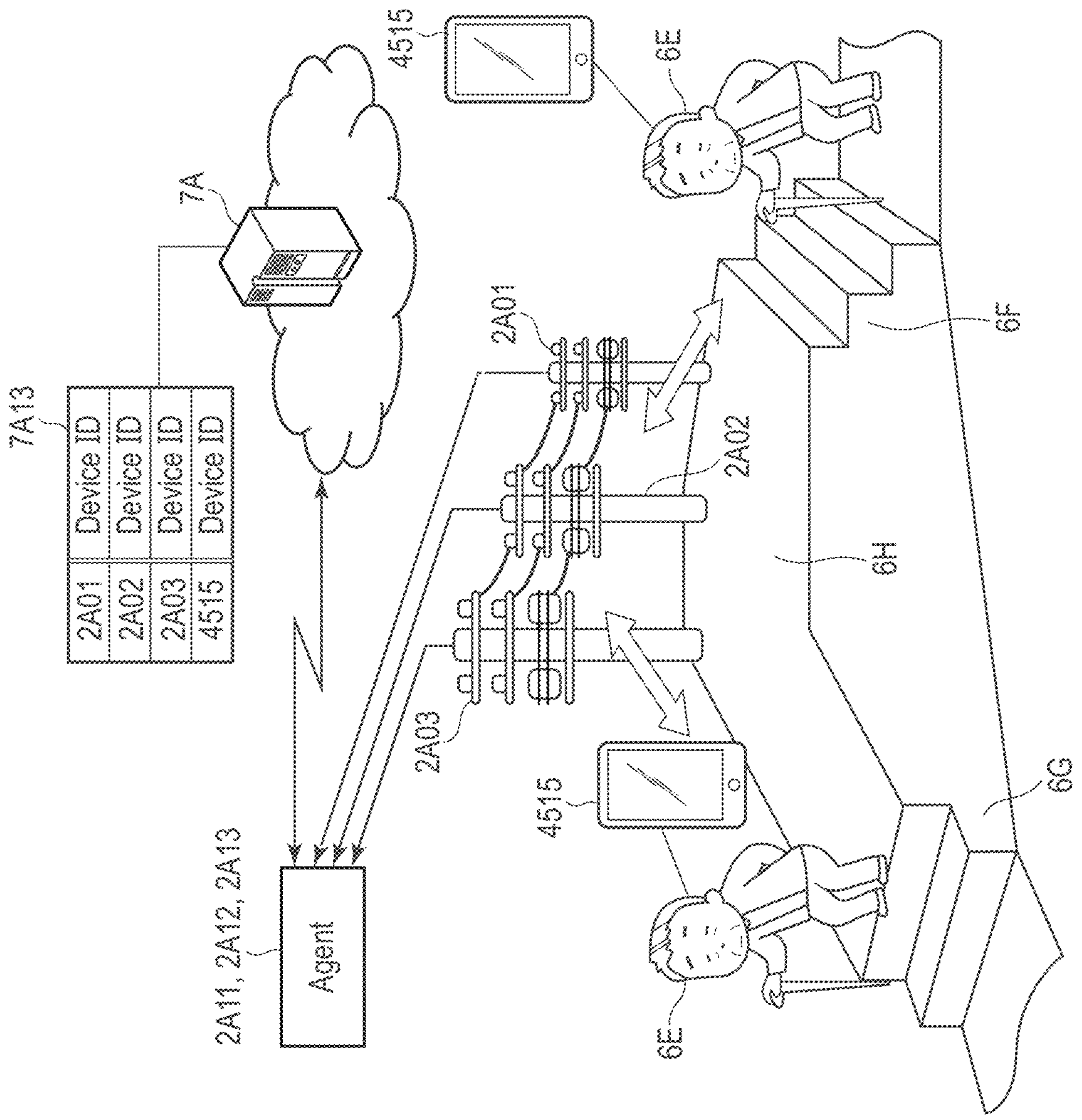
FIG. 9A is an explanatory diagram showing an embodiment of the case where the basic system of the present invention is utilized for watching over and guiding the elderly.
Figure 9B:
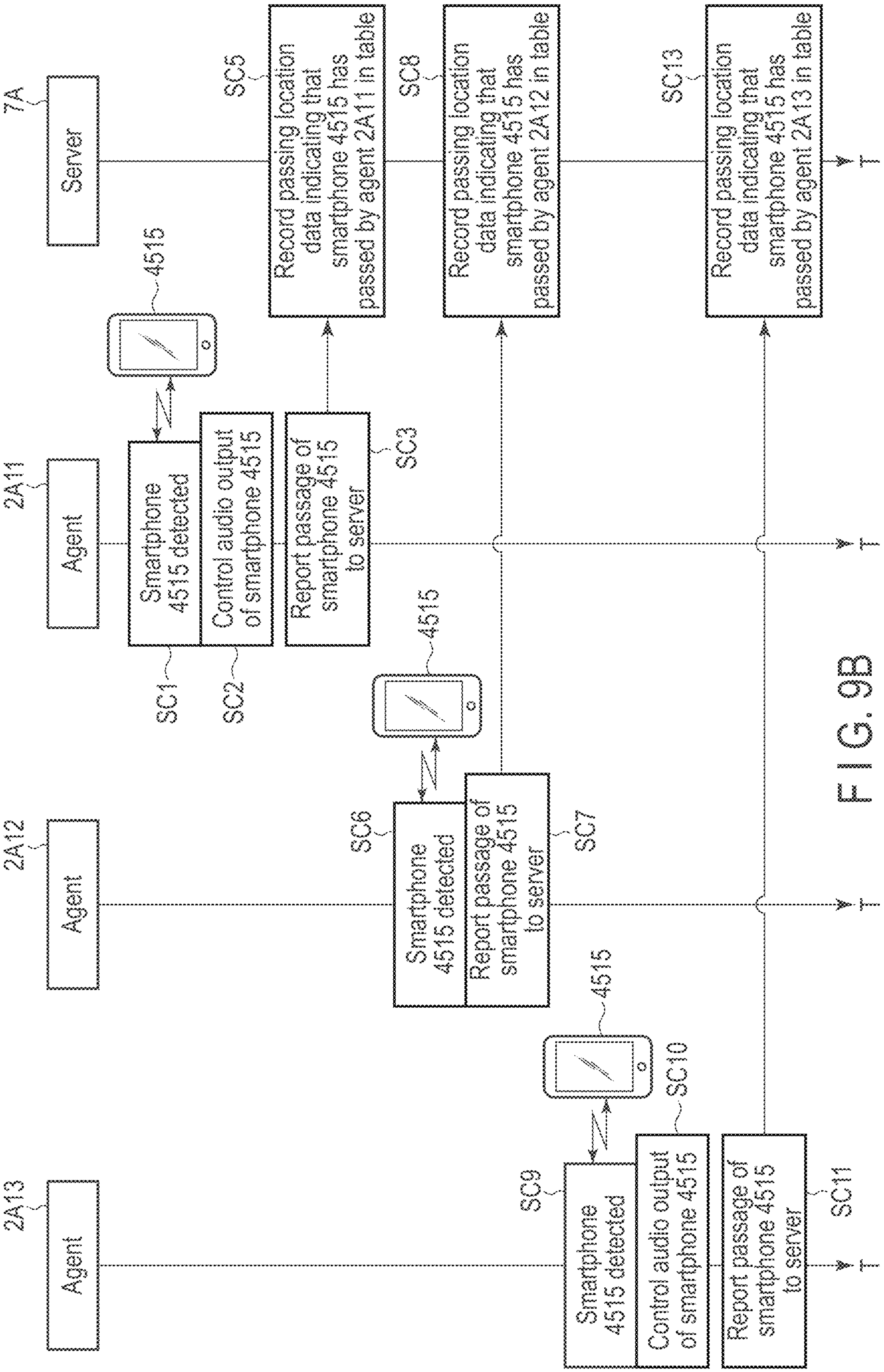
FIG. 9B is an explanatory diagram showing an example of system operation of the case where the basic system of the present invention is utilized for watching over and guiding the elderly.

FIG. 9A shows an example in which the service operator (local government) implements a system for watching over and guiding the elderly in an embodiment of this invention. FIG. 9B shows an example of the operation of the elderly watching over and guidance system along the elapse of time T. Here, FIGS. 9A and 9B will be referred to for explain.

Here, let us suppose that in the middle of a walkway 6H for an elderly person 6E, there are an ascending stairway 6F and a descending stairway 6G. Under these circumstances, the local government realizes that when the elderly person 6E approaches the ascending stairs 6F and the descending stairway 6G, the smartphone of the elderly person 6E is controlled to call out a warning by audio voice.

Further, suppose that there are electric poles 2A01, 2A02 and 2A03 on the walkway 6H of the elderly person 6E. Here, the agents 2A11, 2A12 and 2A13 are deployed on the electric poles 2A01, 2A02 and 2A03, respectively. The figure shows a configuration of one agent as a representative example. The agents 2A11, 2A12, and 2A13 are deployed by the local government. Note that the agents 2A11, 2A12, and 2A13 may as well be, as appearance, billboards, signages, or road signs in the town.

The server 7A comprises a database (table) 7A13 for the guidance system in the file section. The table 7A13 manages the device IDs of the agents 2A11, 2A12, and 2A13 registered by the local government in the same group. Here, the device ID of the smartphone 4515 of the elderly person 6E is registered in the same group as that of the device IDs of the agents 2A11, 2A12 and 2A13 registered by the local government. This registration as well is done by the local government.

Let us suppose that the elderly person 6E is now approaching the stairway 6F. Then, the agent 2A11 and the smartphone 4515 of the elderly person 6E enter the same context area. By the broadcast between the agent 2A11 and the smartphone 4515, the agent 2A11 recognizes the smartphone 4515 (elderly person 6E) (SC1 in FIG. 9B). Further, the agent 2A11 controls the output of a message voice to the smartphone 4515 by the next broadcast (SC2 in FIG. 9B). The message voice may be, for example, "There is a stairway for going up, please be very careful, and if you need assistance, please press the #button on your smartphone".

Further, the agent 2A11 transmits the passing location data indicating that the smartphone 4515 has passed the location of the agent 2A11 to the server 7A, and the server 7A records the passing location data in the recording section (SC3 and SC5 in FIG. 9B). The processing method at this time is the same as that described with reference to FIG. 8A.

Next, suppose that the elderly person 6E moves and arrives near the agent 2A12. By the broadcast between the agent 2A12 and the smartphone 4515, the agent 2A12 recognizes the smartphone 4515 (elderly person 6E) (SC6 in FIG. 9B). The agent 2A11 transmits the passing location data indicating that the smartphone 4515 has passed the location of the agent 2A12 to the server 7A, and the server 7A records the passing location data in the record section (SC7 and SC8 in FIG. 9B).

Now, let us suppose that the elderly person 6E moves further and is passing by the stairway 6G for going down. Then, the agent 2A13 and the smartphone 4515 of the elderly person 6E enter the same context area. By the broadcast between the agent 2A13 and the smartphone 4515, the agent 2A13 recognizes the smartphone 4515 (elderly person 6E) (SC9 in FIG. 9B). Further, by the next broadcast, the agent 2A13 controls the output of a message voice to the smartphone 4515 (SC10 in FIG. 9B). The message voice may be, for example, "There is a stairway for going down. Please be very careful. And if you need assistance, please press the #button on your smartphone". The configuration of the agents 2A11, 2A12, and 2A13 is the same as that of the agent 2000 shown in FIG. 4D, and, in addition, these agents 2A11, 2A12, and 2A13 may own a speaker 2301 to output a guidance voice.

Further, the agent 2A13 transmits the passing location data indicating that the smartphone 4515 has passed the location of the agent 2A13, to the server 7A and the server 7A records the passing location data in the recording section (SC11 and SC13 in FIG. 9B).

The above-described system can watch over the elderly and guide them for a walk. The passing location data recorded on the server 7A can be accessed and checked by the local government or family members from their smartphones. This monitoring and guidance system can be utilized by the elderly or their family members by submitting a notification of use the system to the local government.

The above-described system can easily be converted to a navigation system. Such a method is possible that the next placemark and direction are provided by voice guidance to the elderly person when the smartphone 4515 (the elderly 6E) is passing through by the agent 2A11, 2A12, or 2A13.

<Encounter Service>

FIG. 10A is an explanatory diagram showing an example of an image of the case where the embodiment of the invention is applied to an encounter detection system.

FIG. 10B is an explanatory diagram showing a procedure for registering a device ID with the encounter detection system. FIG. 10C is an explanatory diagram showing an operation of the case where a wristwatch 4520 and a pendant 4530 are located in the same context area and a broadcast is carried out.

In FIG. 10A, a node 4A00 is built into the wristwatch 4520 and a node 4D00 is built into the pendant 4530. The configuration of the node 4A00 and the node 4D00 is as described with reference to FIGS. 6A and 6D.

The node 4A00 and the node 4D00 have a function of comparing the received context with the context of its own by the broadcast. The context of its own is stored in the situation data memory 4A15 of each. This context is referred to as the context for catch. As to the catch context, there may be only one type but also multiple types. For example, relatively short catch contexts such as AAA school graduate, hobby skiing, hobby tennis and the like are preferable. Further, for these requirements, the logical AND (established simultaneously) and logical OR (either one established) can be set.

When the node 4A00 and the node 4D00 receive the contexts with each other by a broadcast, they can compare the received context and the catch context of its own. This comparison is executed0 by the data processor 4A14 under the control of the controller 4A16. Then, when the received context and the catch context match each other, some kind of display or audio sound output is obtained from the wristwatch 4520 and the pendant 4530.

When a user registers a catch context for the node 4A00 and the node 4D00 described above, the procedure is carried out as follows. That is, first, the user accesses a specified server using a smartphone or a personal computer. Further, the user sets its smartphone or personal computer so as to be able to mutually communicate with the node 4A00 of its own or the node 4D00 by short-range wireless communication.

Then, as shown in FIG. 10B, the registration software is downloaded from the specified server to the smartphone or personal computer. That is, the smartphone or personal computer can read the encounter service template and deploy the registration software. In this case, the node is linked to the smartphone or personal computer by short-range wireless communication to be able to communicate with each other. The server accessed by the smartphone or personal computer is set up for the user of the encounter service to enter information, and the server starts managing the encounter service template (SE0, SE1).

The user enters the device ID of the node 4A00 or the node 4D00 to be used and the context data for date matching (or catch) into the blanks of the template and registers these (SE2, SE3). At this time, when multiple (for example, two pieces) context data are entered, there may be an attribute input field for logical conditions, such as "either one of the conditions should be established" or "both conditions must be established". Further, exclusive condition data may as well be added to the context as attribute information (SE4). Furthermore, time limit data of the context data may be added as attribute information as well. For example, a time period or time to accept matching may be specified, or an end date and time may be specified as the time limit restriction data (SE5). The user confirms the input data (SE6) and terminates the operation. The data entered in the template (context data and attribute data) is then registered in the server and transmitted directly from the smartphone or personal computer operated by the user to the wristwatch 4520 or pendant 4530 by wireless, and recorded in the memory 4A15 of the node 4A00 or 4D00.

Thus, the control section 4A16 of the node 4A00 or 4D00 contains an application for linking and communicating with the smartphone or personal computer. The communication supported by this application may be short-range wireless communication, beacon communication or the like.

Next, let us suppose that the node 4A00 of the wristwatch 4520 and the node 4D00 of the pendant 4530 encounter at the same time in the same context area. Then, as shown in FIG. 10C, a broadcast is carried out between the node 4A00 and the node 4D00 (SF0), and they detect each other (SF1, SF11). Therefore, they compare the context data they hold with the received context data with each other to determine if matching is established.

However, the node 4A00 and the node 4D00 each determine whether or not the thus received context data contains matching exclusive data (SF2, SF12). When the received context data contains matching exclusive data, subsequent processing and reception are suspended for a certain period of time. But, when the received context data does not contain matching exclusive data, the notification is made to the user by display or audio voice (SF3, SF13).

The above-described encounter service can be utilized in various ways, for example, "a member of a reunion committee wants to encounter another member of the reunion committee" or "a person with a certain hobby wants to encounter some other person with the same hobby" or the like.

Moreover, as a special case, there is a situation where the data has been processed for compression using a password. Here, when a password is used between the first device of the first user and the second device of the second user, the user can register the password in advance on each device. In this manner, the data received through communication between the first device and the second device is automatically decompressed in each of the devices.

Figure 11:
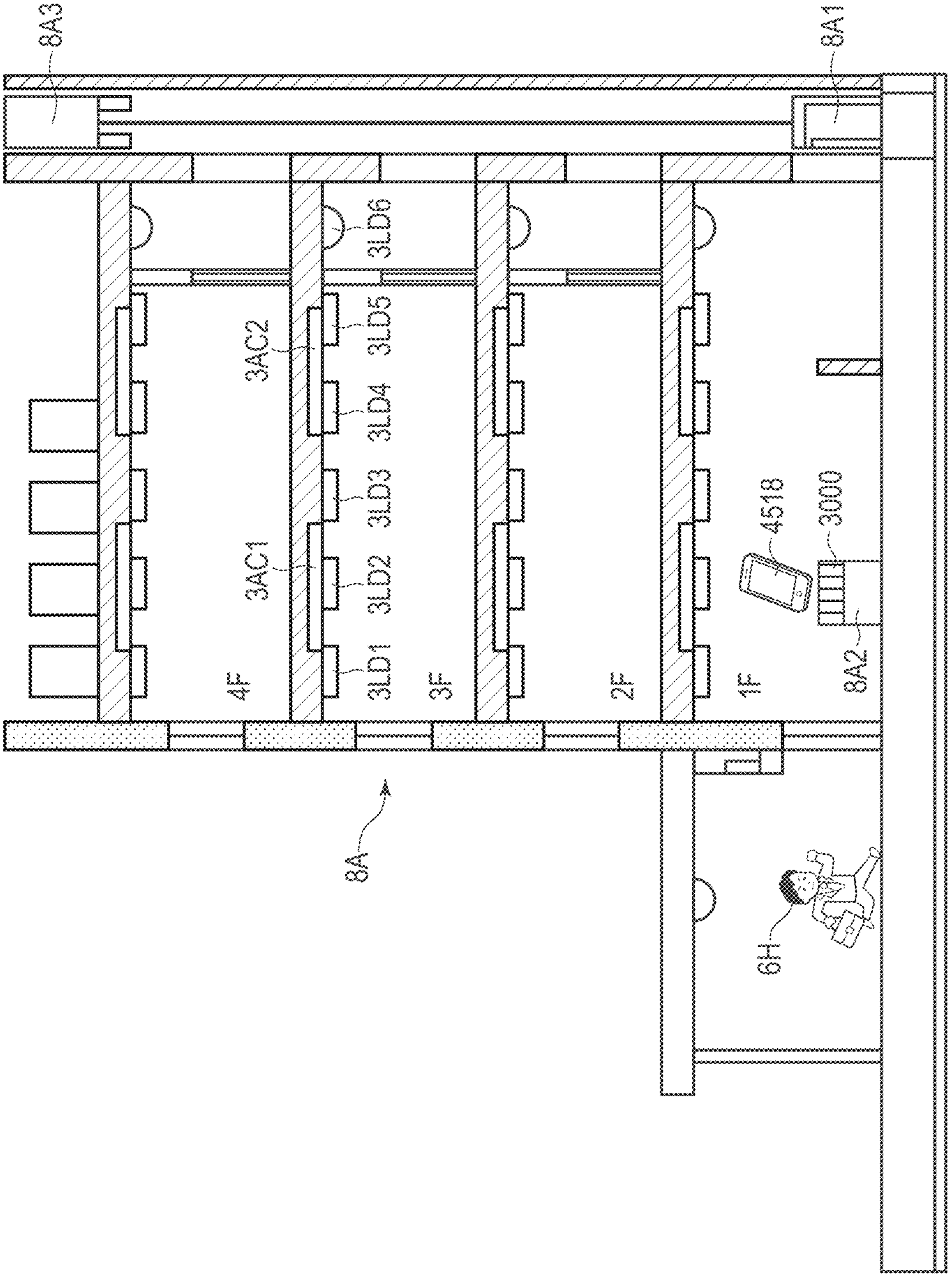
FIG. 11 is an explanatory diagram showing an embodiment of the case where the basic system of the present invention is utilized for a building management system.

FIG. 11 shows an example in which the embodiment of the invention is introduced to a building management system. A building 8A of a company from the first floor (1F) to the fourth floor (4F), for example, is shown. Employees can go to the second floor to the fourth floor by utilizing an elevator 8A1. It is assumed here that an agent 3000 is disposed at a reception counter 8A2, and that the agent 3000 stores the ID of the smartphone 4581 (or employee card) assigned to the company employee in the context judgment section.

Suppose now that an employee 6H arrives at work, receives the smartphone 4581 of its own at the reception counter 8A2, and turns the power on. Here, the employee 6H is assumed to be enrolled in the department on the 3rd floor.

Then, the phone 4581 and the agent 3000 broadcast beacon signals with each other. The agent 3000 determines that the employee 6H has arrived at work and turns on illuminations 3LD1 to 3LD6 of the department where the employee 6H is enrolled. It further transmits a control signal to air conditioning units 3AC1 and 3AC2 to start air conditioning operation. Meanwhile, the smartphone 4581 displays the name of the employee and the destination floor 3F on the screen of its display section.

When the employee gets on the elevator 8A1, the elevator 8A1 is controlled by an elevator control unit 8A3, which receives the notification from the agent 3000, and moves to the 3rd floor and stops.

The above-provided explanation is made in connection with the case where the agent 3000 is disposed at the reception counter 8A2, but it may as well be disposed inside the elevator 3000.

Note that when an employee leaves for home, the power of the smartphone 4581 is turned off and the phone is returned to its predetermined position at the reception counter 8A2. In this manner, it is possible to check the attendance of the employees by the agent 3000. That is because that the agent 3000 is able to manage the time of turning on and off of the power of the smartphone 4518.

With the above-described building management system, the power of the illumination and the air conditioning unit can be turned on and off at necessary locations, thereby making it possible to suppress wasteful power consumption. Further, it is possible to manage the attendance of employees.

FIG. 12A is an explanatory diagram showing an example in which the embodiment of the invention is applied to a spatial environment detection system.

For example, a node 4C00 including a sensor 4A09 that detects $CO_2$ is used in this example. The node 4C00 is, for example, inside a bus 11A, a train car 12A, an office 13A, an airplane 14A, a bar 15A, a hospital room 16A, a restaurant 17A or the like.

When a user with a smartphone 4519 enters the bus 11A, the train car 12A, the office 13A, the airplane 14A, the bar 15A, the hospital room 16A, the restaurant 17A or the like, a broadcast is carried out between the node 4C00 and the smartphone 4519. By this communication, the user can receive the $CO_2$ status report (service information) from the node 4C00 for each environment. That is, the smartphone 4519 can receive the $CO_2$ detection signal from the node 4C00. Here, when the $CO_2$ detection signal is at a standard value or less, the smartphone 4519 displays, for example, "Adequate ventilation is maintained" on the display section. On the other hand, when the $CO_2$ detection signal is less than the standard value, the smartphone 4519 displays on the display section, for example, "Ventilation should be carried out".

The above-provided explanation illustrates an example of the use of a node containing a $CO_2$ sensor, but various types of sensors may as well be used depending on the environment and object of use. Types of sensors include, but are not limited to, an illumination sensor, temperature sensor, humidity sensor, gas sensor, odor sensor, gyro, altitude sensor, GPS, barometric pressure sensor, pressure sensor, water leak sensor, and dust detection sensor.

FIG. 12B shows another configuration example of the node 4C00. This node 4C00 can receive detection values from multiple sensors 4AS1, 4AS2, and 4AS3. The detection values of the sensors 4AS1, 4AS2, and 4AS3 can be received either wirelessly or wired. In the case of wireless sensors, sensors pre-equipped in the car or plane are used.

For the sensors 4AS1, 4AS2, and 4AS3, various types can be selectively used according to the environment in which the node 4C00 is used.

The node 4C00 with such sensors can acquire the location in the car or plane (GPS), the temperature, the air pressure and the like at the same time, and notify them to the smartphone 1519.

Figure 13:
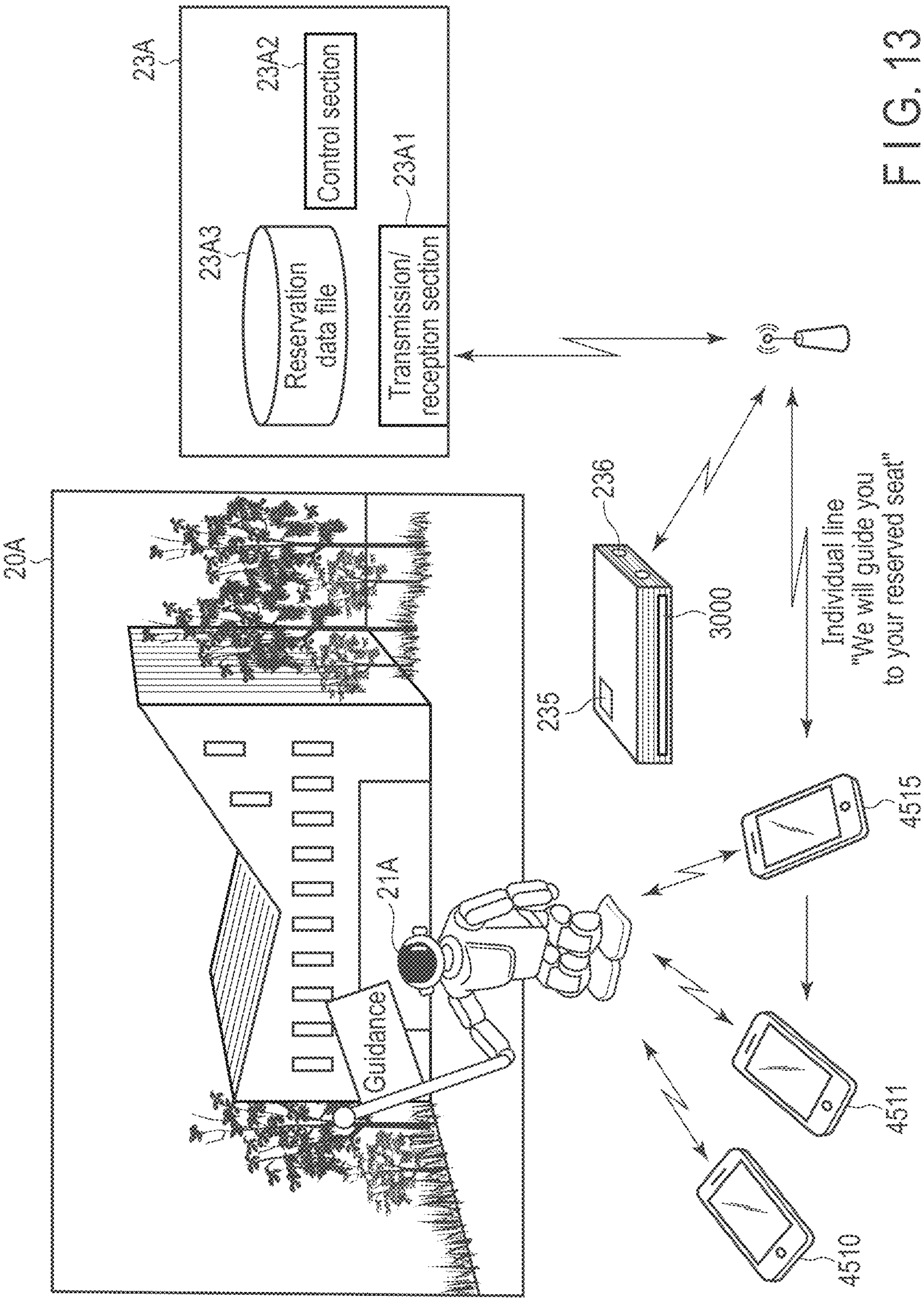
FIG. 13 is an explanatory diagram showing an embodiment of the case where the basic system of the present invention is applied to a meetup detection system and or a customer flow line system.

FIG. 13 is an explanatory diagram showing an example in which the embodiment of the invention is used in a system for uses to meet up at an event venue, an entrance of a shopping mall and the like, a group inspection system, a customer flow line system and the like. Here, note that spectators in many cases meet up near the entrance of a venue. Or, for group travelers, inspections of the group may be conducted. Or, there may be the case where it is greatly difficult for an individual by himself/herself to get to the reserved seat because the venue is large in size.

20A is an event venue where various events are held. The meetup system can be utilized, for example, by people who share the same interests, members of the same fan club, and the like.

Finding friends, fan club members, members of alumni and the like by meeting up can be achieved, for example, by the methods described in FIGS. 10A, 10B, and 10C.

Further, a guide robot 21A is disposed near the main entrance of the event venue 20A. This guide robot 21A contains an agent 3000 built therein, and comprises a beacon communication section 235 and a network communication section 236.

The network communication section 236 of the guide robot 21A can communicate with a predetermined server 23A via a base station 22A.

The server 23A includes a transmission/reception section 23A1, a control section 23A2, and at least a reservation data file 23A3 for the event venue. Let us suppose here that the reservation data file 23A3 records reservation data for the users who own smartphones 4510, 4511, 4515, respectively. The reservation data may contains, for example, the device ID of the user's smartphone, the phone number of the smartphone, the reserved seat data, the reservation date, the user's age and the like.

Now, when the users each approach the robot 21A, a broadcast is carried out between the smartphones 4510, 4511, 4515 owned by the users and the agent 3000 built into the robot 21A.

Then, the agent 3000 transmits the device ID of each of the smartphone 4510, 4511 and 4515 to the server 23A via the network.

Here, suppose that the server 23A contains the reservation data of the event venue 20A for each of the smartphones 4510, 4511, and 4515. Therefore, the server 23A detects the phone numbers of the smartphones 4510, 4511, and 4515, the reservation date, and the reserved seat data from the reservation data.

Further, when the server 23A detects the reserved seat data, it starts a program for guidance from the entrance of the event venue (location of the robot 21A) to the reserved seat. This guidance program always contains information on the locations of restrooms, but may as well contain information on souvenir shops.

The audio voice guidance and the flow line information (for example, navigation information by screen) by the above-described guidance program are transmitted from the server 23A to the smartphones 4510, 4511, and 4515, respectively, via the base station 22A on separate lines. With this system, customers can get to their reserved seats without anxiety.

The above-provided example is described in connection with the case of a customer flow line system for the event venue 20A. Here, it is only natural that this embodiment can be applied not only to the event venue 20A, but also to a large-scale shopping mall, department store, airport or the like. In this embodiment, in place of reserved seats, the context of the product to be bought, exit number, entrance number and the like set on the server.

Furthermore, when this system is used as a meetup system, the following considerations are taken into account. Let us assume now that "viewing paintings" is registered as the context data, and "date", "meeting up" "the number of persons in the group" and the like as attribute information.

In such a case, the time when multiple users of one group gather around the robot (context area) shifts from one to another. Therefore, when the agent 3000 communicates with an arriving node, it judges whether or not there is at least a purpose description of "meeting up" in the attribute information in addition to the context data "viewing paintings". When this node has the attribute information "meeting up", the agent 300 judges whether a user who is associated with the same context matching has already arrived. Further, it describes the device ID of the user on new arrival in the memory for the group. Then, to the node of the user on new arrival, it transmits back by broadcast the current number of persons having gathered (, which is actually the number of nodes).

Figure 14:
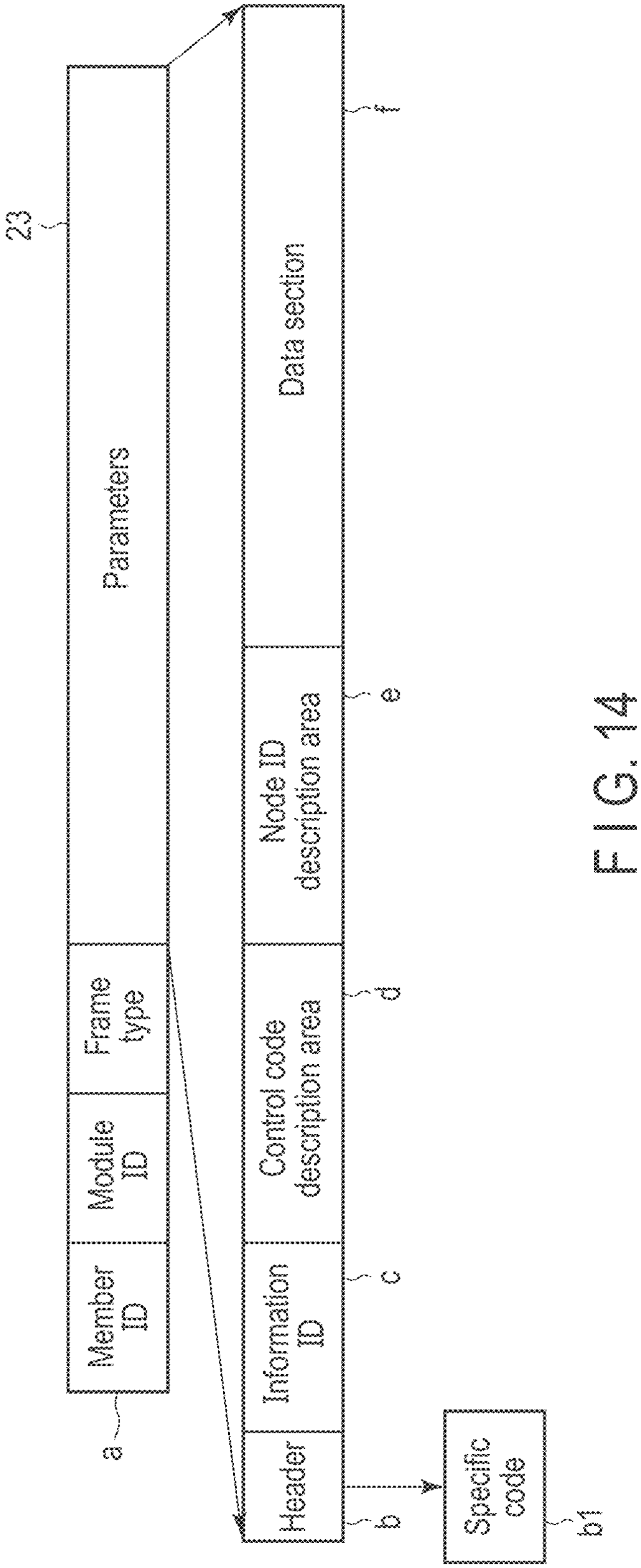
FIG. 14 is an explanatory diagram showing an example of data configuration of a beacon packet used in the embodiment of the present invention.

FIG. 14 shows another example of the case of using the user area of a beacon packet.

In the user area 23, the member ID (Member ID: identification information of the user of the electronic device) are describe to byte 7 to byte 8, as described with reference to FIG. 1. To byte 9 to byte 10, the module ID (identification information for non-specific applications) is described. To byte 11, the frame type (Frame Type) is described. It is explained that the frame type (Frame Type) indicates the type of transmission.

Further, byte 12 to byte 31 are the parameter section (Parameters: transmission information). The parameter section stores multiple parameters. Each of the parameters is constituted by a TL section and a VAL section, where the TL section is one byte and is constituted by a TYPE field and a LENGTH field. The TYPE field has been explained that it is used to distinguish whether the type of data in the VAL section (there are int-type, float-type and string-type) is one of the int-type, float-type and string-type.

FIG. 14 shows another example of parameters(, which may as well be referred to as data) described in the parameter section described above, but the example is not limited to this format. The data area of the parameter section includes a header area b, an information ID description area c, a control code description area d, a device ID description area e, and a data description area f.

In the header area b, a specific code of the parameter section is assigned to the header area b. In the information ID description area c, which follows next, identification data indicating what type of information (especially the type of data in the data section) is being transmitted, is described. The types include, for example, GPS information, sensor information, and the like. Furthermore, there may as well be information on the number of bytes allocated for the description area for various types of data, as in the file system.

The description area e of the node ID is for the identification data of the device transmitting this beacon packet 21, that is, for example, identification data that identifies the device as an agent, node, smartphone, gateway or the like.

The control code area d is utilized in the case, for example, where it is informed that a new situation rule is registered, or that there is a change in the situation rule, or where the rule itself is informed.

In the data description area e, schema information corresponding to the context is used. That is, a code with a meaning agreed upon in advance by the transmitter and receiver is used. Further, depending on the type of the context matching service to be utilized, the case where raw context data is utilized is included.

The information in the above areas is generally referred to as attribute information. The above-described attribute information is not fixed or limited. Attribute information is basically an instruction for handling so-called context data. Therefore, in the system operator, the format and content of the attribute information can be various, and the important thing is that the attribute information is present in this area.

The area d for the control code may include a usage period description area. In the usage period description area, the usage period (date, day of the week, and time of day) during which this service is available is described. This usage period information can be rewritten as necessary by the system or user. For example, when the contract between the user of the sales promotion system (described with reference to FIGS. 7A and 7B) and the system operator expires, the usage period may be automatically deleted by the system in comes cases. Further, when a product for sale is sold out due to the full use of the sales promotion system, the user can delete the usage period from the registration system by using the template. In the encounter detection system as well (described with reference to FIG. 10A), when an encounter is detected, the user can delete the usage period from the registration system by using the template.

Further, depending on the environment in which the agent is used, there are some that want frequent matching notifications and some that do not need so frequent, depending on the "time zone of day" or "day". In this case, the usage period description area d2 can be utilized as an information area to automatically control matching notifications for agents who need less frequent matching notifications, depending on the time of day.

Therefore, the data indicating the usage period may as well contain identification data indicating the type of usage. The context judgment section 1000 is set to recognize this identification data and then determine the form of utilization of the usage period (year, month, day of the week, and time of day) to execute control of the agent.

The area d for the control code includes an area d3 for describing the device ID for which data transmission should be eliminated or denied. This area d3 is used by the agents 2000 and 3000 to thin out the device IDs to which data is to be transmitted each time they carry out the broadcast.

For example, when the context areas of two agents overlap each other, a node may receive matching reports from the two agents in some cases.

For example, when the context areas 10 and 20 in FIG. 2A overlap, it means then that the nodes 4100 and 4400 "group of melon-shaped bread lovers" receive matching reports of "melon-shaped bread discount" from the two agents 2000 and 3000. In such a case, the context judgment section 1000 can control the agents 2000 and 3000 to thin out the device IDs (4100, 4400) to be transmitted each time a broadcast is carried out. For example, in this example, in one out of every two broadcasts, the transmission of the device IDs of the devices 4100 and 4400 is denied. For example, in the area d3, the device ID to be denied and the frequency per broadcast (for example, ½ in this example) is described. When three context areas overlap, a frequency of ⅓ is described.

The transmission data processing program in the agent is set up so that the specification of the frequency is carried out by the agents 2000 and 3000 under their own control based on the notification from the context judgment section 1000. (The duplicate elimination can be executed).

Further, in order for the above-described process to be realized, the context judgment section 1000 needs detect that the context areas 10 and 20 overlap each other. This detection is carried out as follows. That is, when the agent 2000 notifies the situation, the device ID of the agent 3000 is contained in the data to be notified, and when the agent 3000 further notifies the situation, the device ID of the agent 2000 is contained in the data to be notified. In such a case, the context judgment section 1000 judges that the context areas 10 and 20 overlap each other. The context judgment section 1000 then controls each of the agents 2000 and 3000 so that the frequency is set in the above-described area d3.

Furthermore, the area d for the control code includes a description area of context data to be rejected in the matching process. For example, terms that are clearly offensive to public order and morals are described in the description area.

Moreover, the area d for the control code includes a description area for a flag indicating whether or not there is subsequent data to be transmitted. For example, "end" or "continue" is described in this description area. As described above, in a single beacon communication in this system, the amount of data that can be transmitted in the parameter section is limited. Therefore, when the capacity of all data to be transmitted exceeds the capacity of the data to be transmitted in one beacon communication (this time), "continue" is described in the description area d5. The subsequent data is further transmitted in the next beacon communication.

As described above, providing the file system area c and the attribute data description area d to the parameter section, diverse and enhanced beacon communications can be realized.

Furthermore, a description area for a password "use" and "not use" may be provided in the area d for the control code. This password is one agreed upon in advance by specific users (for example, 6C1 and 6D1) who perform beacon communication. The users 6C1 and 6D1 register a common password in advance in the memory of the data processor of, for example, a smartphone-type node. Then, when the users 6C1 and 6D1 set the password "Use or ON" on the menu screen, the symbol for the password "Use" is automatically described in the area d6 for description of the presence/absence of the password. In this way, only the users 6C1 and 6D1 can exchange mutual information with each other via beacon communication. That is, when the parameters obtained through beacon communication are compressed by the password, the mutual nodes use the password to decompress the other with the device ID or context. Note here that when the users 6C1 and 6D1 set the password "not used or OFF" on the menu screen, the context matching process can be carried out through the normal beacon communication. In this case, an operation similar to that of the previously described embodiment can be achieved.

Figure 15:
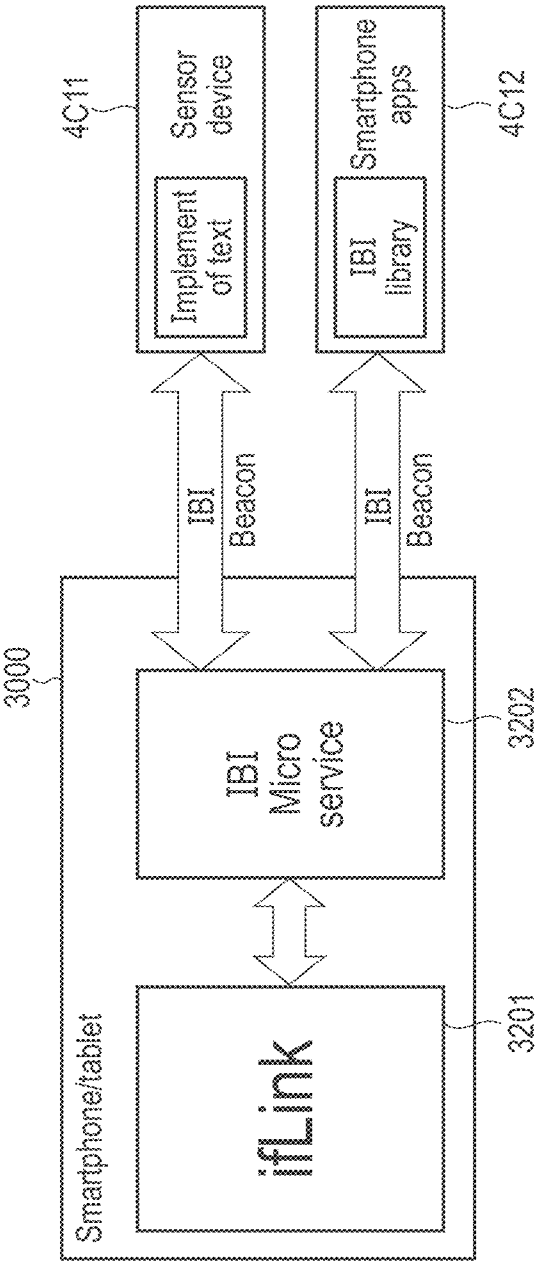
FIG. 15 is an explanatory diagram showing an embodiment in which the basic system of the present invention is further combined with an ifLink (registered trademark) system.

FIG. 15 shows an embodiment in which the information processor of this system is further combined with the ifLink (registered trademark) system. Here, the information processor can be an agent or a node, and will be described as an agent 3000.

On the other hand, the inventors have already developed a method of utilizing a smartphone when combining the ifLink (registered trademark) system with an IoT (Internet of Things) system. Then, further, this time, the inventors have developed a new system in which the smartphone type agent 3000 is further combined with the ifLink system.

The agent 3000 shown in FIG. 15 is installed with an ifLink application 3201 and an ifLink Beacon Interface (IBI) micro-service 3202. The IBI micro-service 3202 can bridge between the ifLink application 3201 and the various types of information processors described in the embodiments previously described based on the micro-service. Thus, the IBI macro-service 3202 can read data transmitted in a beacon signal format and is installed with schema information to convert it into data used by the ifLink application 3201. Further, conversely, the IBI macro-service 3202 can also convert data used by the ifLink application 3201 into data in beacon signal format by schema information.

The example shown in the figure illustrates the case where a sensor-integrated node 4C11 is connected to an agent 3000 via IBI, and a smartphone-type node 4C12 connected to an edge computer 3000 via IBI.

The node 4C11 transmits different texts to the agent 3000 as service information between, for example, when $CO_2$ is at a specified value or lower and when more than the specified value is detected. When $CO_2$ is at the specified value or lower, for example, the text (service information) is, for example, "ventilation is sufficiently maintained". If more than the specified value is detected, it is a text (service information), for example, "$CO_2$ is high, please ventilate the room now". These texts are described in the memory of the node 4C11 as data for packet.

Note here that the texts are not limited to those provided above, but may as well be a pre-arranged symbol or code. The symbols or codes may as well be those interpretable by the ifLink application 3201. According to this method, the amount of data in the beacon signal can be less, and the response language (text output or voice output) of the ifLink application 3201 can be set to match the language used by the user of the agent 3000.

The smartphone-type node 4C12 includes, for example, an IBI library and is configured to convert the smartphone's own language into a type of language that can be understood by the IBI micro-service 3202 to be transmitted. In this case, the data used for this conversion is referred to as schema information. In this way, the smartphone-type node 4C12 can easily download and acquire applications that function as IBI libraries from a given server and easily set them for general smartphones.

<Outline of ifLink System>

Figure 16:
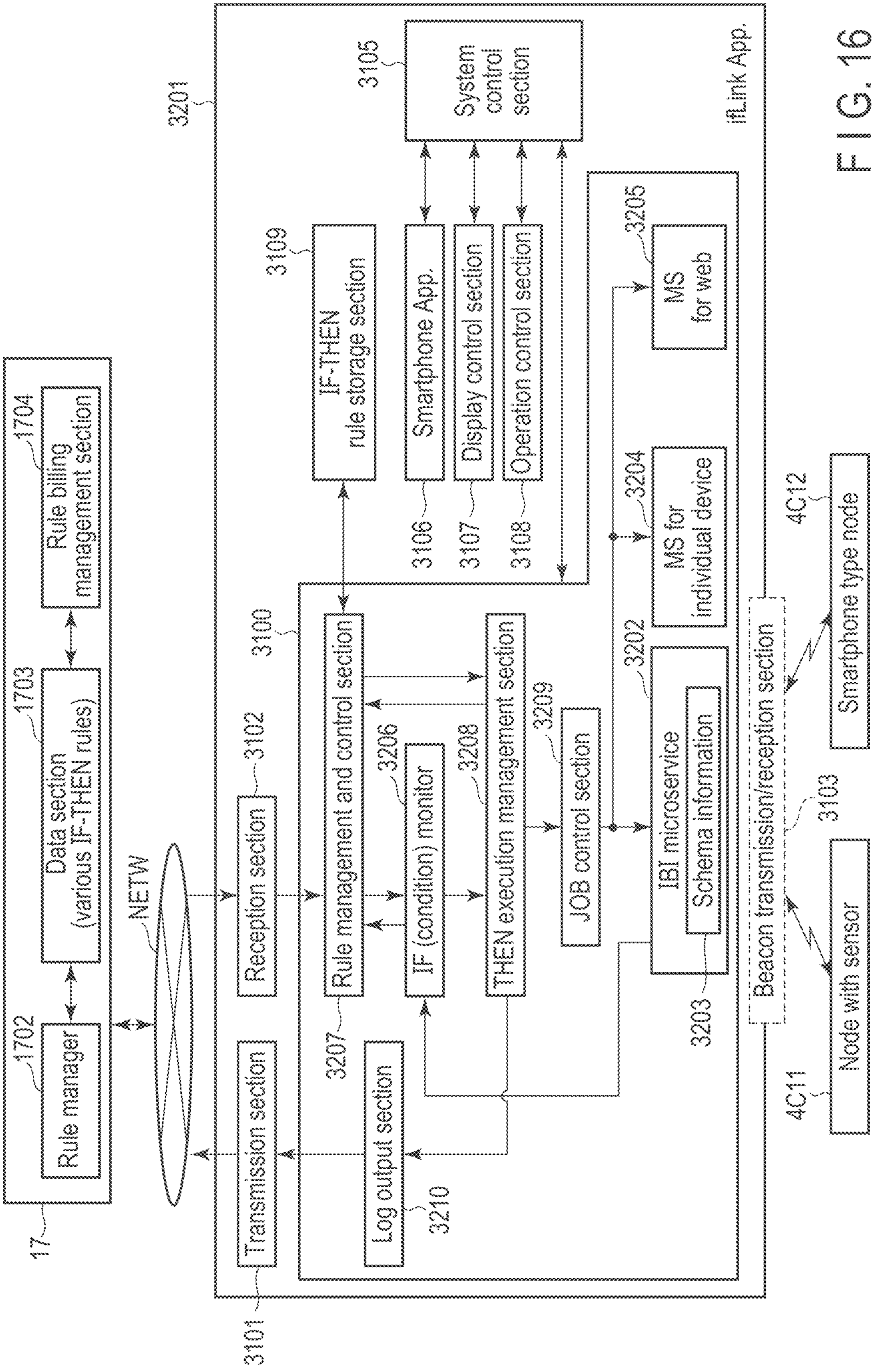
FIG. 16 is a diagram illustrating an outline of the ifLink system.

FIG. 16 is a diagram illustrating an outline of the ifLink system. By combining the ifLink system with the broadcast system described above and a unicast system, a variety of functions can be realized.

In the ifLink system, the IF-THEN rule is used. The IF-THEN rule is a rule for setting a "promise item" or "agreement item" corresponding to a "condition item" such that if the condition IF=A is satisfied, the action THEN=B is triggered.

<Outline Inside Server 17>

Various types of IF-THEN rules are stored, for example, in the data section 1703 of the server 17. The various IF-THEN rules are managed by the rule manager 1702. The rule manager 1702 manages the producers of the IF-THEN rules, the selling and lending of rules and their prices, and the like, as well as the acceptance of new rules and the disposal of old rules, and the like.

The rule billing management section 1704 manages users who use IF-THEN rules, and can also issue rule usage fees, etc. to the users. Further, the users can manage the period of time that users use the IF-THEN rules.

<Outline Inside Agent (or Node) 3000>

If the agent 3000 is a smartphone type, it has a smartphone application 3106. Further, it includes a display control section 3107 and an operation control section 3108. For the operation control section 3108, a touch panel integrated with the display section is often used. Further, here, the ifLink application 3201 is mounted on the agent 3000 to control the entire system. The ifLink application 3201 further includes an IF-THEN engine 3100.

The system control section 3105 controls the smartphone application 3201, the display control section 3107, the operation control section 3108, the ifLink application 3201, an IF-THEN rule storage section 3100 and the like as a whole, and adjusts and controls the control timing and operation timing of each section.

The agent 3000 comprises a transmitter 3001 and a receiver 3002 connected to the network NETW. The ifLink app 301 can access the server 17 via the transmitter 3101 and request desired IF-THEN rules. To the IF-THEN rules, for example, names (for example, identification names of those of available equipment, of systems and the like) are added, and introduced in catalogs or the like. The user can download the desired IF-THEN rule via the receiver 3102 by entering the desired identification name into the entry screen.

The IF-THEN rules are stored in the IF-THEN rule storage section 3109 via the rule management section and the control section 3207. The IF-THEN rules are each single one, but in many cases, they are IF-THEN sets, which are collections of multiple rules.

Multiple IF-THEN rule sets are identified by a rule set ID. They are adjusted by a rule management and control section 3207 so that when identical rule sets are retrieved from the server 17, the rule added later becomes valid. When the rules have been updated, the user is notified so via the display control section 3107.

As to the rule management and control section 3207, when the IF monitor 3206 receives the first "condition" from the IBI micro-service 3202, the "condition" is given to the rule management and control section 3207. The rule management and control section 3207 then reads the rule set first containing the "condition" from the IF-THEN rule storage section 3109, and sets it in the THEN execution management section 3208.

Here, the THEN execution control section 3208 has already received the first "condition=IF" set in the rule set. Therefore, the THEN execution management section 3208 gives the command for "trigger=THEN" corresponding to this "condition=IF" to the JOB control section 3209. The JOB control section 3209 gives the command to the IBI micro-service 3202. The IBI micro-service 3202 transmits the "detection data" corresponding to the command to the IBI-compatible external device by beacon signal.

As described above, one JOB is executed, and the information is transmitted to the rule manager 1702 and/or the rule billing management 1704 via the log output section 3210 and the transmission section 3101.

The above-described "detection data" is transmitted to, for example, the node 4C12 via the beacon transmission/reception section 3103. The beacon transmission/reception section 3103 may be integrated as one with the transmission/reception section 3101 and 3102 previously described.

The above-described agent 3000 comprises not only the IBI micro-service 3202, but also a micro-service (MS) 3204 for individual devices and a micro-service (MS) 3205 for Web so as to be able to communicate mutually with various individual devices.

Therefore, the JOB control section 3208 previously described adds, when transmitting a command, a code for micro-service designation to that command. That is, the IBI micro-service 3202, or the micro-service (MS) 3204 for individual devices, or the micro-service (MS) 3205 for Web is selectively specified, thereby making it possible to switch the destination for transmission and reception.

In the case of such a configuration, it is possible to reflect a TEHN execution command, which is an IF response obtained in broadcast by beacon signals, to devices connected to the MS 311 for individual devices or the MS for the Web. It means that the external commands to the MS 3204 for individual devices are given by unicast.

Contrary to the above, it is also possible to reflect a TEHN execution command, which is an IF responses obtained via the MS 3204 for individual devices or MS 3205 for the Web, to devices connected to the IBI micro-service 3202.

<Configuration Example of IF-TEN rule>

FIG. 17 is a diagram showing a configuration example of the IF-THEN rule. This is a configuration example to illustrate the basic concept of a rule set. For example, let suppose that a rule set 6010 includes four rules, Rule 1 to Rule 4.

In the figure, the IF device indicates devices to be distinguished as IF1, IF2, IF3, . . . , and the THEN device indicates devices to be distinguished as THEN1, THEN2, THEN3, . . .

The Rule 1 links IF1 of the IF devices and THEN of the THEN devices with each other, and it is a rule in which when a condition of the IF device IF1 (hereinafter "condition" means an operation condition, detection condition or the like) is satisfied, the THEN device THEN1 is triggered (hereinafter, "trigger" means responding, or starting, stopping or the like).

The Rule 2 is a rule in which when the conditions of the IF2 of the IF devices and the IF3 of the IF devices are satisfied at the same time, the THEN device THEN2 is triggered.

The Rule 3 is a rule in which when the condition of the IF4 of the IF devices is satisfied, the THEN device THEN3 and the THEN device THEN4 are triggered.

The Rule 4 is a rule in which when the conditions of the IF5 of the IF devices and the IF6 of the IF devices are satisfied at the same time, the THEN device THEN5 and the THEN device THEN6 are triggered.

Here, as the entire attribute information 6011 of the ruleset, there are an overview of the ruleset(, which can be described in text), ruleset identification data, and ruleset name(, which can be described in text). In this case, there may further be information (identification data) on the micro-services corresponding to this rule set. That is, the micro-services prepared to reflect the rules of the ruleset to external devices may be specified by the entire attribute information.

In addition, ruleset priority information, ruleset enable/disable setting information, and ruleset usage environment information may as well be present.

The ruleset priority information is an information item that determines the priority of other rulesets that may be in conflict with the ruleset, and may be described together with other ruleset identification data that may be in conflict with the ruleset. The rule set enable/disable setting information is an information item that sets whether this ruleset should function or not. Therefore, in combination with the period information, it is also possible to set the validity period or invalidity period of the ruleset. Further, there may be ruleset usage environment information, which is an information item that describes, for example, the predetermined conditions (environmental conditions) under which this ruleset is to be adopted. It is, for example, when the weather is sunny, or when being used in a special facility. The environmental conditions may be automatically described by, for example, an edge computer that stores the rulesets. Further, attribute information of the particular usage environment, such as facilities, users, issues, GPS information, etc., may as well be described. The attribute information of the usage environment may as well be automatically described by the edge computer that stores the rulesets, or it may be described by a user who owns the edge computer from outside the edge computer.

As the attribute information for an individual rule 6012 (rule 1, 2, 3, . . . ), there are a rule name(, which can be described in text) and rule identification data. This attribute information may as well include rule priority information and rule enable/disable setting information. In addition, as in the case of the ruleset usage environment information, there may be unique rule usage environment information for each rule. In this case, the rule usage environment information defines a subordinate concept of the ruleset usage environment information.

In addition, as the attribute information of an individual IF device 6013 (IF1 to IF6), there are the IF device name(, which may as well be a sensor name or service name) (which can be described in text), the serial number of the IF device, a profile of the IF device(, which can be described in text), conditions and the like. As the conditions, the range of the operating state (detection) of the IF device, the threshold value, the inhibition time, the individual parameter and the like can be set.

The range of operating state (of detection) is an information item that transmits a detection output when, for example, a temperature sensor detects a range of 20 to 25 degrees. The threshold is an information item that transmits a detection output when, for example, 30 degrees or higher is detected. The inhibition time is an information item that determines, for example, how many seconds after the detection the detection output should be transmitted. With such attribute information, when the detection outputs are from the same IF device, and the detection outputs have different values (different values in terms of value range or value threshold), it is also possible to specify different THEN devices according to the respective value ranges or value thresholds. Further, it is also feasible even for the same THEN device of its own to trigger different control commands to the same THEN device according to the respective different values input from the IF devices.

The IF device described above is basically a preceding element that causes an action first, and includes the attribute information including at least the preceding element identification information such as sensor name, serial number and the like.

Meanwhile, as attribute information 6014 of an individual THEN device, there are the name of the THEN device(, which may as well be a sensor name or service name) (which can be described in text), the serial number of the THEN device, the profile of the THEN device(, which can be described in text), conditions and the like.

As the conditions, the inhibition time of the THEN device, sensor name, control target, and individual parameter can be set.

The inhibition time is an information item that determines how many seconds after receiving a detection notification from an IF device, a response should be initiated, or the waiting time to determine whether or not operation environments of other THEN devices (or other IF devices) have been ready.

The sensor name(, which may as well be referred to as ifparam) is the name or number of the IF device as the corresponding preceding element, and is an information item that can reliably link it to the corresponding IF device.

The control target refers to the section or switch to be specified further among the THEN devices. When the control target is described, it is effective when, for example, the current or voltage of the THEN device is to be further controlled in the power-on state, rather than simply controlling the power on or off thereof.

The individual parameter are information items for generating specific control information. For example, there is specific information to set the operating range (for example, information to limit its height in the case of drone control).

Here, it is preferable that in the above-described attribute information as well, data that identifies the micro-service that outputs commands to external devices should be described. With this configuration, it is possible to prevent this edge computer (for example, 300) from inadvertently controlling devices in other areas, etc. That is, with the micro-service, the IF devices and THEN devices that should be under its own jurisdiction can be specified, and therefore it is possible to avoid from responding to or controlling IF devices or THEN devices under the jurisdiction of other micro-services.

The THEN device described above is basically a postceding element that executes a postceding action in conjunction with the preceding action, and includes attribute information including at least postceding element identification information such as device name, serial number, and the like.

Further, "event-related information" may be described as attribute information. The event-related information is a field where, for example, the device name, serial number, profile or the like, of the IF device is described when this THEN device operates and this operation affects other IF devices. Further, what sort of effect may be caused can be made describable in text as a profile. For example, in the case where the THEN device is a device that emits a specific sound, it may affect the IF device in some cases as a sound sensor, which is not originally related thereto. Further, in the case where the THEN device is a device that outputs light, it may affect the IF device as an optical sensor. If such cases are known in advance, the user can consider replacing the THEN device or IF device with another sensor. In the event-related information, the rule set is described in advance, for example, by the manufacturer who sells and provides, but it may as well be made to be consciously describable by the device of the user's own in the edge computer. In this manner, a variety of ways to use the rulesets can be created.

Note that each attribute information is provided with an attribute identification information(, which may as well be referred to as a header) for identification. The rule execution program can read the attribute identification information to determine the type of attribute and the presence/absence of the attribute information. The rule execution program, when determined that the attribute information is described, can check the content of the attribute, whereas when determined that the attribute information is not described, it does not check the attribute information.

When there is no attribute identification information, the rule execution program carry out the content determination of the attribute information sequentially according to the order of the attribute description symbols (for example, deviceserial=, id=, etc.). In the case of the attribute information whose content has not been determined, for example, 0000 is described in, for example, the header of the attribute information or in the predetermined data area following the attribute description symbol. In this case, the judgment and processing of the attribute information are ignored.

In the above-described attribute information, information indicating (or recommending) the space where the rule set is to be used (scene information where the rule set is adopted), user information of the user using the ruleset, and themes related to the ruleset, may be described as the rule set usage environment information described earlier. Further, these information items such as scene information, user information, themes and the like may as well be selectively described in the attribute information of the IF devices and the attribute information of the THEN devices.

<Further Explanation of Use Method of Beacon Signal>

FIG. 18 shows an example of the configuration of the frame type (Frame Type) shown in FIG. 1. With use of the Frame type, intercommunication using beacon signals can be further advanced in terms of content. Therefore, the use of the frame type is effective for the case of transmitting and receiving context data with important contents.

The frame type is constituted by one byte and consists of a REQ/RES flag indicating request/response, a REPLY flag indicating whether or not a response to the command is required, and the actual command (COMMAND).

For example, in the case of transmission of a sensor value, the "request" means the transmission of the sensor value from the smartphone application(, which may as well be referred to as an individual application) of the smartphone-type information processor 500 to the IBI micro-service 302, and the "response" means the transmission of "Sensor value received" from the IBI micro-service 302 to the smartphone application.

Bit 7 is a field for the REQ/RES flag, and when the transmission type is a request, the flag is set to 0, whereas when the transmission type is a response, the flag is set to 1.

Bit 6 is a field for the REPLY flag, and when no response is required, the flag is set to 0, whereas when a response is required, the flag is set to 1.

The commands from bit 5 to bit 0 are: 1: device registration (unused); 2: device registration result (unused); 3: sensor value notification; 4: job notification; and 5: job result notification.

FIG. 19 shows an example of the set value of the frame type shown in FIG. 18. For example, the frame type for the sensor value response (no response required) is 0×03. The frame type for sensor value response (response required) is 0×43. An example of the sensor value notification is the transmission of a sensor value from a smartphone application (individual application) as a sensor to the IBI micro-service 302.

The set value of the frame type for the sensor value response is 0×C3. An example of the sensor value response in the case of a sensor value notification (response required) is the transmission of the response "Sensor value received" from the IBI micro-service 302 to the smartphone application as a sensor.

The set value of the frame type for job notification (response not required) is 0×04. The frame type of the job notification (response required) is 0×44. An example of the job notification is the transmission of the instruction "Please perform 00 operation" from the IBI micro-service 302 to the smartphone application as a THEN module.

The frame type of the job result notification is 0×C4. An example of the job result notification is the transmission of a response "00 operation performed" from the smartphone application as the THEN module to the IBI micro-service 302.

<Example of Schema Information>

FIG. 20 shows an example of schema information according to the embodiment.

First, in this information, the device named that IBI can support are described. In this example, for example, the device name SampleDevie1 and the device name SampleDevie2 are described.

The device name SampleDevie1 means that it corresponds to the first smartphone, for example, and the device name SampleDevie2 means that it corresponds to the second smartphone, for example. Following each device name, schema information is described.

As properties, the device name (devicename), the serial number of device (deviceserial), time stamp, member ID (me mberid), module ID (moduleid), and parameters 1 (param1) to parameter 4 (param4) are described. The SampleDevie1 is the device name.

Figure 21:
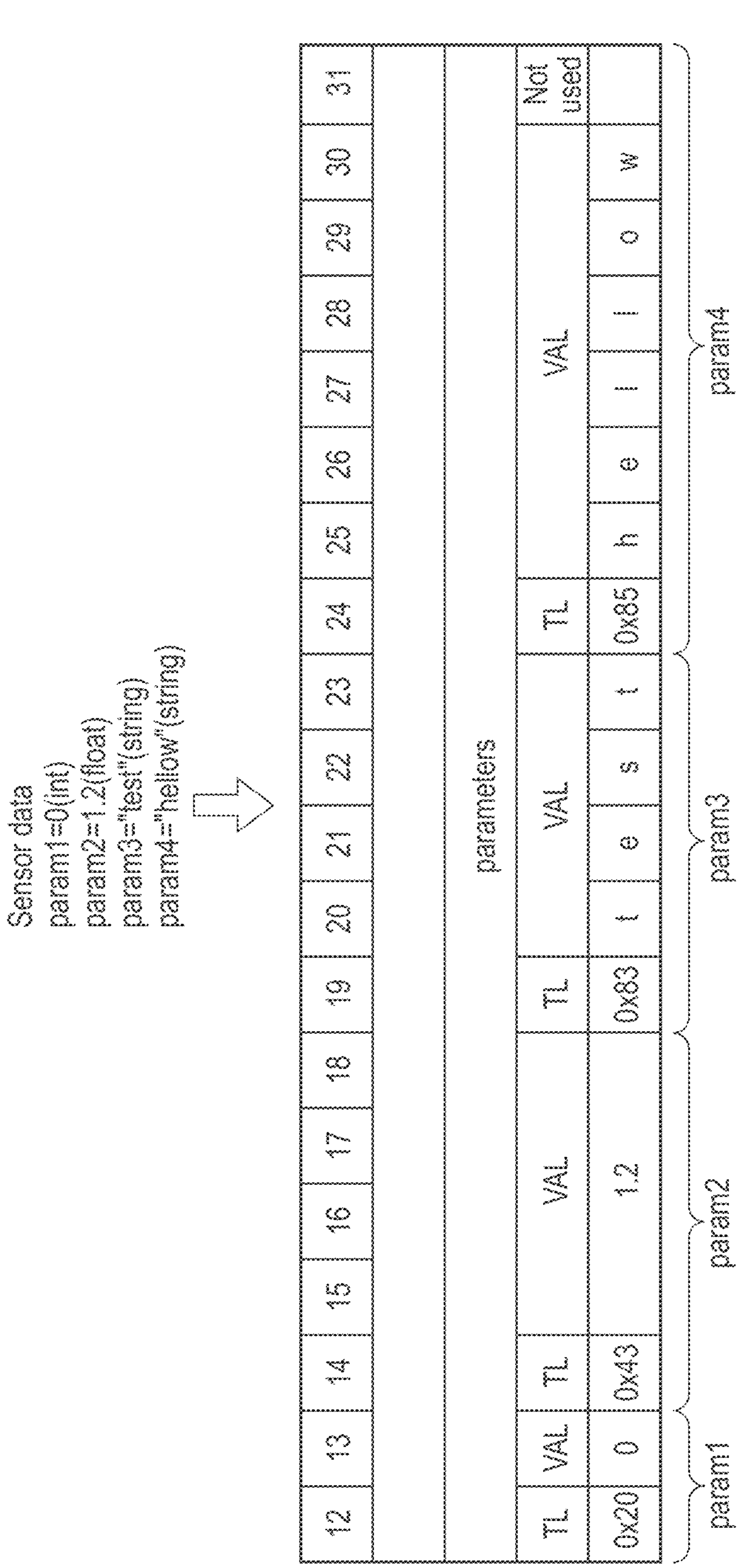
FIG. 21 is a diagram showing a configuration example of an area of parameters (Parameters) in a beacon packet for sensor value notification.

FIG. 21 shows an example of parameters (Parameters) in a beacon packet for sensor value notification. Here, however, the basic transmission pattern of context data will be described.

For example, the parameters for the time of sensor value notification(, which may be referred to as context data) are stored in the beacon packet from parameter 1 to parameter 4 in this order. In this example, 0×20 in byte 12 indicates that the first parameter (param1) is of type int, 1 byte, and byte 13 indicates its value (0). 0×43 in byte 14 indicates that the next parameter (param2) is of type float, 4 bytes, and byte 15 to byte 18 indicate its value (1.2). In this example, the individual app 34 comprises two sensors, for example, a temperature sensor and a humidity sensor, and the sensor values are stored in param1 and param2, with param1 indicating temperature and param2 indicating humidity. The number of parameters is not limited to 4, but the number is variable, depending on the data to be transmitted.

In the various types of information processors described above, a power supply system may be prepared. In the case of the smartphone type, there is already a charger. However, in the case of a simple information processor, when the power supply voltage drops, it is necessary to secure a power supply. For this purpose, an accessory such as a solar-type generator, piezoelectric-type generator, vibration-type generator or the like may be added to the power supply section. The data in the user area may be subjected to encryption or data compression with a password.

As described above, various inventions are included in each of the above-described embodiments and combinations thereof.

FIGS. 22 to 32 each show the basic configuration of the respective embodiment, and the portions in which particular devices have been made are extracted and illustrated. For the structural components identical to those described up to this point, the same symbols are attached thereto, and redundant explanations will be omitted. Here, the agents 2000 and 3000 are designated as the first information processors and the nodes 4100 to 4400 are designated as the second information processors.

Figure 22:
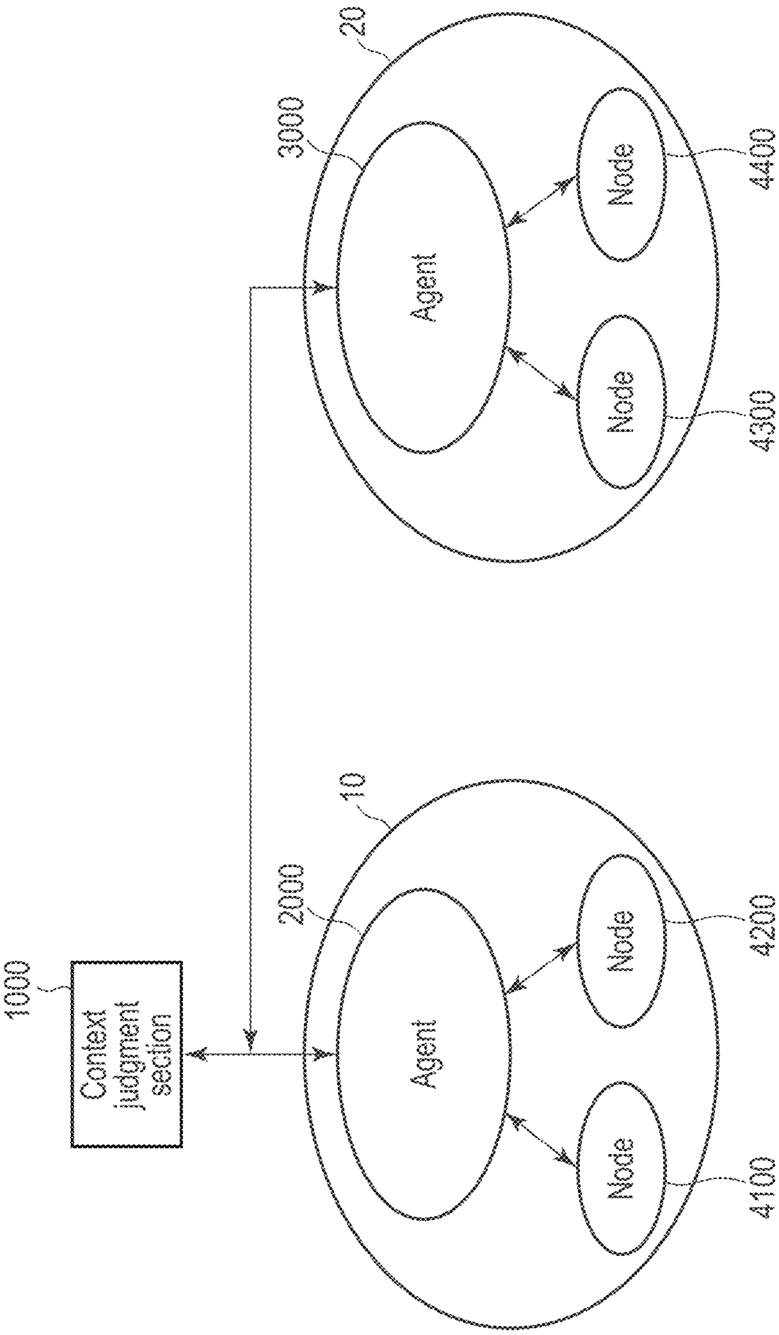
FIG. 22 is an extracted schematic diagram showing a basic configuration of an embodiment.

FIG. 22 shows the first information processors 2000 and 3000 in which the first context is registered in the context judgment section 1000, and the second information processors 4100 to 4400 in which the second context is registered in the context judgment section 1000. The first information processor and the second information processor perform beacon communication with each other, and comprise a judgment section that judges the context-related information contained in the beacon packet.

In the case where the result data of the judgment indicates that the first context and the second context are in a matching relationship, the first information processor comprises a first processor that processes the result data as node notification data, and the second information processor comprises a second processor that processes the result data as output data for user notification (display or sound or vibration).

Figure 23:
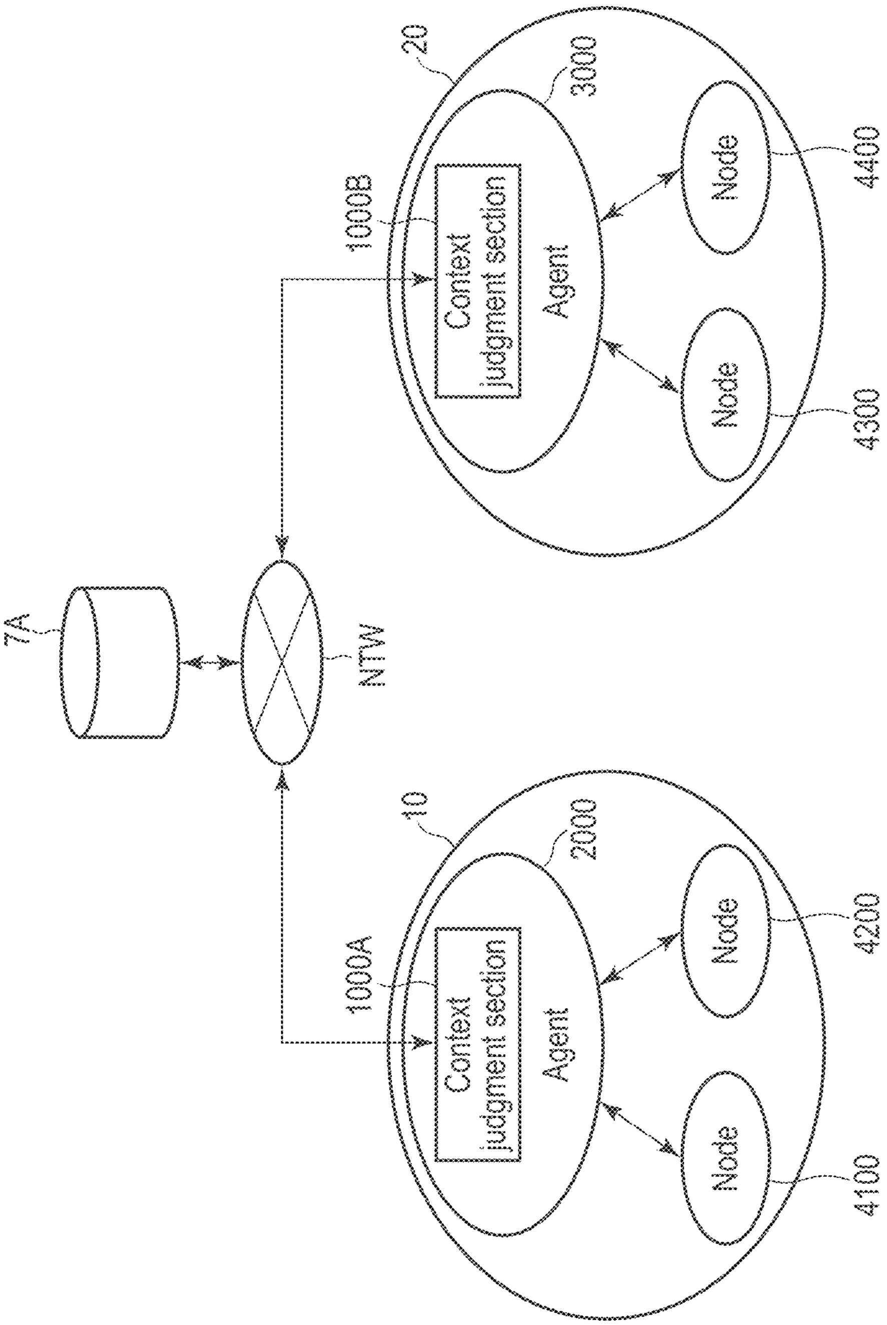
FIG. 23 is an extracted schematic diagram showing a basic configuration of another embodiment.

FIG. 23 shows the basic configuration of still another embodiment. This embodiment is an example in which the context judgment sections 1000A and 1000B are disposed in the agents 2000 and 3000, respectively. The context judgment sections 1000A and 1000B are connected to each other via the server 7A and the network NTW, and each can download and use the necessary software and the like. When registering the prof-information, the user can also specify the context judgment section (or agent) to be registered.

FIG. 24 shows the basic configuration of still another embodiment. This embodiment is an example in which the context judgment sections 1000A and 1000B are disposed in the agents 2000 and 3000, respectively, and the context judgment section 1000C is disposed outside of the agent (for example, on a server).

In this case, the use method illustrated with reference to FIG. 2B can be adopted. It is further possible to separately use the external context judgment section 1000C and the context judgment section 1000A or 1000B within the agent, according to the scale of the amount of data handled by the agent. For example, a store handling a small number of items for sale can use the context judgment sections 1000A and 1000B in the agent, while a shopping mall handling a large number of items for sale can use the external context judgment section 1000C.

Figure 25:
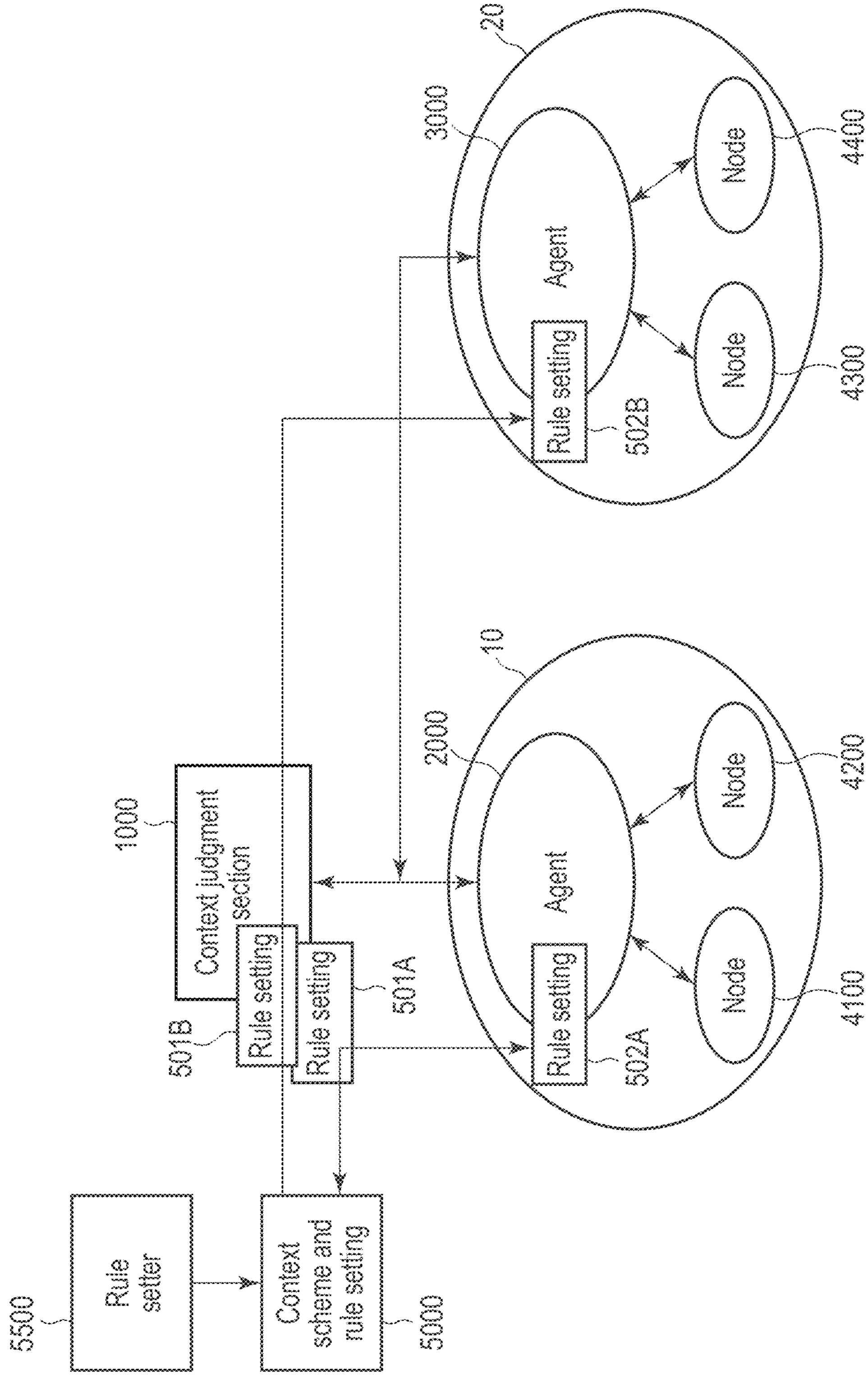
FIG. 25 is an extracted schematic diagram showing a basic configuration of still another embodiment.

FIG. 25 shows the basic configuration as still another embodiment, which extracts the especially devised sections in illustration. In addition to the embodiment of FIG. 22, the system is made accessible for the rule setter (the party (person, business, etc.) on the side who carries out the rule setting for the situation) 5500. The rule setter 5500 operates the context scheme and rule setting system 5000. The context scheme and the rule setting system 5000 is connectable to the context judgment section 1000, which designs and sets the user service forms by setting the rules for the situations that are in matching relationship. The service forms include the watch-over service and sales promotion service, previously described. For the context scheme and rule setting section 5000, input sections for at least a context and device ID are prepared as elements for setting the situation rules. In this example, the situation rule setting is implemented for each of the agents 2000 and 3000 via context judgment section 1000 outside the agent.

Figure 26:
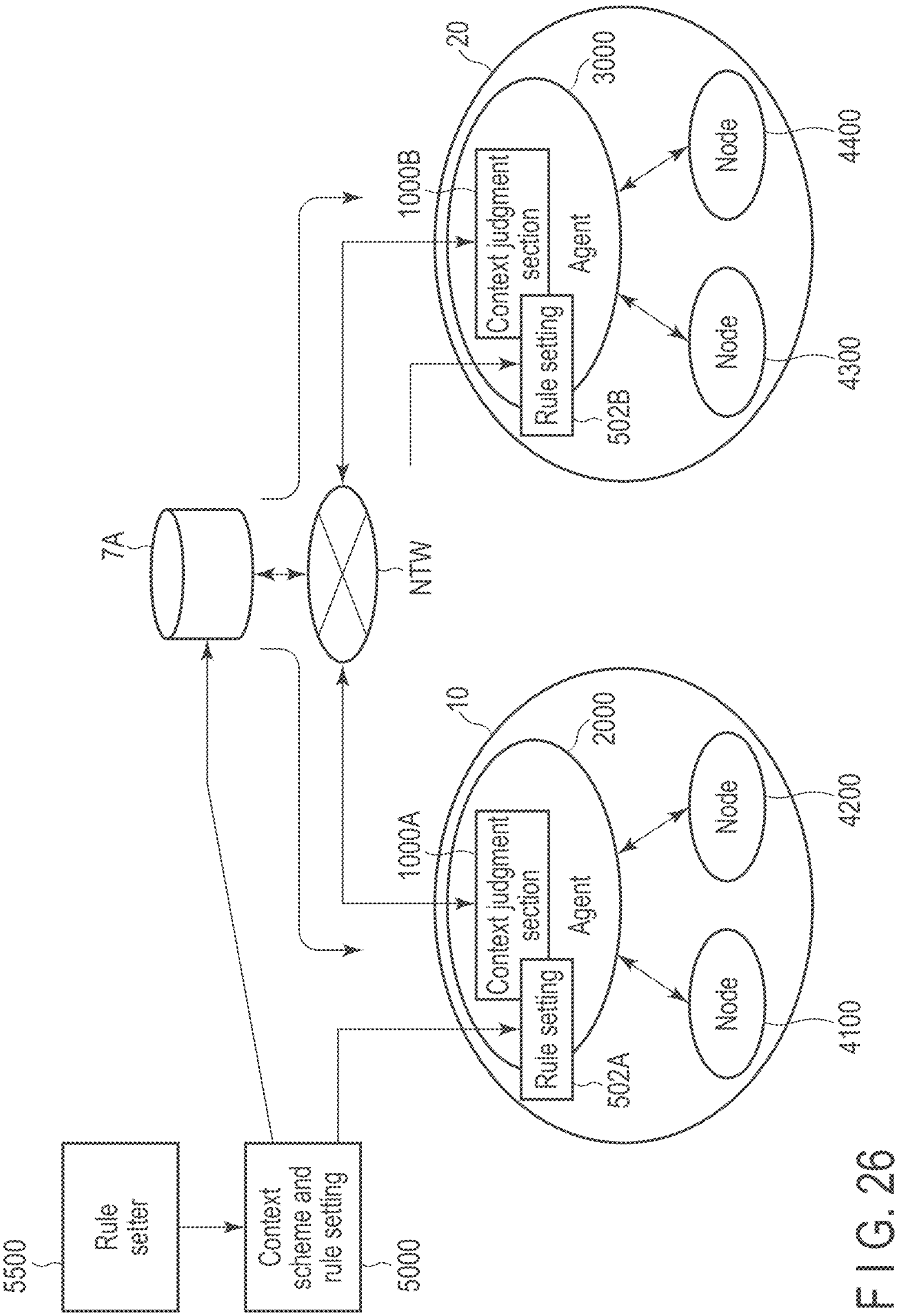
FIG. 26 is an extracted schematic diagram showing a basic configuration of still another embodiment.

FIG. 26 shows an example where the situation rule setting is implemented directly in the context rule setting section in the agent, as compared to the type shown in FIG. 25. But, the information for the situation rule setting may be transmitted to each of the agents 2000 and 3000 via the server 7A.

Figure 27:
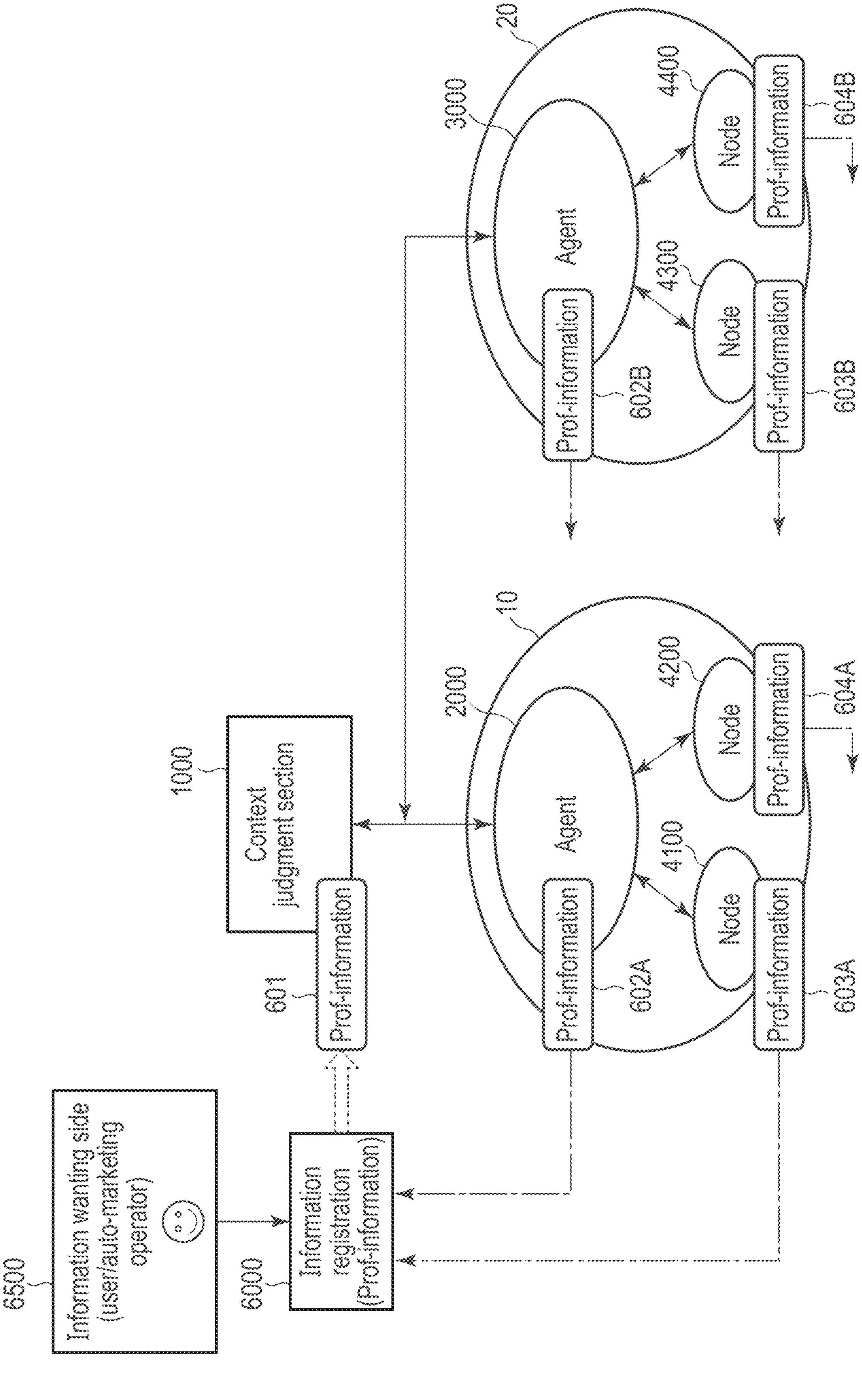
FIG. 27 is an extracted schematic diagram showing a basic configuration of still another embodiment.

FIG. 27 shows an example in which, in addition to the embodiment of FIG. 22, an information registration system 6000, to which the user actually enters profile information, is added and made connectable to the context judgment section 1000 described above. That is, here, it is possible to pre-set profile information including the respective device IDs of the first information processor and the second information processor, their respective context data, which are the elements of specific judgment of the matching relationship described above.

Figure 28:
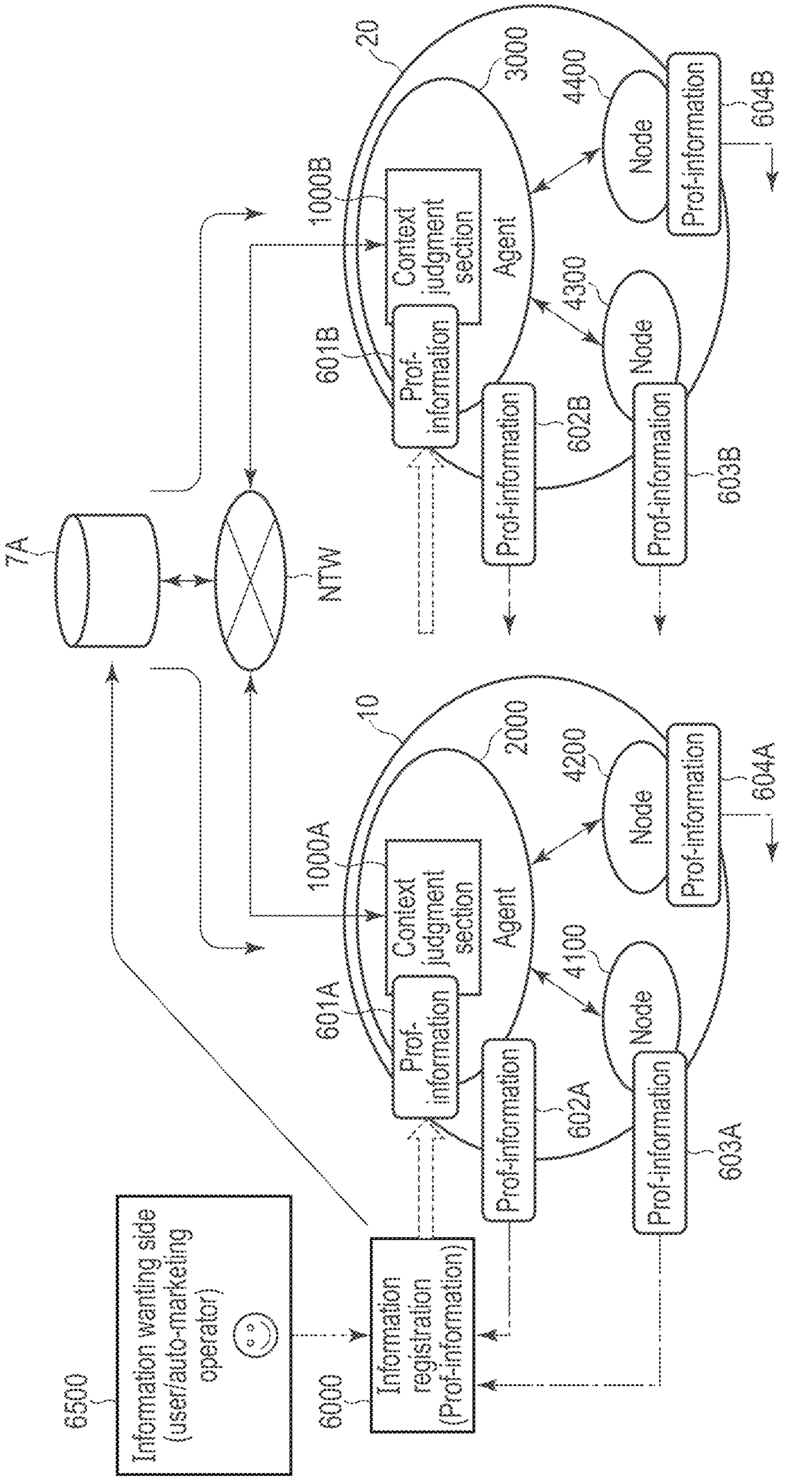
FIG. 28 is an extracted schematic diagram showing a basic configuration of still another embodiment.

FIG. 28 is an example in which, in addition to the embodiment of FIG. 22, the information registration system 6000 for entering profile information is directly connected to the context judgment section 1000A or 1000B in the agent. In this case as well, the profile information may be transmitted to each of the agents 2000 and 3000 via the server 7A.

Figure 29:
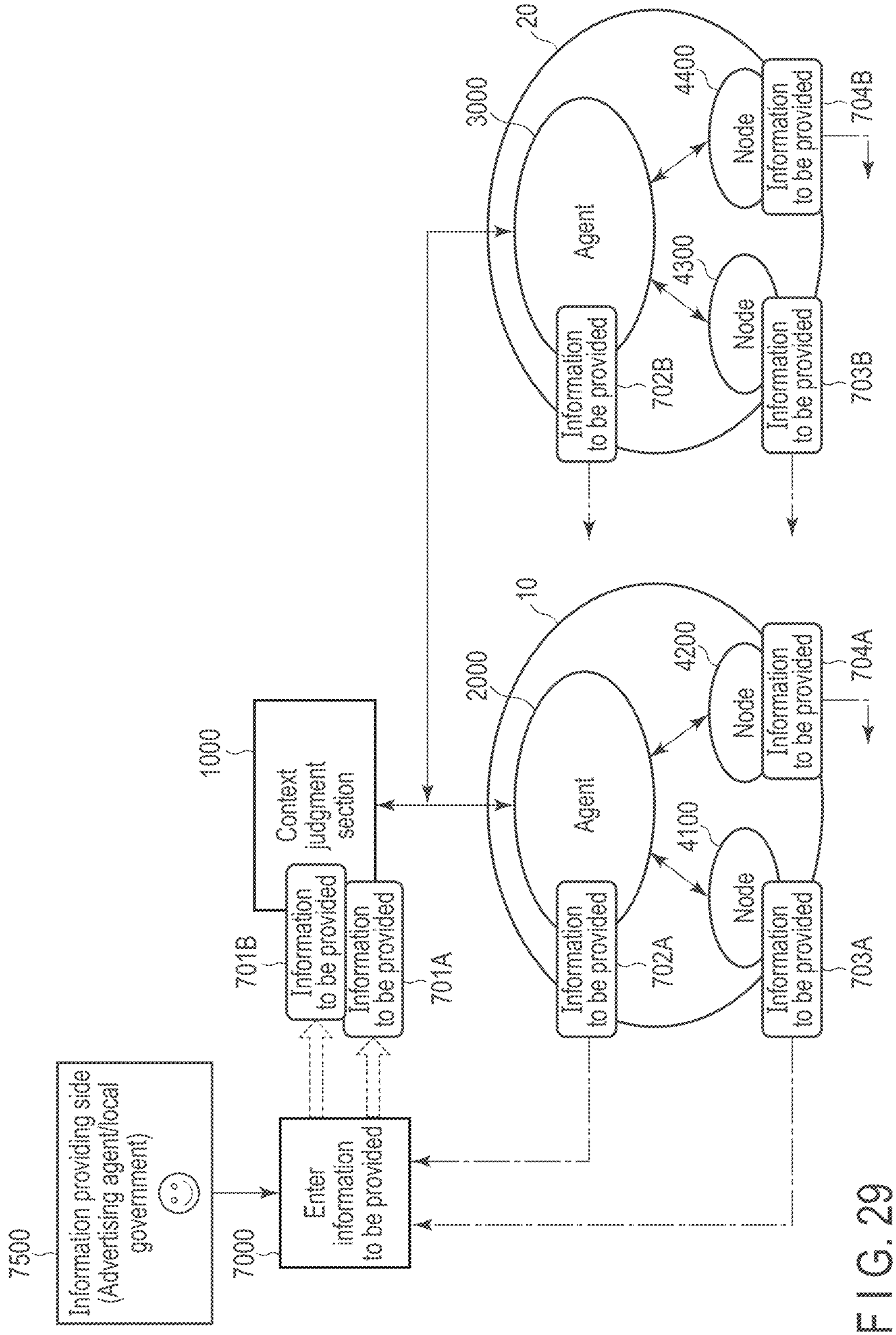
FIG. 29 is an extracted schematic diagram showing a basic configuration of still another embodiment.

FIG. 29 is an example in which, in addition to the embodiment of FIG. 22, a provided information input system 7000 is made connectable to the context judgment section 1000 described above. The provided information input system 7000 is an input system that pre-inputs the result data (data of context contents to be provided to the other party) to be given to the information processor that will be in the matching relationship described above. For example, there is information such as “melon-shaped bread discount”.

FIG. 30 is an example in which, in addition to the embodiment of FIG. 22, the provided information input system 7000 for entering provided information is directly connected to the context judgment section 1000A or 1000B in the agent. In this case as well, the provided information may still be transmitted to each of the agents 2000 and 3000 via the server 7A.

Figure 31:
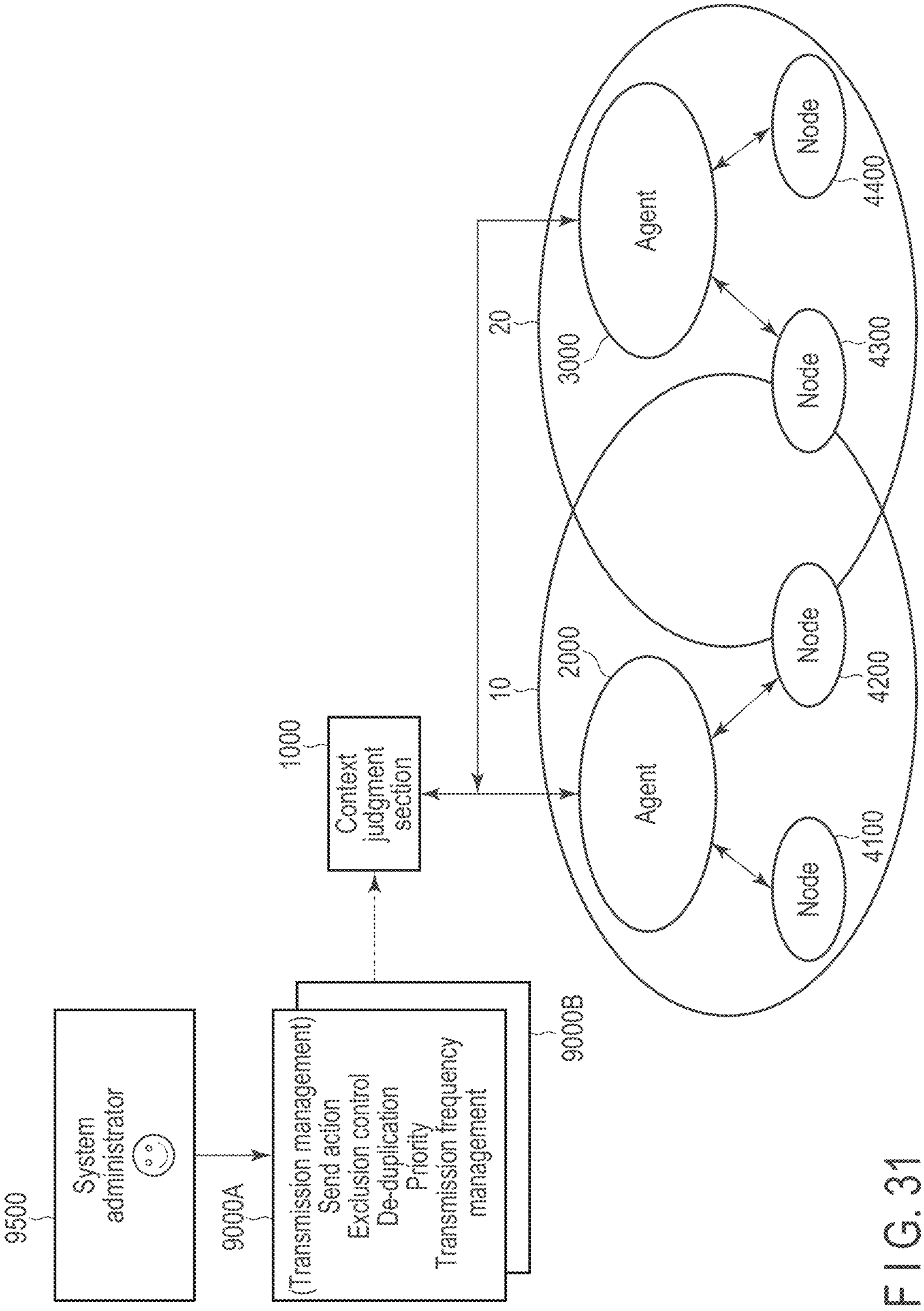
FIG. 31 is an extracted schematic diagram showing a basic configuration of still another embodiment.

FIG. 31 shows an example in which, in addition to the embodiment of FIG. 22, the transmission management systems 9000A and 9000B are connected to the context judgment section 1000 described above. The transmission management systems 9000A, 9000B are configured to manage one of the following ways: transmission frequency, exclusive control, or duplicate elimination as the form of transmission of the context-related information, so as to be able to control the transmission form of each of the agents 2000 and 3000. This is effective particularly in the case where the context areas of the agents 2000 and 3000 partially overlap each other. In the example in the figure, for example, to the node 4200 and the node 4300, the information “red wine discount" is reported from both of the agents 2000 and 3000. According to such a case, it means that in the JOB information of the agents 2000 and 3000, one extra advertisement is added to the number of advertisement results of each other. This means that, for example, when the rule setter (or the system administrator) carries out charge on the agents 2000 and 3000 for the establishment of an advertisement, the excess amount of billing is carried out.

Under these circumstances, the transmission management systems 9000A and 9000B take the following measures, for example, when the node 4200 and the node 4300 are included in the JOB information of both of the agents 2000 and 3000. For example, the billing is halved, or the frequency of beacon transmission of the agents 2000 and 3000 is reduced and evenly distributed.

FIG. 32 shows an example in which, in addition to the embodiment of FIG. 22, the provided information input system 7000 for entering provided information, is directly connected to the context judgment section 1000A or 1000B in the agent.

The transmission management systems 9000A and 9000B may allow control of the transmission output power of the agents 2000 and 3000. For example, such a control may be provided to certain agents as to further enhance the transmission output power more than usual depending on the day of the month, or the time zone of day. This control can be done, for example, by the automated marketing administrator who requests the system administrator in advance. When the output power of the transmission power is controlled, the range of the context area can be expanded or reduced. Therefore, this is especially useful for the case of sales promotions. Further, the administrator of the transmission management systems 9000A and 9000B can perform billing on the agent administrator.

<The above-provided embodiments include various inventions, and the basic structure of each invention will be summarized>

The context matching related information processing system or information processing device is characterized by the followings:

A1) The registration system (including at least the information registration system 6000) registers a context indicating at least the needs or requests of each of a plurality of information processors (agents 2000 and 3000, nodes 4100 to 4400) in the registration section (context judgment section 1000), and the transmission/reception system (the transmission/reception section 1100, transmission/reception sections of the agents 2000, 3000) is configured to carry out exchanging information with the registration system, and recognize the plurality of information processors when they are simultaneously present in the same communication environment with each other, and transmit, when the registration system determines that the context is in a matching relationship between the plurality of information processors, information indicating that it is in the matching relationship, to the plurality of information processors.

A2) Further, the context matching-related information processing system described above or the information processing device described above may include a server which carries out context matching, or agent, or the like. Further, the information processors may also include partly or entirely the registration system described above. Further, as the types of the plurality of information processors described above, there are those with sensors, those to which sensors are connected, those with display and audio output units.

<Series of Receiving Side (Agent or Node)>

B1) Such a device for receiving service information is provided, that has the following features:

this is used for a system that broadcasts a packet constituted by a header area (22) containing communication standard data and a user area (23) in which the device ID being used and context data can be written as a beacon signal;

this is a device (2000, 3000) that receives the beacon signal, and outputs, when obtaining detection data indicating that the received data in the user area is in a corresponding relationship with the context data set by the own device, service information according to the context data;

this comprises a reception section (2300, 2301) for the beacon signal, a detection section (2304) for obtaining the detection data, and an output unit (2307) for outputting the service information according to the context data when the detection data is obtained.

B2) There is provided a reception device for service information, as described in B1, wherein the detection data indicating that the received user area data is in the corresponding relationship with the context data set by the own device is detection data obtained from an external context matching node (whose matching judgment is at high level) 1000.

B3) There is provided a reception device for service information, as described in B1, wherein the detection data which indicates that the received user area data is in the corresponding relationship with the context data set by the own device, is detection data obtained by the control section of the own device (the agents or PCs 2304, 2305, 2306 with matching firmware of the own device).

B4) There is provided a reception device for service information, as described in B1, wherein the detection data indicating that the received user area data is in the corresponding relationship with the context data set by the own device is the detection data obtained by using the data in the memory that can be replaced by the control unit of the own device as the context data set by the own device (the context data of its own device is entered in advance in the exchangeable memory (2305) and can be compared with the received context data: the memory chip of the data of various genres can be replaced).

<Configuration of Agent on Convenience Store Side with Transmitter and Receiver . . . in examples of melon-shaped bread and red wine>

C1) There is provided a device for transmitting and receiving service information, to be used in a system that broadcasts a packet constituted by a header area containing communication standard data and a user area in which the device ID being used and the context data can be written as a beacon signal.

The device for transmitting and receiving service information, comprises a transmission section that transmits a beacon signal of its own device, a reception section that receives a beacon signal of some other device, and a control section that transmits (notifies) data via the transmission unit to cause some other device to output service information according to the context data set by its own device in the case where the received data in the user area of the other device is detection data indicating that it is in the corresponding relationship with the context data set by its own device.

C2) There is provided a device for transmitting service information as described in claim C1, wherein the detection data indicating that the received user area data of the other device is in a corresponding relationship with the context data set by its own device is detection data obtained from an external context matching node (whose matching judgment is at high level: server).

C3) There is provided a device for transmitting service information as described in claim C1, wherein the data for outputting the service information in another device is data describing the content of the service information (for example: melon-shaped bread discount, or coupon) in the user area of the beacon signal of its own device.

C4) There is provided a device for transmitting service information as described in claim C1, wherein the detection data indicating that the received data of the user area of the other device is in the above-described corresponding relationship with the context data set by its own device is the detection data obtained by processing of the control unit of its own device (in case where the own device is an agent or PC with matching firmware).

<Contents as Transmission/Reception System>

D1) There is provided a system for transmitting and receiving service information, to be used in a system that broadcasts a packet constituted by a header area containing communication standard data and a user area in which the device ID being used and the context data can be written as a beacon signal.

The transmission device comprises a transmission section that transmits beacon signals of its own device, a reception section that receives beacon signals of some other device, and a control section that transmits, via the transmission section, data to cause the other device to perform the operation according to the service indicated by the context data set by its own device, when receiving a beacon signal of some other device and acquiring detection data indicating that the received data in the user area of the other device is in a corresponding relationship with the context data set by its own device.

There is provided a system for transmitting and receiving service information, in which the reception device as the other device is a device that receives a beacon signal from the transmission device and detects the data to obtain the service, which comprises a reception section for receiving the beacon signal, a detection section that obtains the data and an output section unit that carries out an output according to the service indicated by the context data of its own device.

<Cooperation with ifLink System>

E1) There is provided a transmission and reception device comprising:

- an IF-THEN engine that includes IF data as a condition and THEN data for responding to the condition, in which, when the IF data is given, a ruleset for obtaining the THEN data is defined and the ruleset is set; and
- a plurality of micro-services including IBI micro-services to which commands instructing the specified "JOB" are given and micro-services for individual devices, wherein
- the IBI micro-service is connected to a beacon transmission/reception section, and
- the beacon transmission/reception section is a transmission/reception section that broadcasts a packet constituted by a header area containing communication standard data and a user area in which the device ID being used and the context data can be written as a beacon signal, and the transmission and the reception device is provided that enables the use of unit casting that utilizes the micro-services for the individual devices.

<Basic System>

F1) There is provided an information processing system comprising:

- a first information processor which registers a first context in a context judgment section and a second information processor which registers a second context in the context judgment section, the first information processor and the second information processor performing mutual beacon communication with each other,
- a judgment section that judges context-related information included in the beacon packet, wherein
- when the result data of the judgment indicates that the first context and the second context are in a matching relationship,
- the first information processor comprises a data processor that processes the result data as node notification data, and
- the second information processor comprises a data processor that processes the result data as output data for user notification (display or sound or vibration).

F2) In addition to F1) provided above, further, the information processing system is characterized by comprising a situation setting system that is connectable to the context judgment section, and for designing a user service form by setting up a situation to be in a matching relationship, wherein

- an input section for entering at least a context and a device ID is prepared as an element for setting the situation.

F3) In addition to F1) provided above, further, there is provided an information processing system characterized in that profile information input system for pre-setting profile information including the respective device IDs of the first information processor and the second information processors and their respective context data, which are the specific elements for judgment of the matching relationship, can be connected to the context judgement section.

F4) In addition to F1) provided above, there is provided an information processing system characterized so as to be connectable to the context judgment section and comprise a provided information input system for pre-inputting that the result data to be given to the information processor which will be in the matching relationship is the data of the context content to be provided to the other party.

F5) In addition to F1) provided above, further, there is provided an information processing system characterized by including a transmission management system that can be connected to the context judgment section and that inputs transmission management information to the context judgment section as the way for transmitting context-related information in terms of transmission frequency, exclusive control, or duplicate elimination.

Further, the above-described device is also provided with features as a transmission method, a receiving method, and a transmitting/receiving method as categories.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, as to each of the structural elements recited in the claims, even if elements are expressed in a divided form, or a plurality of elements are expressed in combination, or these cases are expressed in combination, such cases also fall within the scope of the invention. Or, a plurality of embodiments may be combined in any way, and an embodiment constituted by such a combination also falls within the scope of the invention.

What is claimed is:

1. An information processing system comprising:
a first information processor which registers a first context in a context judgement section which is provided in a server;
a second information processor which registers a second context in the context judgement section; wherein,
in a case registration is performed of the first context and the second context which are in a matching relationship,
the context judgement section forms a context group of the first context and the second context, and further the context judgement section forms group data that includes IDs of the first information processor and the second information processor and the context group;
the first information processor and the second information processor performing mutual beacon communication with each other,
a judgement section in each of the first information processor and the second information processor that judges context-related information contained in a beacon packet, wherein
when result data of the judgement section indicates that the first context and the second context are in the matching relationship,
the first information processor comprises a first processor that processes the result data of the matching relationship, as node notification data, and
the second information processor comprises a second processor that processes the result data of the matching relationship, as output data for user notification, wherein
in a case the judgement is performed of the context matching at the first information processor, the first information processor receives and prepares the group data in advance from the context judgement section in the server.

2. The information processing system according to claim 1, wherein
the node notification data is data that provides a coupon to the second information processor.

3. The information processing system according to claim 1, wherein
the context judgment section is connected to the first information processor via the Internet.

4. The information processing system according to claim 3, wherein
the context judgement section comprises a table for carrying out matching processing of the first context and the second context transmitted from the first information processor and the second information processor, and a third context and a fourth context transmitted from a third information processor and a fourth information processor, and classifying a device ID of each information processor for each context.

5. The information processing system according to claim 1, wherein
the context judgement section comprises a table for carrying out matching processing of the first context and the second context transmitted from the first information processor and the second information processor, and a third context and a fourth context transmitted from a third information processor and a fourth information processor, and classifying a device ID of each information processor for each context.

6. The information processing system according to claim 1, wherein
the node is contained in a signage, wristwatch, bracelet, necklace, or glasses.

7. The information processing system according to claim 1, wherein
the second information processor processes the result data, node notification data, as coupons.

8. The information processing system according to claim 1, wherein
if the first context and the second context contain information about a rival store, the data group containing the ID of the first information processor and the ID of the second information processor are constructed separately.

9. An information processing method:
registering a first context of a first information processor in a context judgement section which is provided in a server;
registering a second context of a second information processor in the context judgement section; wherein
in a case registration is performed of the first context and the second context which are in a matching relationship,
the context judgement section forms a context group of the first context and the second context, and further the context judgement section forms group data that includes IDs of the first information processor and the second information processor and the context group;
performing mutual beacon communication the first information processor and the second information processor;
judging whether the first context and the second context are in the matching relationship or not;
when result data of the judging indicates that the first context and the second context are in a matching relationship,
processing the first information processor the result data of matching data as node notification data; and
processing the second information processor the result data of the matching data as output data for user notification; wherein
in a case the judging is performed of the context matching at the first information processor, the first information processor receives and prepares the group data in advance from the context judgement section in the server.

* * * * *